US012122439B2

(12) United States Patent
Sherrill

(10) Patent No.: US 12,122,439 B2
(45) Date of Patent: Oct. 22, 2024

(54) CLASPING STABILITY DEVICE AND CLASPING STABILIZED HAND TRUCK

(71) Applicant: Robert L. Sherrill, Magnolia, TX (US)

(72) Inventor: Robert L. Sherrill, Magnolia, TX (US)

( * ) Notice: Subject to any disclaimer, the term of this patent is extended or adjusted under 35 U.S.C. 154(b) by 311 days.

(21) Appl. No.: 17/841,060

(22) Filed: Jun. 15, 2022

(65) Prior Publication Data
US 2023/0406379 A1 Dec. 21, 2023

(51) Int. Cl.
*B62B 1/14* (2006.01)
*B62B 5/00* (2006.01)
*B65G 7/04* (2006.01)

(52) U.S. Cl.
CPC ............ *B62B 1/142* (2013.01); *B62B 5/00* (2013.01); *B65G 7/04* (2013.01)

(58) Field of Classification Search
CPC ............ B62B 1/142; B62B 5/00; B65G 7/04
See application file for complete search history.

(56) References Cited

U.S. PATENT DOCUMENTS

| | | | | |
|---|---|---|---|---|
| 1,255,070 A | * | 1/1918 | Waller | B62B 1/142 |
| | | | | 280/47.23 |
| 1,692,624 A | * | 11/1928 | Byington | B62B 1/142 |
| | | | | 414/451 |
| 2,367,752 A | * | 1/1945 | Broome | B62B 1/142 |
| | | | | 414/451 |
| 3,038,620 A | * | 6/1962 | Collin | B66C 3/16 |
| | | | | 294/107 |
| 5,791,855 A | * | 8/1998 | Dixon | B62B 1/142 |
| | | | | 414/490 |
| 6,883,766 B1 | * | 4/2005 | Ziaylek | A62B 9/04 |
| | | | | 248/316.1 |
| 10,525,997 B1 | * | 1/2020 | Su | B62B 1/142 |
| 2004/0256817 A1 | * | 12/2004 | Sandoval | B62B 1/142 |
| | | | | 280/47.26 |

(Continued)

FOREIGN PATENT DOCUMENTS

DE 202010000211 U1 * 6/2010 ............. B62B 1/142

OTHER PUBLICATIONS

Applicant Reply to Ex-Parte Quayle action in U.S. Appl. No. 29/842,721, filed Jun. 15, 2022, submitted on Apr. 30, 2024.

(Continued)

*Primary Examiner* — Jacob B Meyer
(74) *Attorney, Agent, or Firm* — Basil M. Angelo; ANGELO IP

(57) ABSTRACT

A clasping stability device and clasping stabilized hand truck provide a stable material handling platform safely operable by a single human operator from the rear of the hand truck, without having to use straps or ties. The clasping stability device may assist in loading material onto the hand truck at the source location, stabilize the material during transport, and assist in unloading the material from the hand truck at the destination location. The clasping mechanism may automatically lock into place once the clasping arms are closed to a sufficient degree to secure the material. The locking mechanism may remain locked, stabilizing the material during transport, until the locking mechanism is released. The clasping stability device provides a single stroke clasping and release mechanism that is engaged entirely from the rear of the hand truck.

21 Claims, 47 Drawing Sheets

(56) References Cited

U.S. PATENT DOCUMENTS

| | | | |
|---|---|---|---|
| 2005/0129491 A1* | 6/2005 | Smith | B62B 1/264 |
| | | | 414/490 |
| 2010/0021275 A1* | 1/2010 | Ratermann | B62B 1/14 |
| | | | 414/454 |
| 2023/0406379 A1* | 12/2023 | Sherrill | B62B 1/142 |

OTHER PUBLICATIONS

Applicant Reply to Ex-Parte Quayle Action in U.S. Appl. No. 29/842,725, filed Jun. 15, 2022, submitted on Apr. 30, 2024.
USPTO Ex-Parte Quayle action issued in U.S. Appl. No. 29/842,721, filed Jun. 15, 2022, mailed on Mar. 21, 2024.
USPTO Ex-Parte Quayle Action issued in U.S. Appl. No. 29/842,725, filed Jun. 15, 2022, mailed on Apr. 16, 2024.
USPTO Notice of Allowance issued in U.S. Appl. No. 29/842,721, filed Jun. 15, 2022, mailed on Jun. 7, 2024.
USPTO Notice of Allowance issued in U.S. Appl. No. 29/842,725, filed Jun. 15, 2022, mailed on Jun. 12, 2024.

* cited by examiner

CLASPING STABILITY DEVICE AND CLASPING STABILIZED HAND TRUCK

BACKGROUND OF THE INVENTION

A hand truck is used to assist a human operator in moving material from one location to another. Hand trucks are particularly useful when the size, shape, or weight of the material make it difficult for the human operator to move it by hand. There are several different types of hand trucks in common use, including, for example, commercial hand trucks, bread tray hand trucks, pail hand trucks, pallet hand trucks, and pry lever hand trucks. Conventional hand trucks typically include one or more handles, a wheeled frame, and a front-facing nose plate that is used to support material placed thereon. The nose plate is typically angled slightly down to assist in loading the material onto the nose plate. The human operator will typically position the edge of the nose plate near the edge of the object, use a foot to push the bottom portion of the hand truck forward to wedge the nose plate under the material while simultaneously using a hand to pull the material backward onto the nose plate. Once the nose plate is positioned under the material, the human operator typically places one hand on the handle of the hand truck and the other hand on the material to stabilize it while the human operator uses a foot to break the hand truck backwards toward the human operator. In doing so, the nose plate is angled up such that the material is supported at least partially on one side by the wheeled frame and at least partially by the nose plate. The human operator then uses the one or more handles to wheel the hand truck and material to the destination location.

BRIEF SUMMARY OF THE INVENTION

According to one aspect of one or more embodiments of the present invention, a clasping stability device includes a pair of clasping arms each having a clasping portion, a pivoting attachment portion, and a rotating attachment portion, a base plate assembly having a base plate, a plurality of actuator travel positioner receivers disposed on top side of the base plate, and a plurality of pedal mounting plates disposed on a bottom side of the base plate, an actuator assembly having an actuator plate and a plurality of actuator travel positioners attached to a bottom side of the actuator plate, a pedal arm disposed in between the pedal mounting plates having an engagement portion, a pivot attachment portion, an index latch track, and an actuating portion, and a pedal latch disposed in between the pedal mounting plates having a release portion, a pivot attachment portion, and an index latch. The clasping arms are controllably closed by pushing the engagement portion of the pedal arm causing the pedal arm to travel such that the actuating portion of the pedal arm disposed within a cutout of the actuator plate causes the actuator plate assembly to travel in the actuator travel positioner receivers toward a rear of the base plate. The travel of the actuator plate assembly causes the rotating attachment portion of the clasping arms to travel within arcuate travel cutouts in the actuator plate while the pivot attachment portion of the clasping arms pivot causing the clasping arms to close. Upon release of the engagement portion the index latch engages the index latch track to stably retain a degree of closure of the clasping arms.

According to one aspect of one or more embodiments of the present invention, a clasping stabilized hand truck includes a hand truck having a plurality of longitudinal support members, and a clasping stability device removably attached to the hand truck by a plurality of clamping assemblies. Each clamping assembly includes a front member having a radiused portion and a rear member having a radiused portion. The front member is removably attached to the rear member such that the radiused portions secure the clasping stability device to the longitudinal support members of the hand truck. The clasping stability device includes a pair of clasping arms each having a clasping portion, a pivoting attachment portion, and a rotating attachment portion, a base plate assembly having a base plate, a plurality of actuator travel positioner receivers disposed on top side of the base plate, and a plurality of pedal mounting plates disposed on a bottom side of the base plate, an actuator assembly having an actuator plate and a plurality of actuator travel positioners attached to a bottom side of the actuator plate, a pedal arm disposed in between the pedal mounting plates having an engagement portion, a pivot attachment portion, an index latch track, and an actuating portion, and a pedal latch disposed in between the pedal mounting plates having a release portion, a pivot attachment portion, and an index latch. The clasping arms are controllably closed by pushing the engagement portion of the pedal arm causing the pedal arm to travel such that the actuating portion of the pedal arm disposed within a cutout of the actuator plate causes the actuator plate assembly to travel in the actuator travel positioner receivers toward a rear of the base plate. The travel of the actuator plate assembly causes the rotating attachment portion of the clasping arms to travel within arcuate travel cutouts in the actuator plate while the pivot attachment portion of the clasping arms pivot causing the clasping arms to close. Upon release of the engagement portion the index latch engages the index latch track to stably retain a degree of closure of the clasping arms.

According to one aspect of one or more embodiments of the present invention, a clasping stabilized hand truck includes a hand truck having a plurality of transverse support members, and a clasping stability device removably attached to the hand truck by a plurality of mounting bolts that secure the clasping stability device to the transverse support member of the hand truck. The clasping stability device includes a pair of clasping arms each having a clasping portion, a pivoting attachment portion, and a rotating attachment portion, a base plate assembly having a base plate, a plurality of actuator travel positioner receivers disposed on top side of the base plate, and a plurality of pedal mounting plates disposed on a bottom side of the base plate, an actuator assembly having an actuator plate and a plurality of actuator travel positioners attached to a bottom side of the actuator plate, a pedal arm disposed in between the pedal mounting plates having an engagement portion, a pivot attachment portion, an index latch track, and an actuating portion, and a pedal latch disposed in between the pedal mounting plates having a release portion, a pivot attachment portion, and an index latch. The clasping arms are controllably closed by pushing the engagement portion of the pedal arm causing the pedal arm to travel such that the actuating portion of the pedal arm disposed within a cutout of the actuator plate causes the actuator plate assembly to travel in the actuator travel positioner receivers toward a rear of the base plate. The travel of the actuator plate assembly causes the rotating attachment portion of the clasping arms to travel within arcuate travel cutouts in the actuator plate while the pivot attachment portion of the clasping arms pivot causing the clasping arms to close. Upon release of the engagement portion the index latch engages the index latch track to stably retain a degree of closure of the clasping arms.

Other aspects of the present invention will be apparent from the following description and claims.

BRIEF DESCRIPTION OF THE DRAWINGS

FIG. 1111 shows a rear facing bottom-side perspective view of the clasping stability device in the closed state in accordance with one or more embodiments of the present invention.

DETAILED DESCRIPTION OF THE INVENTION

Figure 1A:
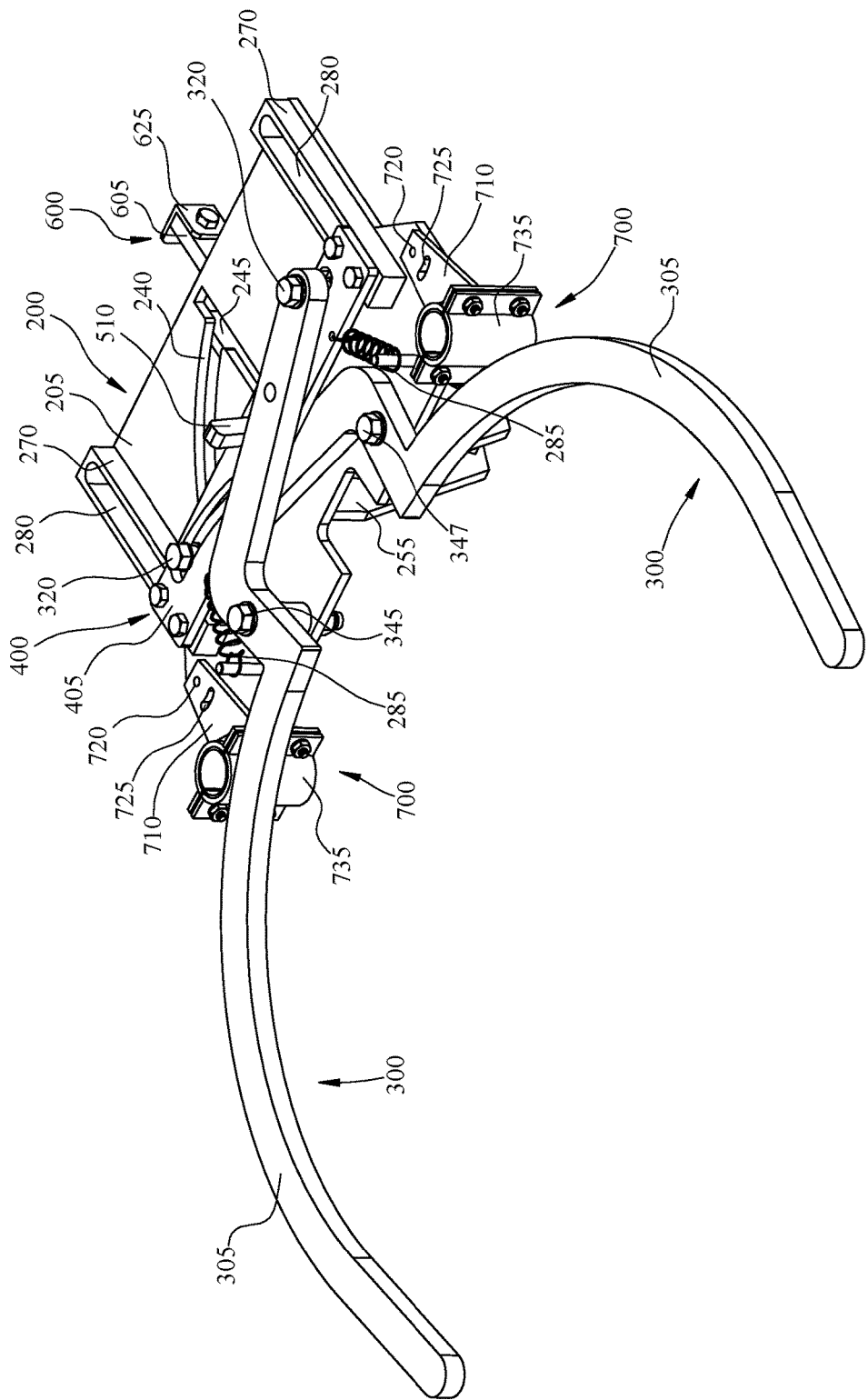
FIG. 1A shows a front facing top-side perspective view of a clasping stability device in accordance with one or more embodiments of the present invention.

One or more embodiments of the present invention are described in detail with reference to the accompanying figures. For consistency, like elements in the various figures are denoted by like reference numerals. In the following detailed description of the present invention, specific details are described to provide a thorough understanding of the present invention. In other instances, aspects that are well-known to those of ordinary skill in the art are not described to avoid obscuring the description of the present invention.

An inherent problem with conventional hand trucks is that they lack stability with respect to the material they transport. Depending on its size, shape, and weight, the material may become unstable and move or even fall off the hand truck. The problem may be exacerbated by ground that is not level, obstructions in the path of travel, and shifting weight caused by movement of the hand truck during transport. This presents a risk to the operator and may give rise to more serious safety and environmental concerns when the material includes chemical, flammable, or hazardous materials.

The nose plate of a conventional hand truck is typically smaller in at least one dimension than the material it is used to transport. As such, the nose plate is only capable of supporting a portion of the material. The practical consequence of this is that the human operator must load the material and tilt the hand truck backwards to use the wheeled frame to provide additional support to the material during transport. Specifically, the human operator must position the edge of the nose plate of the hand truck near the edge of the material, push the hand truck forward with their foot to wedge the nose plate under the material, while simultaneously pulling the material towards to the rear of the nose plate with their hand. Once the nose plate is properly positioned under the material, the human operator must then tilt the hand truck backwards using one hand and one foot while simultaneously supporting the material with the other hand until it is at least partially supported on one side by the wheeled frame of the hand truck in the tilted-back position. Because the configuration and shape of the wheeled frame varies from hand truck to hand truck, the degree of support that the wheeled frame provides varies from design to design and also varies with the size, shape, and weight of the material. Once the hand truck is in the titled-back position, the material is at least partially supported by the wheeled frame and the nose plate. The human operator may then attempt to transport the material to the desired location. However, there is little to no support for the material on at least four sides, and the material is prone to fall off the hand truck in any of the unsupported directions during transport.

In an effort to stabilize the material, various straps or ties may be used to secure the material to the hand truck. However, the use of straps or ties require the human operator to load the material as described above, then set the hand truck down on the nose plate, walk around to the front of the hand truck, and manually strap or tie down the material to the hand truck. The fact that the human operator cannot strap or tie down the material from the rear of the hand truck is problematic because some materials become unstable merely from setting the hand truck down, where the nose plate is typically angled slightly down. As such, straps and ties are not effective for materials that have a size, shape, or weight, such as, for example, large and heavy cylindrical-shaped materials, that make it difficult to secure to the hand truck from the front of the hand truck. Notwithstanding, the use of straps or ties slows down the transport operation considerably and increases costs.

Accordingly, in one or more embodiments of the present invention, a clasping stability device and clasping stabilized hand truck provide a stable material handling platform safely operable by a single human operator. The operator may safely and securely load, transport, and unload material entirely from the rear of the hand truck, without having to use straps or ties. The clasping stability device may assist in loading material onto the hand truck at the source location, stabilize the material during transport, and assist in unloading the material from the hand truck at the destination location. The clasping stability device includes a clasping mechanism that may assist in pulling material toward the rear of the nose plate of the hand truck, and onto the nose plate, while the clasping mechanism is closing. The clasping mechanism may lock into place once the clasping arms are closed to a sufficient degree to secure the material. The locking mechanism may be automatically engaged upon release of the engagement portion of the pedal arm of the clasping stability device. The locking mechanism may remain locked, stabilizing the material on the hand truck, during transport until the release portion of the pedal latch of the clasping stability device is engaged. The clasping mechanism may assist in releasing material toward the front of the nose plate while the clasping mechanism is opening. Advantageously, the clasping stability device provides a single stroke clasping mechanism that is engaged entirely from the rear of the hand truck and that automatically locks into place to secure the material to the hand truck. In addition, the clasping stability device provides a single stroke release mechanism that is also engaged entirely from the rear of the hand truck. The ability of a single human operator to safely load, transport, and unload material is substantially enhanced, and the time required is minimized. Moreover, the clasping stability device and clasping stabilized hand truck improve the safety of transporting chemical, flammable, and hazardous materials and well as materials that have a size, shape, or weight that is problematic for conventional hand trucks.

Figure 1B:
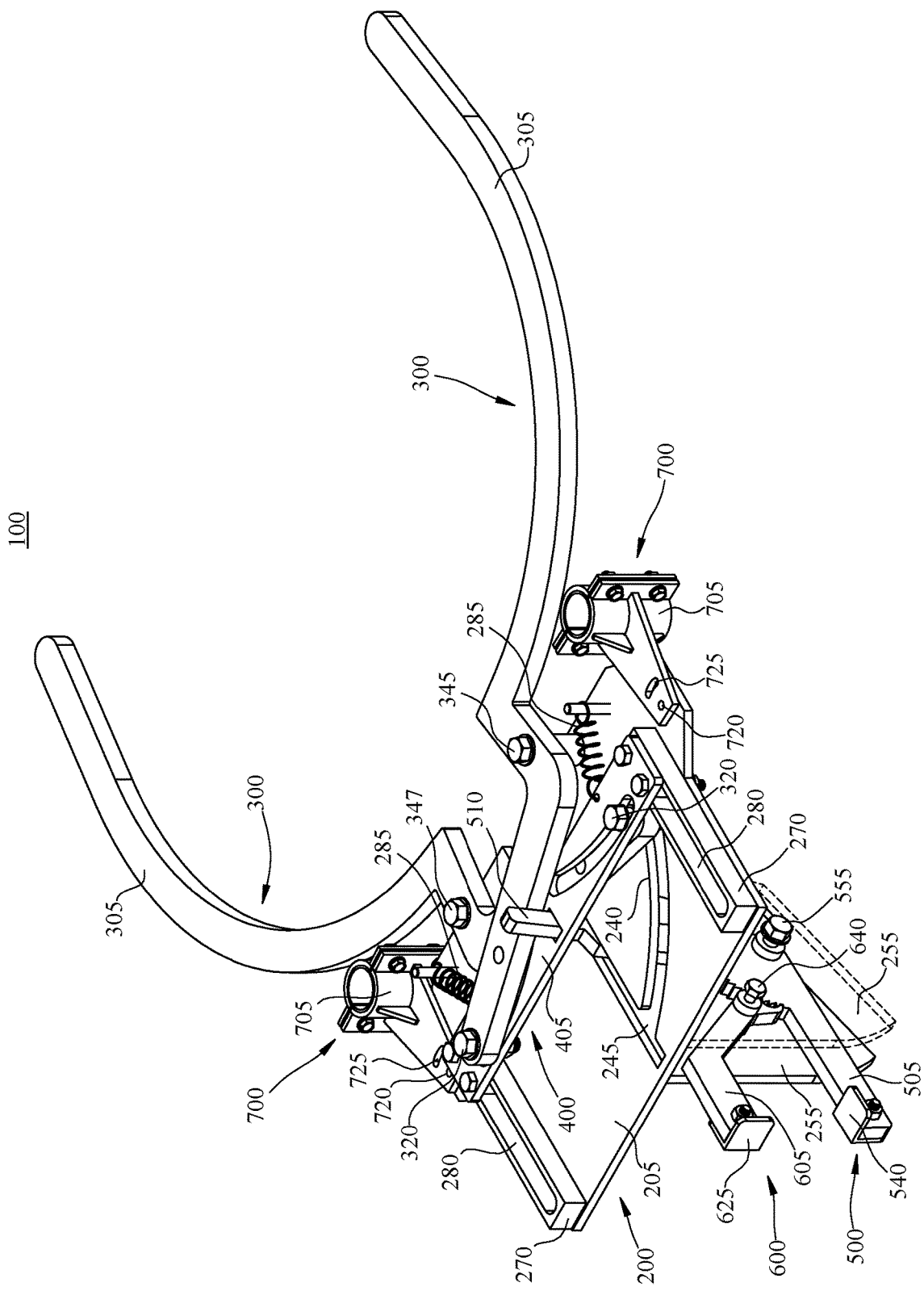
FIG. 1B shows a rear facing top-side perspective view of the clasping stability device in accordance with one or more embodiments of the present invention.

FIG. 1A shows a front facing top-side perspective view of a clasping stability device 100 in accordance with one or more embodiments of the present invention. Clasping stability device 100 may include a secure clasping mechanism that may be used to stabilize material on a hand truck (not shown). Clasping stability device 100 may include a base plate assembly 200 and a pair of clasping arm assemblies 300 removably attached to base plate assembly 200. Continuing, FIG. 1B shows a rear facing top-side perspective view of clasping stability device 100 in accordance with one or more embodiments of the present invention. Clasping stability device 100 may also include an actuator assembly 400 that facilitates the clasping and release mechanisms of clasping arm assemblies 300, a pedal arm assembly 500 that may controllably engage the clasping mechanism of clasping arms 300, and a pedal latch assembly 600 that may engage the locking mechanism or release mechanism of clasping arm assemblies 300. In the embodiment depicted, clasping stability device 100 may include a plurality of clamping assemblies 700 removably attached to base plate assembly 200. Clamping assemblies 700 may be used to removably attach clasping stability device 100 to a hand truck (not shown). Base plate assembly 200 may include a base plate 205, a plurality of actuator travel positioner receivers 270 disposed on a top side of base plate 205, and a plurality of pedal mounting plates 255 disposed on a bottom side of base plate 205.

Figure 1C:
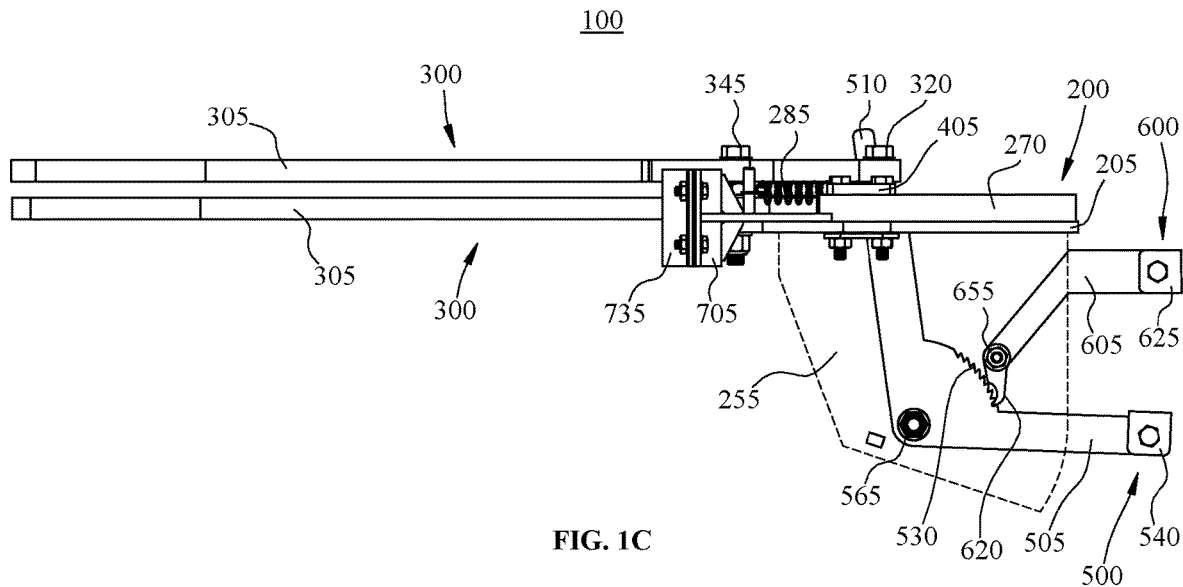
FIG. 1C shows a left-side elevation view of the clasping stability device in accordance with one or more embodiments of the present invention.
Figure 1D:
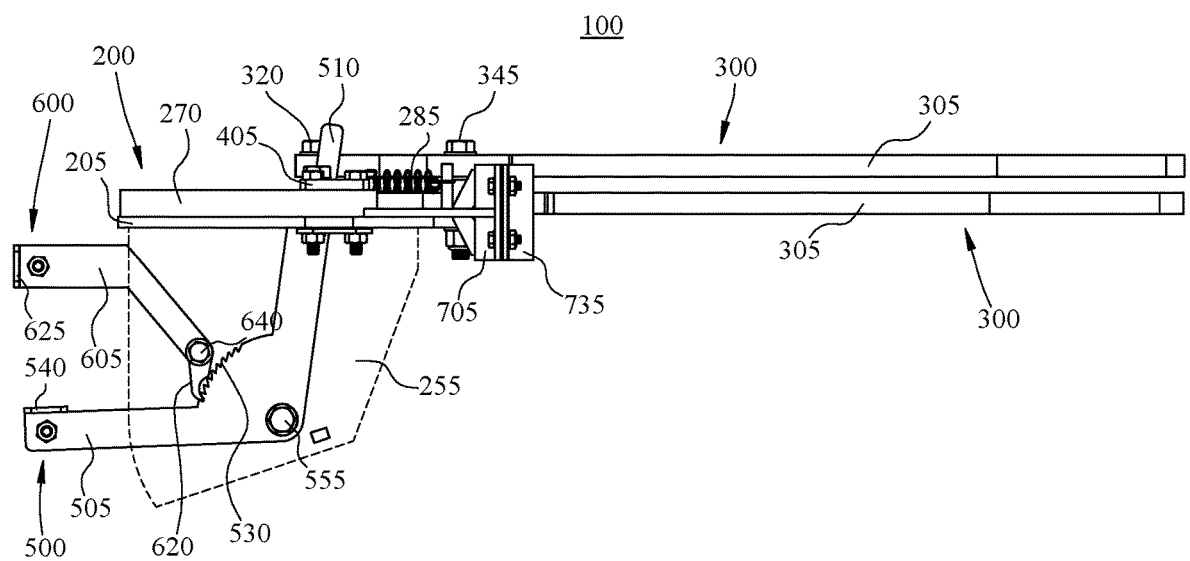
FIG. 1D shows a right-side elevation view of the clasping stability device in accordance with one or more embodiments of the present invention.
Figure 1E:
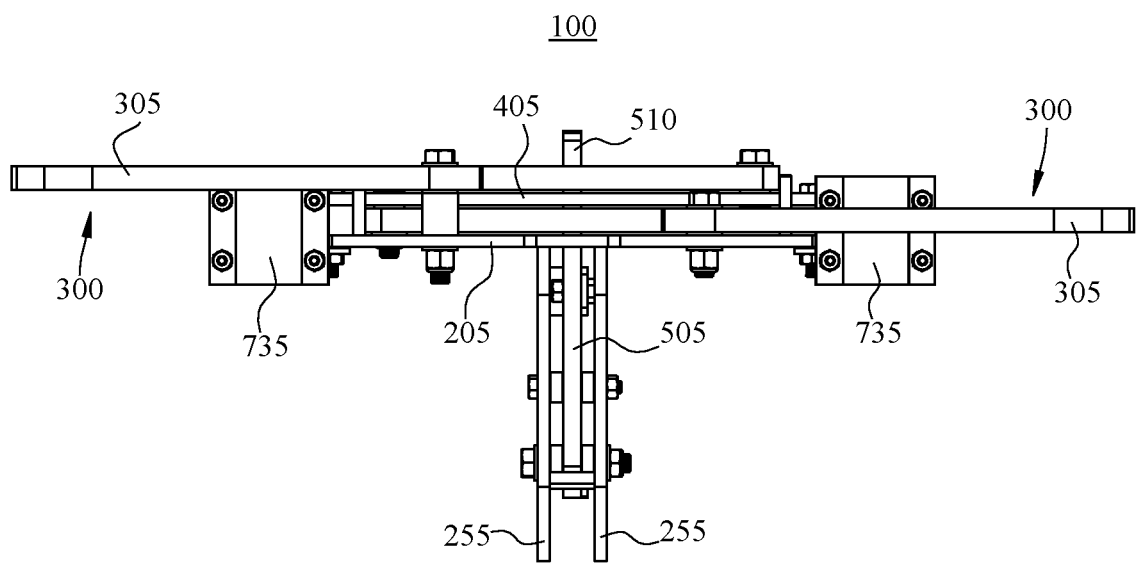
FIG. 1E shows a front elevation view of the clasping stability device in accordance with one or more embodiments of the present invention.
Figure 1F:
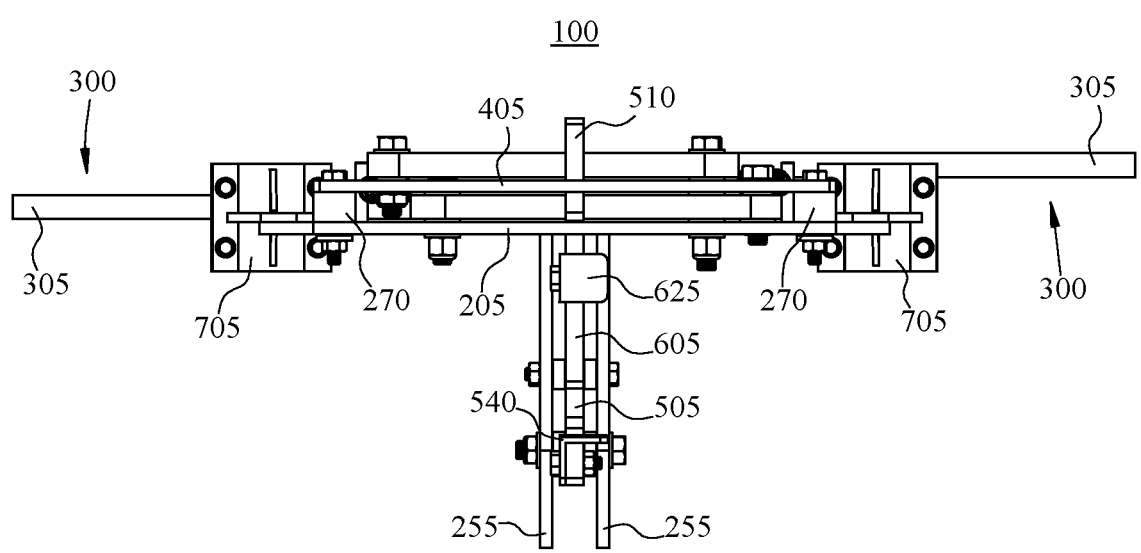
FIG. 1F shows a rear elevation view of the clasping stability device in accordance with one or more embodiments of the present invention.

Continuing, FIG. 1C shows a left-side elevation view of clasping stability device 100 in accordance with one or more embodiments of the present invention. As shown in this view, pedal arm assembly 500 may be disposed below pedal latch assembly 600, to enable the use of the human operator's foot to engage pedal arm 505 from the rear of a hand truck (not shown). Continuing, FIG. 1D shows a right-side elevation view of the clasping stability device 100 in accordance with one or more embodiments of the present invention. Pedal arm 505 may include an actuating portion 510 that extends through a travel cutout (not shown) of base plate 205 and a cutout (not shown) of actuator plate 405, as described in more detail herein. When pedal arm 505 is engaged by pushing down on foot pedal 540, actuating portion 510 moves toward the rear of base plate 205, causing actuator assembly 400 to travel (not shown) towards the rear of base plate 205, and thereby causing clasping portions 305 of clasping arms 300 to close, as described in more detail herein. Upon release of foot pedal 540 of pedal arm 505, pedal arm 505 will be stably locked into place by pedal latch 605, securing the corresponding degree of closure of clasping arms 300. As shown in this view, an upper clasping arm 300 may be disposed above actuator plate 405 and a lower clasping arm 300 may be disposed below actuator plate 405, but above base plate 205. Continuing, FIG. 1E shows a front elevation view of clasping stability device 100 and FIG. 1F shows a rear elevation view of clasping stability device 100 in accordance with one or more embodiments of the present invention.

Figure 2A:
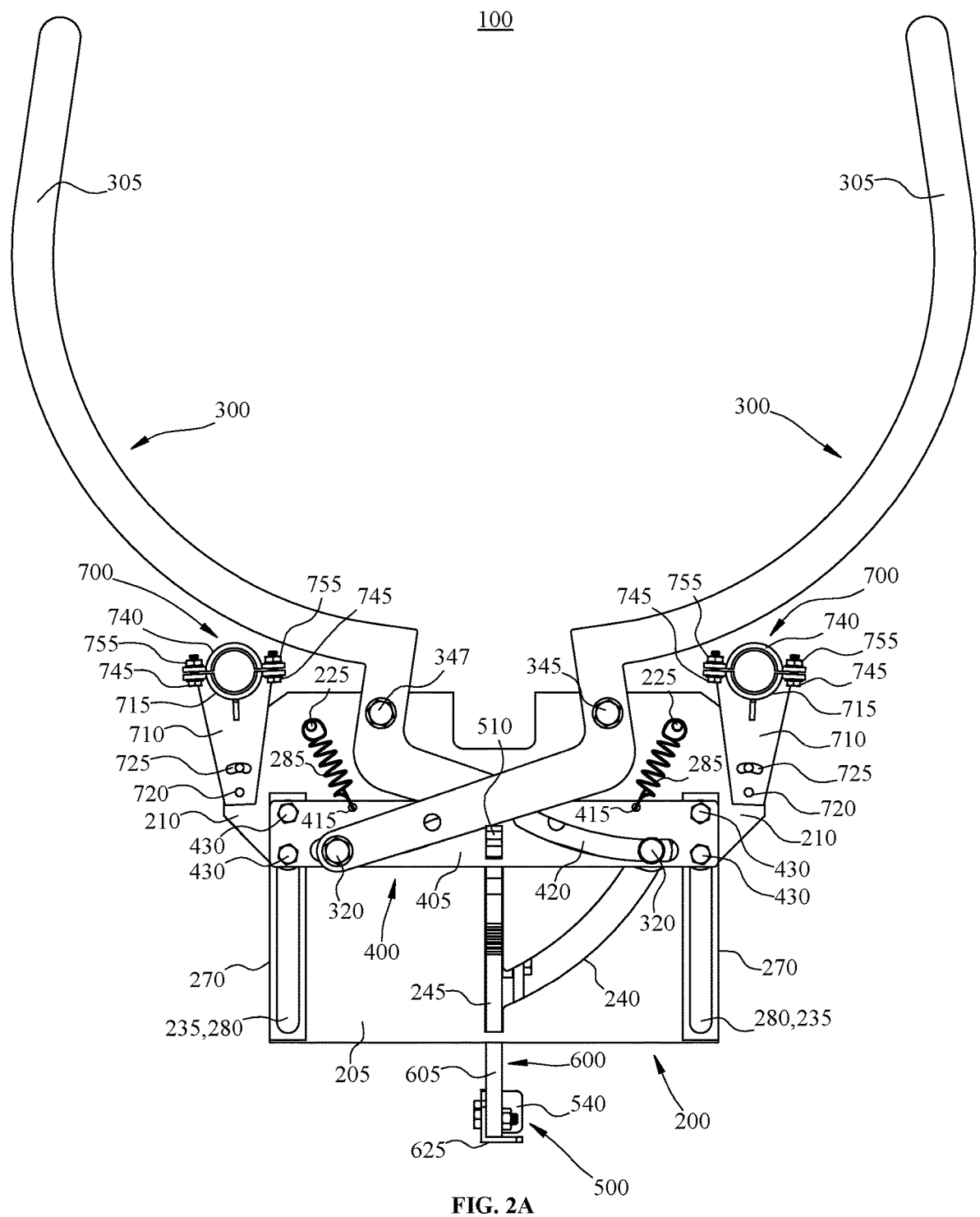
FIG. 2A shows a top plan view of a clasping stability device in an opened state in accordance with one or more embodiments of the present invention.

FIG. 2A shows a top plan view of a clasping stability device 100 in an opened state in accordance with one or more embodiments of the present invention. Base plate assembly 200 may include base plate 205 and a plurality of actuator travel positioner receivers 270 disposed on a top side of base plate 205. Each actuator travel positioner receiver 270 may include a travel cutout 280 aligned with a corresponding travel cutout 235 formed in base plate 205. Base plate 205 may include a travel cutout 245 for travel of actuating portion 510 of pedal arm 505 and an arcuate travel cutout 240 for travel of lower clasping arm 300 (more specifically bolt 320 and nut 340 thereof).

Actuator assembly 400 may include actuator plate 405 and a plurality of actuator travel positioners (435, not shown in this view) attached to a bottom side of actuator plate 405 (via the bottom side of base plate 205). Each actuator travel positioner (435, not shown in this view) may be attached to actuator plate 405 by one or more bolts 430 that extend through a top side of actuator plate 405 and the actuator travel positioner (435, not shown in this view) itself, that is secured on a bottom side of base plate 205 by a washer (440, not shown in this view) and one or more nuts (445, not shown in this view) that prevent each actuator travel positioner (435, not shown in this view) from coming out of its actuator travel positioner receiver 270. The actuator travel positioners (435, not shown in this view) of actuator assembly 400 are capable of travel within actuator travel positioner receivers 270 of base plate assembly 200, as described in more detail herein. Actuator plate 405 may also include a cutout (425, not shown in this view) to receive actuating portion 510 of the pedal arm (505, not shown in this view).

Each clasping arm assembly 300 may include a clasping portion 305, a pivoting attachment portion (310, not shown in this view, corresponding to location of bolt 345 or 347), a rotating attachment portion (315, not shown in this view, corresponding to location of bolt 320), and various bolts and nuts. Pivoting attachment portion (310, not shown in this view) of upper clasping arm 300 may be removably attached to a front portion of base plate 205 by bolt 345, but remain capable of pivoting. Similarly, pivoting attachment portion (310, not shown in this view) of lower clasping arm 300 may be removably attached to a front portion of base plate 205 by bolt 347, but remain capable of pivoting. Rotating attachment portion (315, not shown in this view) of upper clasping arm 300 may be removably attached to a top side of actuator plate 405 by bolt 320 through an arcuate travel cutout (420, not shown in this view) formed in actuator plate 405. The rotating attachment portion (315, not shown in this view) of lower clasping arm 300 may be removably attached to a bottom side of actuator plate 405 by bolt 320 that extends through the arcuate travel cutout 420 of actuator plate 405 and through the arcuate travel cutout 240 of base plate 205. In the opened state depicted, a plurality of springs 285 may be used to bias actuator plate 405 toward the front of base plate 205 and, when locked into place, clasping arms 300 may remain in the open position, ready for engagement with material.

Arcuate travel cutout 240 of base plate 205 permits the compaction of base plate assembly 200, clasping arms assembly 300, and actuator assembly 400, to reduce torsional forces and friction between moving parts. However, in certain embodiments, specifically those with lighter loads, actuator assembly 400 could be raised off base plate assembly 205 such that no cutout 240 would be required in base plate 205.

Figure 2B:
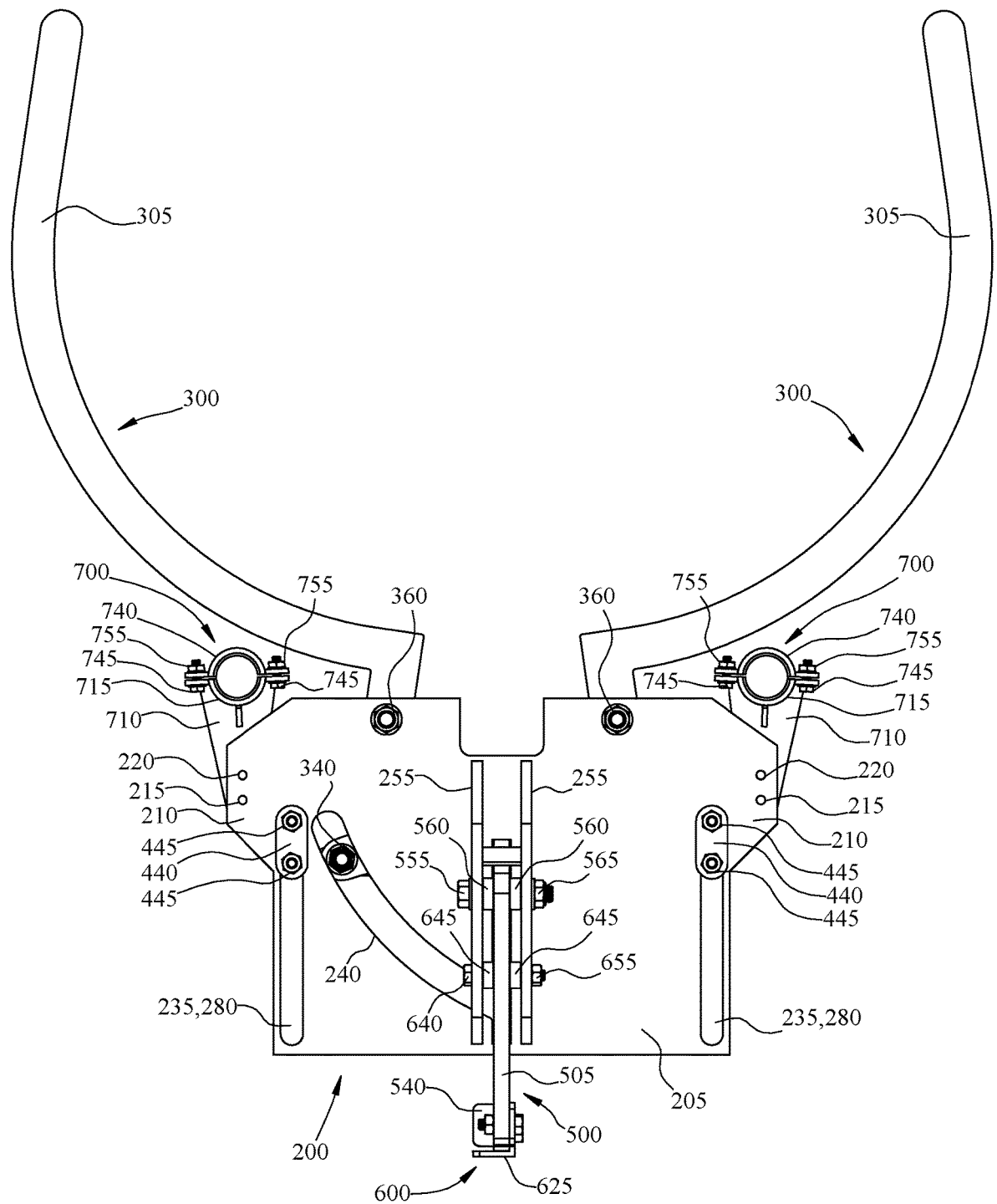
FIG. 2B shows a bottom plan view of the clasping stability device in the opened state in accordance with one or more embodiments of the present invention.

Continuing, FIG. 2B shows a bottom plan view of clasping stability device 100 in the opened state in accordance with one or more embodiments of the present invention. As shown in this view, a plurality of washers 440 and nuts 445 may be used to secure actuator travel positioners (435, not shown in this view) to a bottom side of the actuator plate (405, not shown in this view), from a bottom side of travel cutout 235 formed in base plate 205, maintaining the actuator travel positioners (435, not shown in this view) of actuator assembly 400 within the actuator travel positioner receivers (270, not shown in this view) of base plate 205, while the actuator travel positioners (435, not shown in this view) remain capable of travel between the front and rear of base plate 205. In the view depicted, nut 340 secures bolt 320 of lower clasping arm 300 to actuator plate 405, positioned such that it may travel in both the arcuate travel cutout (420, not shown in this view) of actuator plate 405 and the arcuate travel cutout 240 formed in base plate 205. In this way, arcuate travel cutout 240 of base plate 205 permits travel of bolt 320 and nut 340 of lower clasping arm 300 while the clasping mechanism or release mechanism is engaged. Also shown in this view, the plurality of pedal mounting plates 255 attached to the bottom side of base plate 205.

Figure 2C:
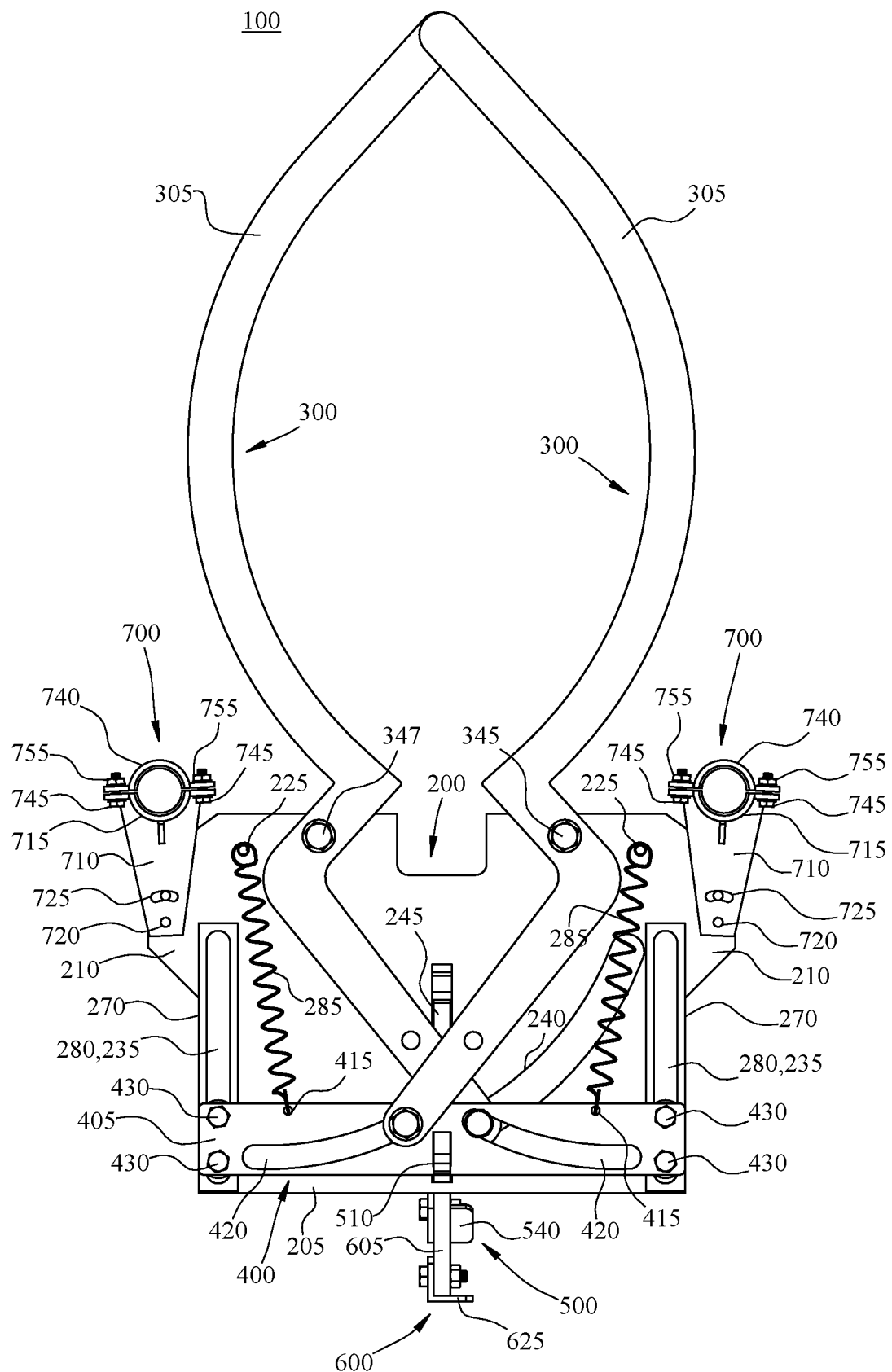
FIG. 2C shows a top plan view of the clasping stability device in a closed state in accordance with one or more embodiments of the present invention.

Continuing, FIG. 2C shows a top plan view of clasping stability device 100 in a closed state in accordance with one or more embodiments of the present invention. When a human operator wishes to engage the clasping mechanism to close on material (not shown), the operator may depress foot pad 540 of the pedal arm (505, not shown in this view), where the extent to which it is depressed corresponds to the extent to which the clasping arms 300 close. The depression of foot pad 540 cases the pedal arm (505, not shown in this view) to pivot, such that actuating portion 510 of the pedal arm (505, not shown in this view) travels toward the rear of base plate 205. The travel of actuating portion 510, disposed within the cutout (425, not shown in this view) of actuator plate 405, causes actuator assembly 400 to move toward the rear of base plate 205. As actuator assembly 400 travels toward the rear, the rotating portions of clasping arms 300 rotate in their respective arcuate travel cutout 420 formed in actuator plate 405. As the rotating attachment portions of clasping arms 300 rotate, the pivoting attachment portions of clasping arms 300 pivot, such that clasping portions 305 of clasping arms 300 begin to close. While not shown in this view, when the human operator releases foot pedal 540, pedal latch 605 automatically latches onto pedal arm 505, locking clasping arms 300 in their present degree of closure. In this way, clasping stability device 100 may provide stable clasping with any desired amount of closure from fully open to fully closed, thereby accommodating a large variety of materials.

In certain embodiments, clasping stability device 100 may be removably attached to existing hand trucks (not shown). A plurality of clamping assemblies 700 may be used to removably attach clasping stability device 100 to longitudinal support members (not shown) of the hand truck (not shown) that are typically tubular in shape. To accommodate variation in the space between longitudinal support members (not shown) of hand trucks (not shown), each clamping assembly 700 may include a rear mounting hole 720 to securely attach clamping assembly 700 to base plate 205 and an arcuate adjustment mounting hole 725 that permits the positioning of each clamping assembly 700 to fit a particular hand truck (not shown). In other embodiments, clasping stability device 100 may be attached to a hand truck (not shown) during the original equipment manufacturer ("OEM") build of the hand truck (not shown).

Figure 2D:
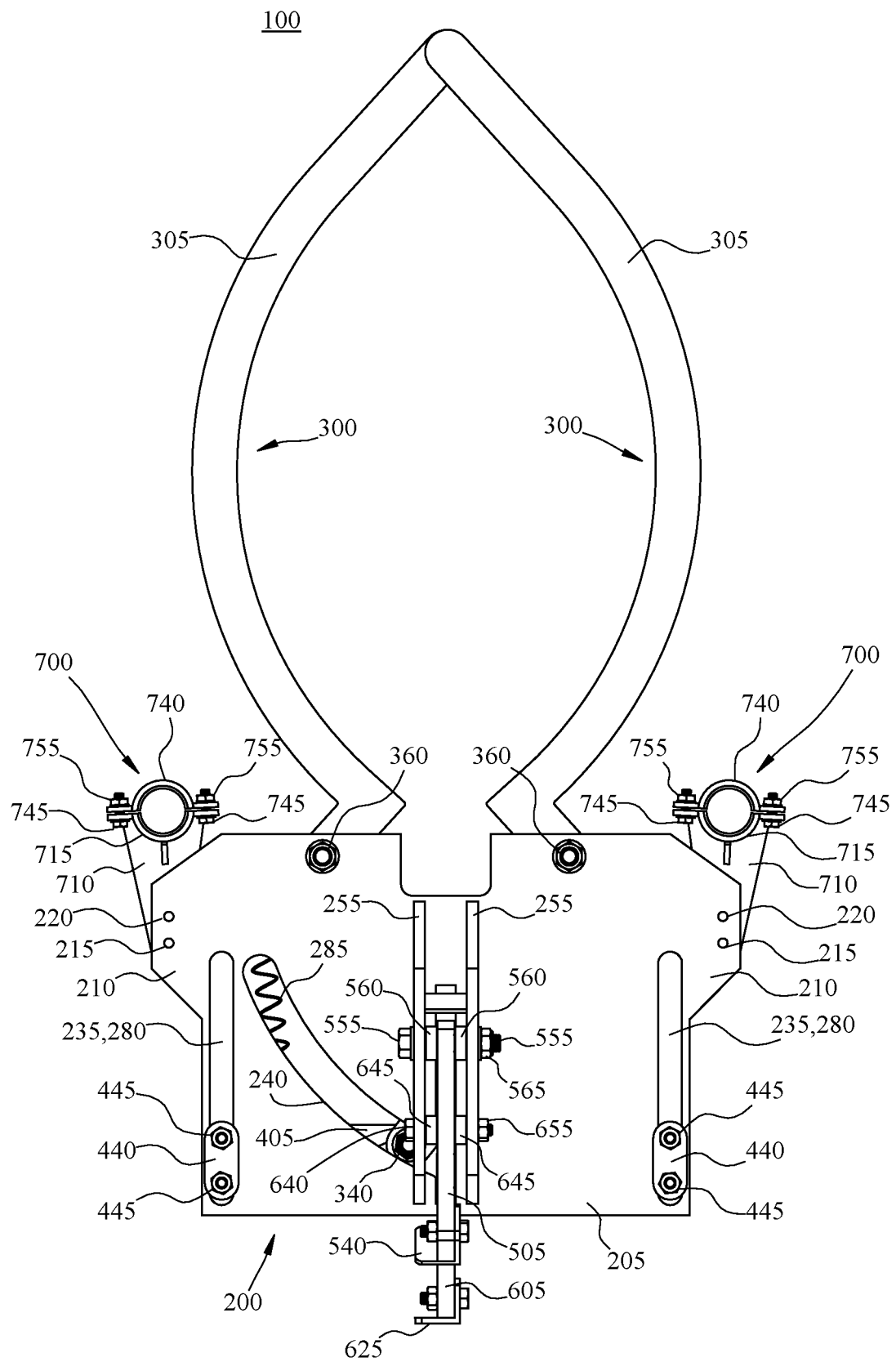
FIG. 2D shows a bottom plan view of the clasping stability device in the closed state in accordance with one or more embodiments of the present invention.

Continuing, FIG. 2D shows a bottom plan view of clasping stability device 100 in the closed state in accordance with one or more embodiments of the present invention. The travel of actuator assembly 400 toward the rear of base plate 205, is shown by the travel of washers 440 and nuts 445 of the actuator travel positioners (435, not shown in this view) that have now moved toward the rear of base plate 205 in travel cutout 280 of actuator plate 405 and corresponding travel cutout 235 of base plate 205. In addition, the travel of nut 340 of lower clasping arm 300 within the arcuate travel cutout 240 of base plate 205 is shown.

Figure 2E:
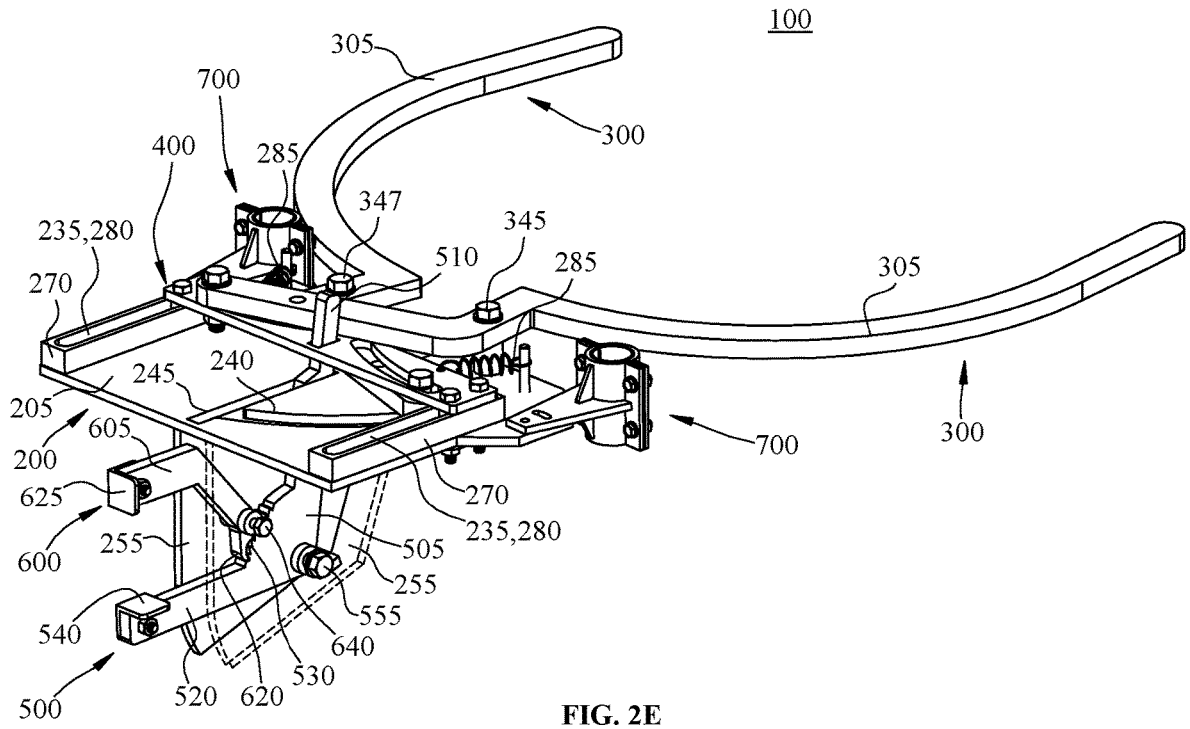
FIG. 2E shows a rear facing top-side perspective view of the clasping stability device in the opened state in accordance with one or more embodiments of the present invention.

Continuing, FIG. 2E shows a rear facing top-side perspective view of clasping stability device 100 in the opened state in accordance with one or more embodiments of the present invention. A portion of pedal arm assembly 500 and pedal latch assembly 600 may be disposed in between a pair of pedal mounting plates 255 disposed on a bottom side of base plate 205. For purposes of illustration only, the right-side pedal mounting plate 255 is drawn transparent to more clearly show the interaction of pedal arm assembly 500 and pedal latch assembly 600. Pedal arm assembly 500 may include a pedal arm 505 having an engagement portion 520, a pivoting attachment portion (535, not shown in this view, corresponding to location of bolt 555), an index latch track 530, actuating portion 510, and various nuts and bolts. Pedal latch assembly 600 may include a pedal latch 605 having a release portion (610, not shown in this view), a pivoting attachment portion (615, not shown in this view, corresponding to location of bolt 640), an index latch 620, and various nuts and bolts. In the opened state, actuating portion 510 of pedal arm 505 as well as actuator assembly 400 are positioned towards the front of base plate 205, nearest clasping portions 305. Index latch track 530 of pedal arm 505 may include an arcuate track of stairs disposed about the pivot point of pedal arm 505. Index latch 620 of pedal latch 605 may have a complimentary shape to that of index latch track 530, such that index latch 620 may engage each stair of index latch track 530 and securely maintain the position of pedal arm 505.

Figure 2F:
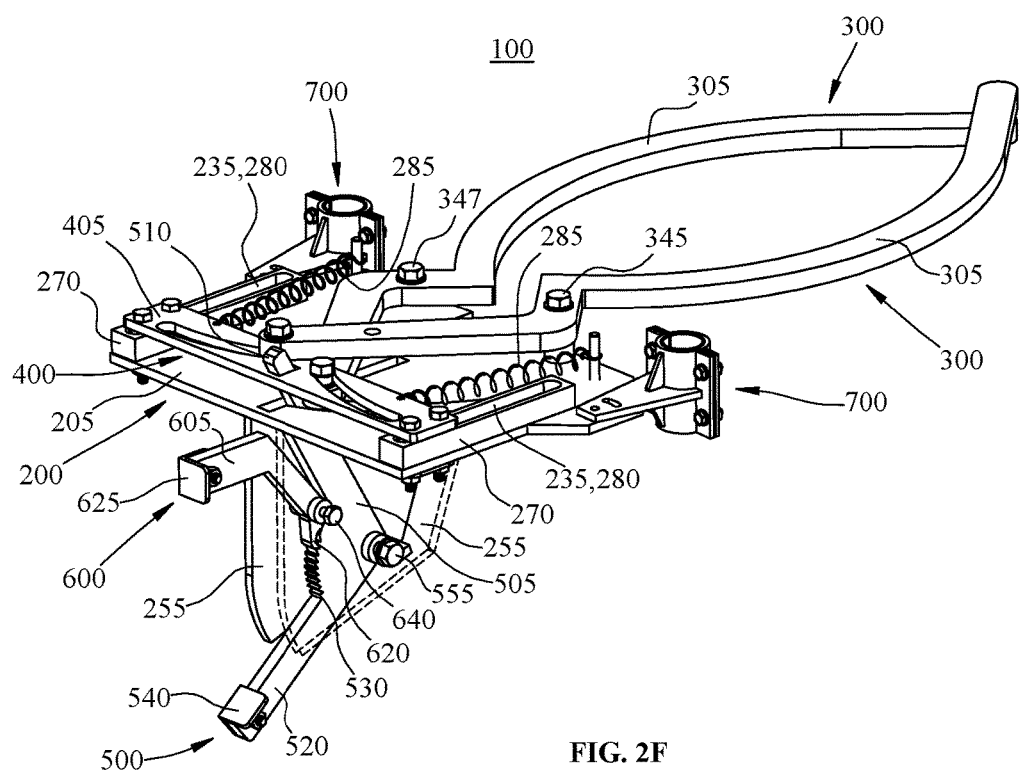
FIG. 2F shows a rear facing top-side perspective view of the clasping stability device in the closed state in accordance with one or more embodiments of the present invention.
Figure 2G:
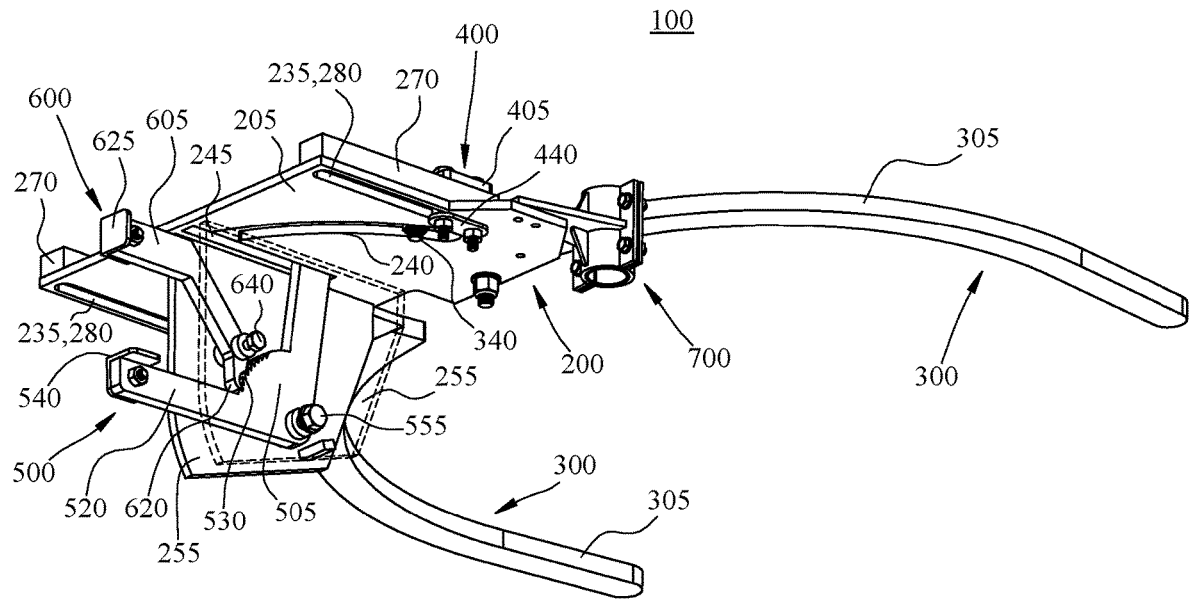
FIG. 2G shows a rear facing bottom-side perspective view of the clasping stability device in the opened state in accordance with one or more embodiments of the present invention.
Figure 2H:
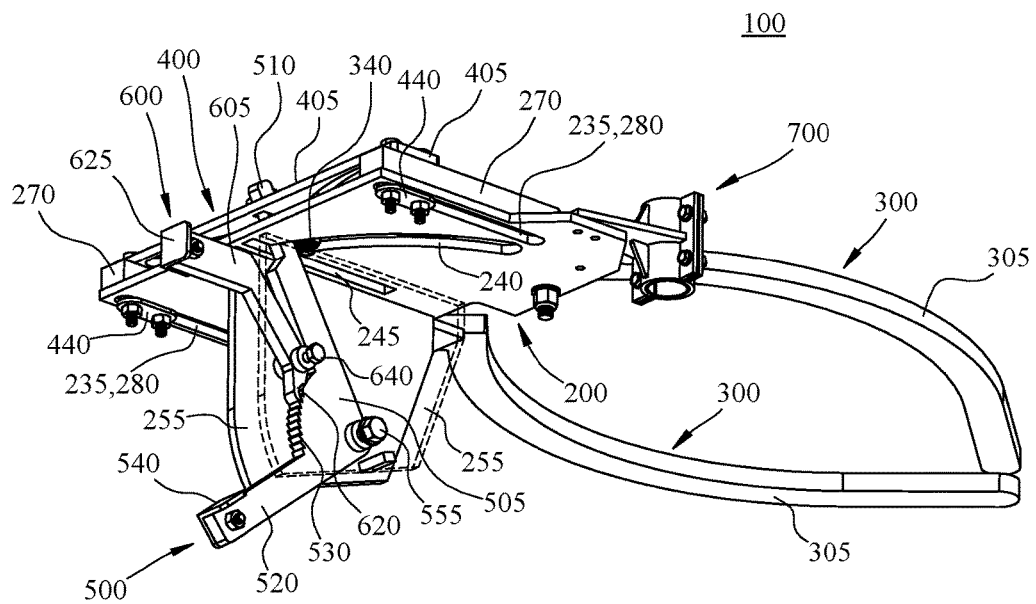
FIG. 2H shows a rear facing bottom-side perspective view of the clasping stability device in the closed state in accordance with one or more embodiments of the present invention.

Continuing, FIG. 2F shows a rear facing top-side perspective view of clasping stability device 100 in the closed state in accordance with one or more embodiments of the present invention. When a human operator wishes to engage the clasping mechanism of clasping stability device 100, the operator may depress foot pedal 540 of pedal arm 505, causing pedal arm 505 to pivot about its pivoting attachment point (535, not shown in this view, corresponding to location of bolt 555) such that actuating portion 510 of pedal arm 505 and actuator assembly 400 that it is disposed through, to travel toward the rear of base plate 205, thereby causing clasping arms 300 to close in a corresponding amount. As foot pedal 540 is being depressed, index latch 620 travels through successive stairs of index latch track 530, until such time as the operator disengages foot pedal 540. At that point, index latch 620 securely maintains its position in index latch track 530, maintaining the degree of closure of clasping arms 300. Index latch 620 may have a complimentary shape to that of index latch track 530, such that when index latch 620 engages index latch track 530, index latch 620 is capable of maintaining the current position of clasping arms 300. Showing a different angle, FIG. 2G shows a rear facing bottom-side perspective view of clasping stability device 100 in the opened state and FIG. 2H shows a rear facing bottom-side perspective view of clasping stability device 100 in the closed state in accordance with one or more embodiments of the present invention.

Figure 3A:
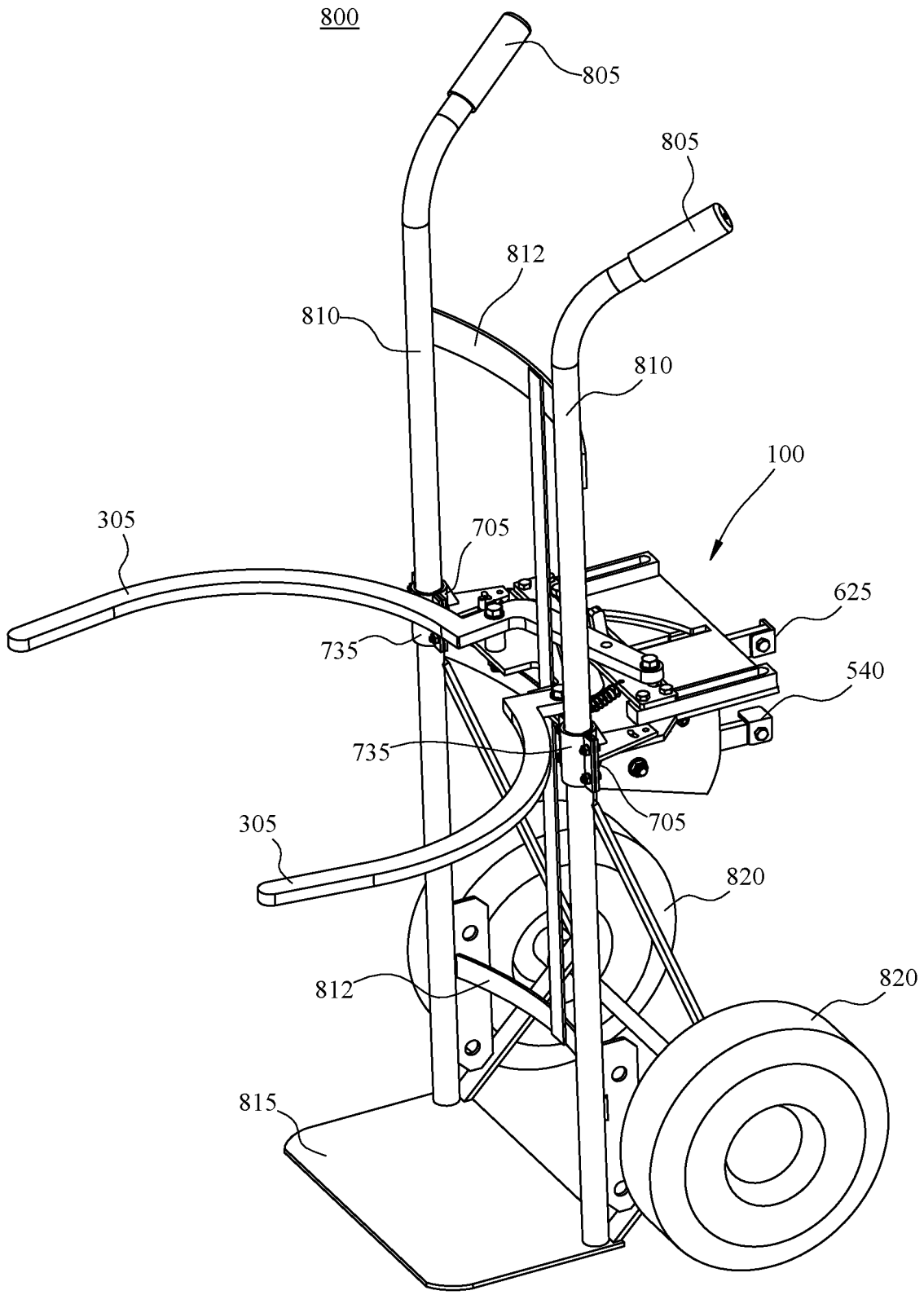
FIG. 3A shows a front facing top-side perspective view of a clasping stabilized hand truck in accordance with one or more embodiments of the present invention.
Figure 3B:
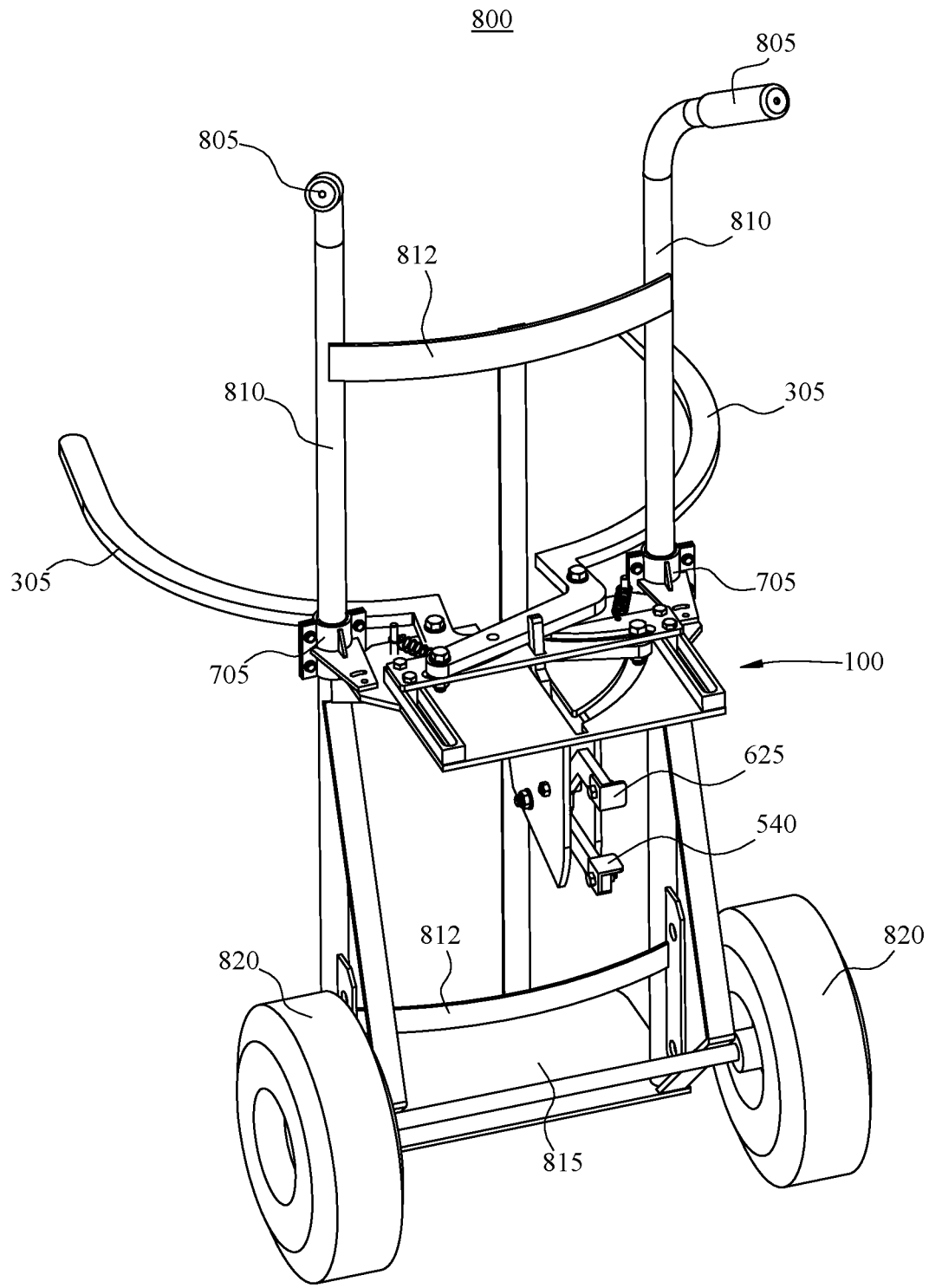
FIG. 3B shows a rear facing top-side perspective view of the clasping stabilized hand truck in accordance with one or more embodiments of the present invention.
Figure 3C:
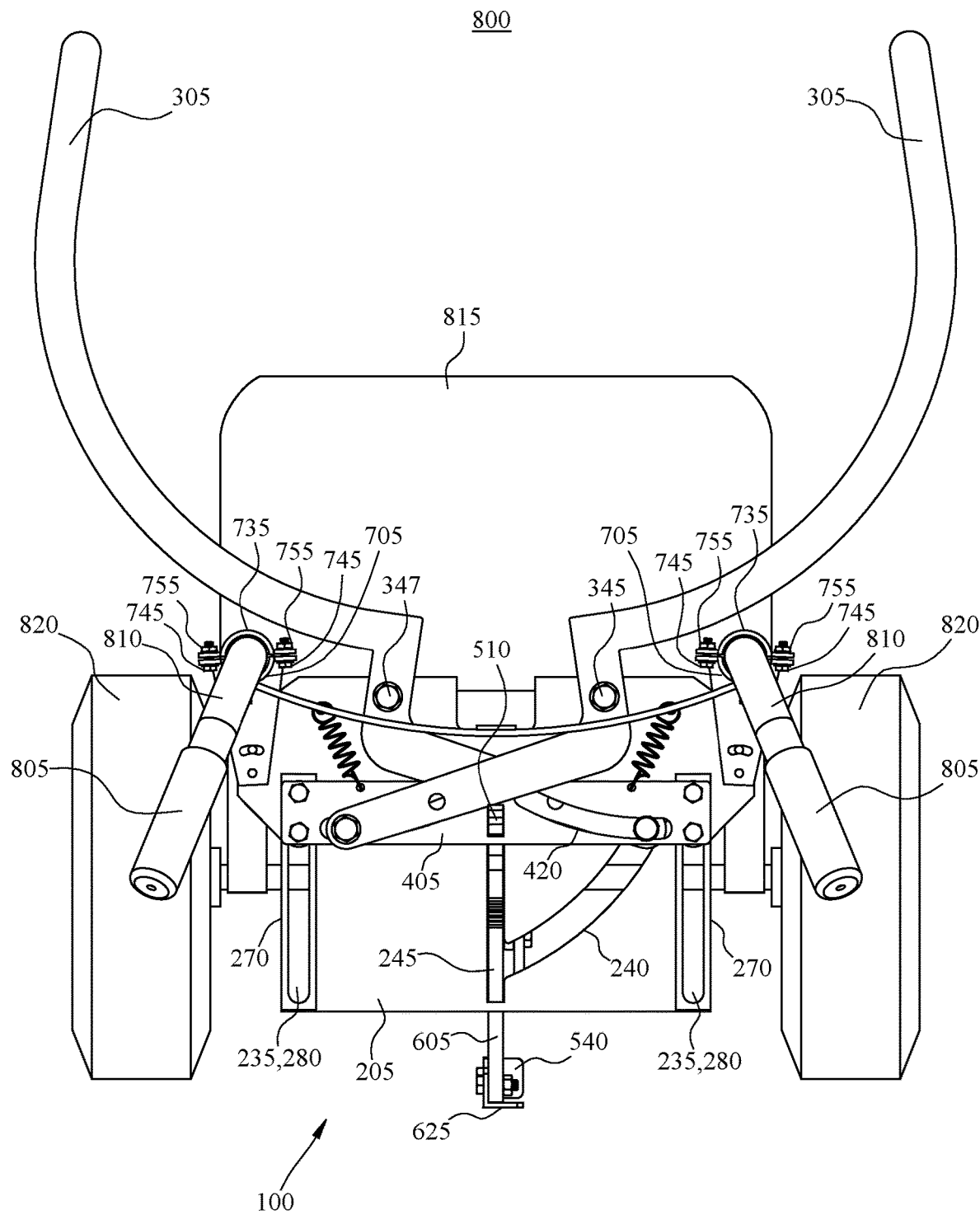
FIG. 3C shows a top plan view of the clasping stabilized hand truck in an opened state in accordance with one or more embodiments of the present invention.
Figure 3D:
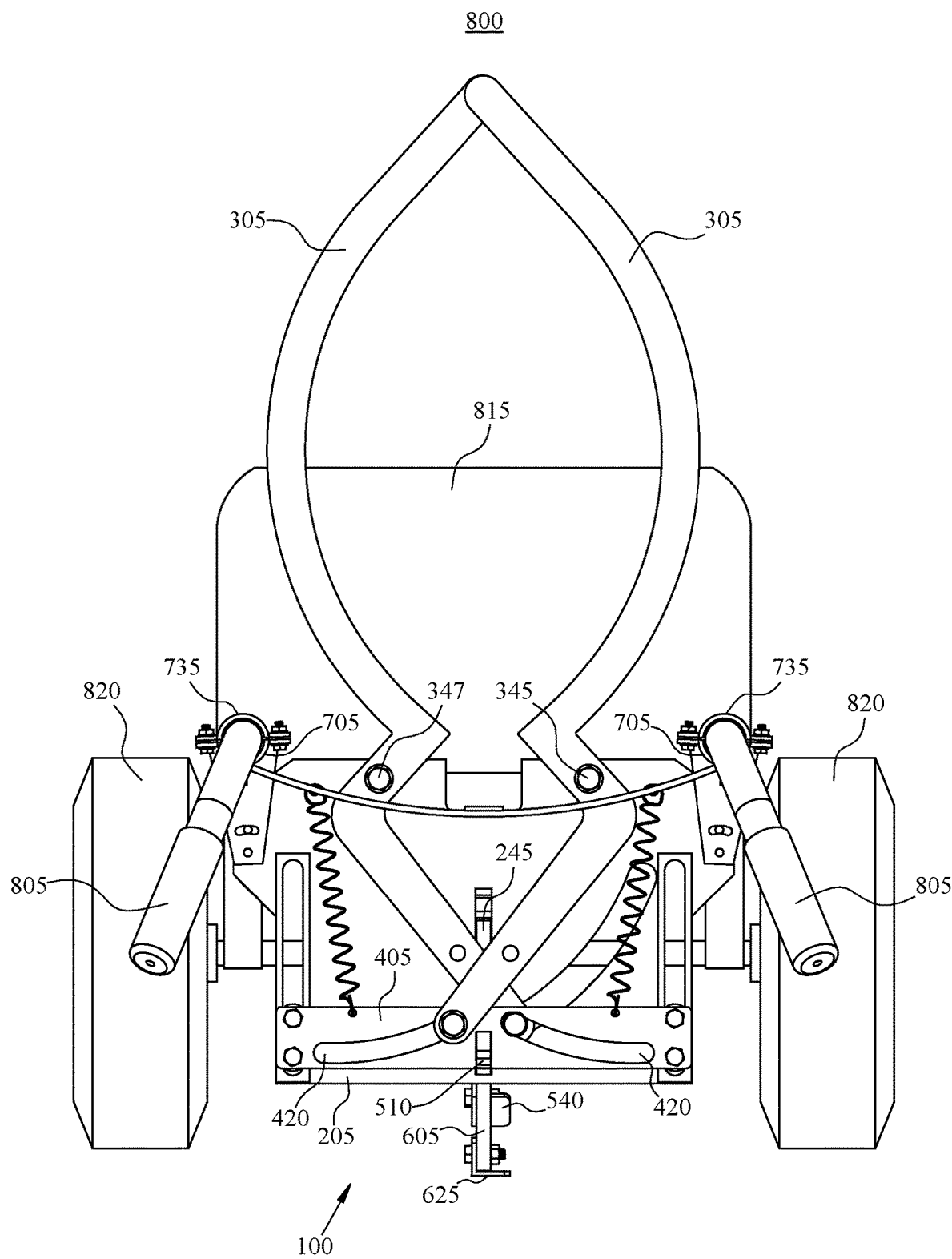
FIG. 3D shows a top plan view of the clasping stabilized hand truck in a closed state in accordance with one or more embodiments of the present invention.

FIG. 3A shows a front facing top-side perspective view of a clasping stabilized hand truck 800 in accordance with one or more embodiments of the present invention. Clasping stabilized hand truck 800 may include one or more handles 805, a plurality of longitudinal support members 810, that are typically tubular in shape, a plurality of transverse support members 812, a nose plate 815, and a plurality of wheels 820. The plurality of longitudinal support members 810 and transverse support members 812 form the wheeled frame of hand truck 800. A pair of clamping assemblies 700 may be used to secure clasping stability device 100 to a pair of longitudinal support members 810 of hand truck 800, at a desired height along the length of longitudinal support members 810. In this way, clasping stability device 100 may be disposed at a suitable height to accommodate the size or shape of the material (not shown) intended to be transported. Continuing, FIG. 3B shows a rear facing top-side perspective view of clasping stabilized hand truck 800 in accordance with one or more embodiments of the present invention. Because clasping stability device 100 includes controls disposed exclusively at the rear of device 100, a human operator (not shown) may fully operate hand truck 800 from the rear, without having to walk around to the front, or use straps (not shown), or ties (not shown). Continuing, FIG. 3C shows a top plan view of clasping stabilized hand truck 800 in an opened state and FIG. 3D shows a top plan view of clasping stabilized hand truck 800 in a closed state in accordance with one or more embodiments of the present invention.

Figure 4A:
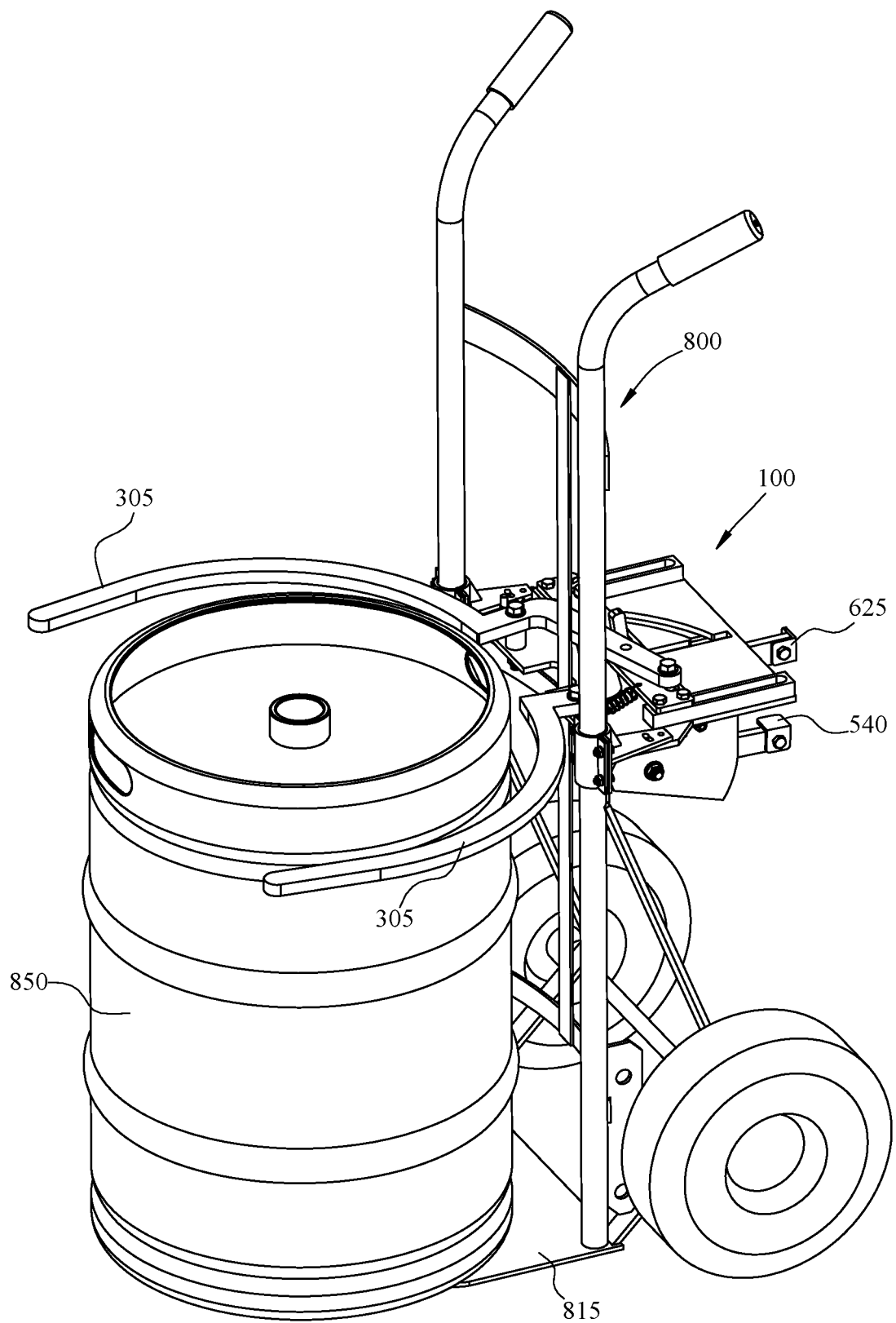
FIG. 4A shows a front facing top-side perspective view of a clasping stabilized hand truck in an opened state showing an environment of use in accordance with one or more embodiments of the present invention.
Figure 4B:
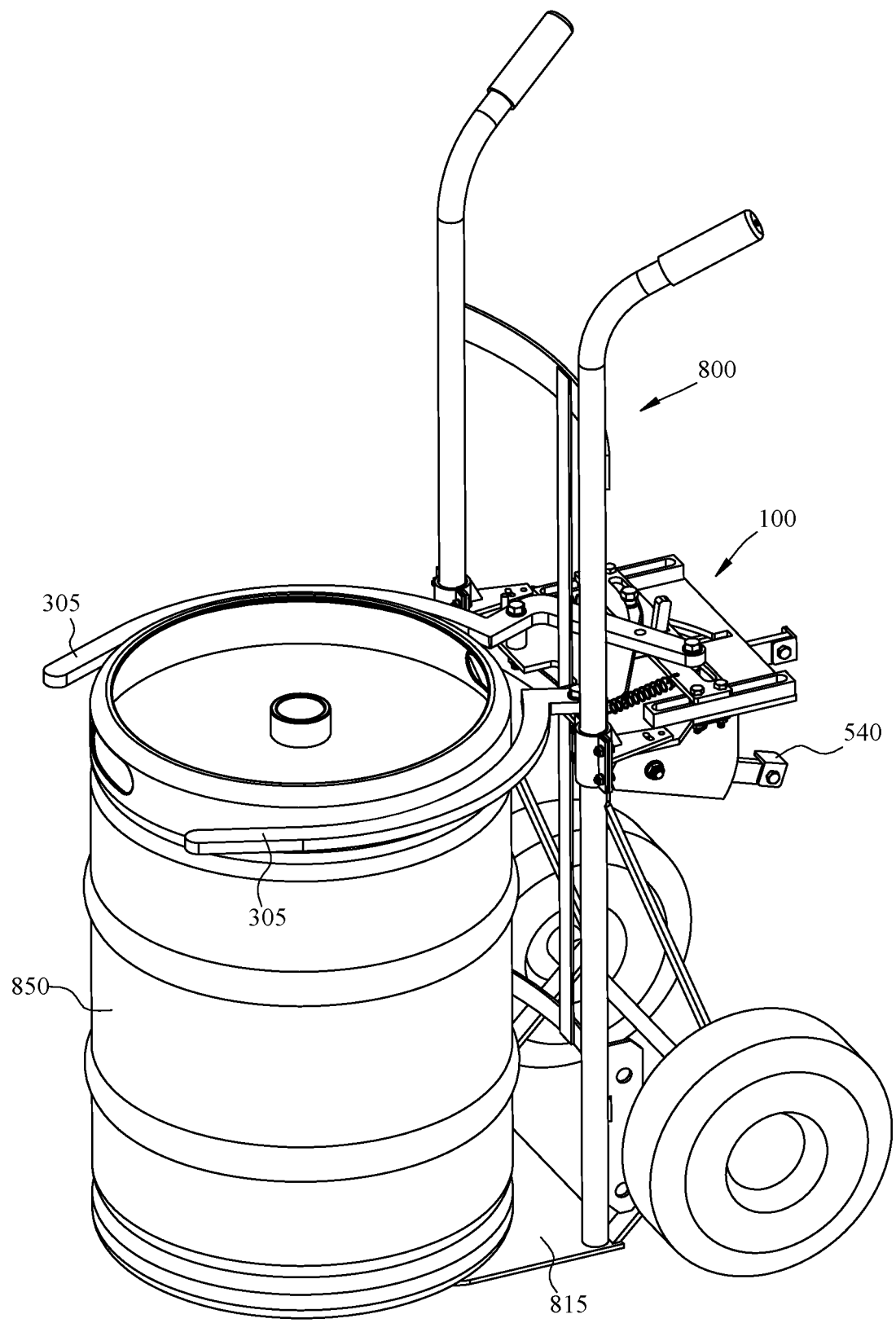
FIG. 4B shows a front facing top-side perspective view of the clasping stabilized hand truck in a closed state showing an environment of use in accordance with one or more embodiments of the present invention.

FIG. 4A shows a front facing top-side perspective view of a clasping stabilized hand truck 800 in an opened state showing an environment of use in accordance with one or more embodiments of the present invention. Hand trucks are commonly used to transport tanks and containers that have a substantially cylindrical shape. These tanks and containers may vary in size, shape, and weight, and often present stability and safety problems for transport. In one or more embodiments of the present invention, a clasping stabilized hand truck 800 may safely transport tanks and containers in a safe and secure manner that protects the safety of the operator as well as the environment. In operative use, the operator may wheel hand truck 800 into position (not shown) in front of a large container 850, with one or more hands on the one or more handles 805. Hand truck 800 may be positioned in front of container 850 and then, using a foot, the operator may wedge the nose plate 815 under container 850, while pushing hand truck 800 forward. Continuing, FIG. 4B shows a front facing top-side perspective view of clasping stabilized hand truck 800 in a closed state showing an environment of use in accordance with one or more embodiments of the present invention. Once container 850 is well positioned with respect to nose plate 815, the operator may use a foot to engage foot pedal 540 to close the clasping portion 305 of clasping arms 300 around container 850. Once sufficient closure is achieved, the operator may remove the foot from foot pedal 540, and pedal latch 605 may automatically latch pedal arm 505 into place, securing the degree of closure of clasping arms 300 and providing stable support for container 850. Container 350 is now substantially supported such that it may be stably and securely transported from source to destination. Advantageously, the operator may perform all of these operations from the rear of hand truck 800, without having to walk to the front of hand truck 800, and without the use of straps (not shown) or ties (not shown).

Figure 5A:
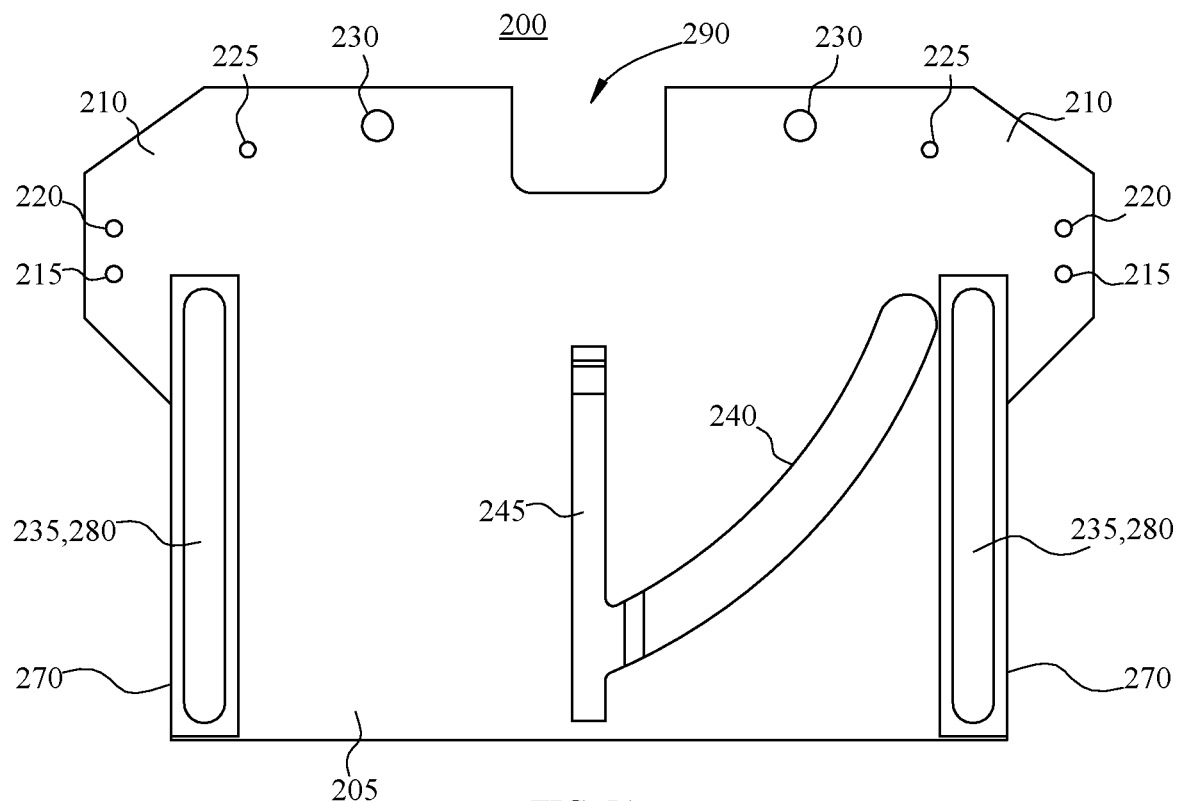
FIG. 5A shows a top plan view of a base plate assembly of a clasping stability device in accordance with one or more embodiments of the present invention.
Figure 5B:
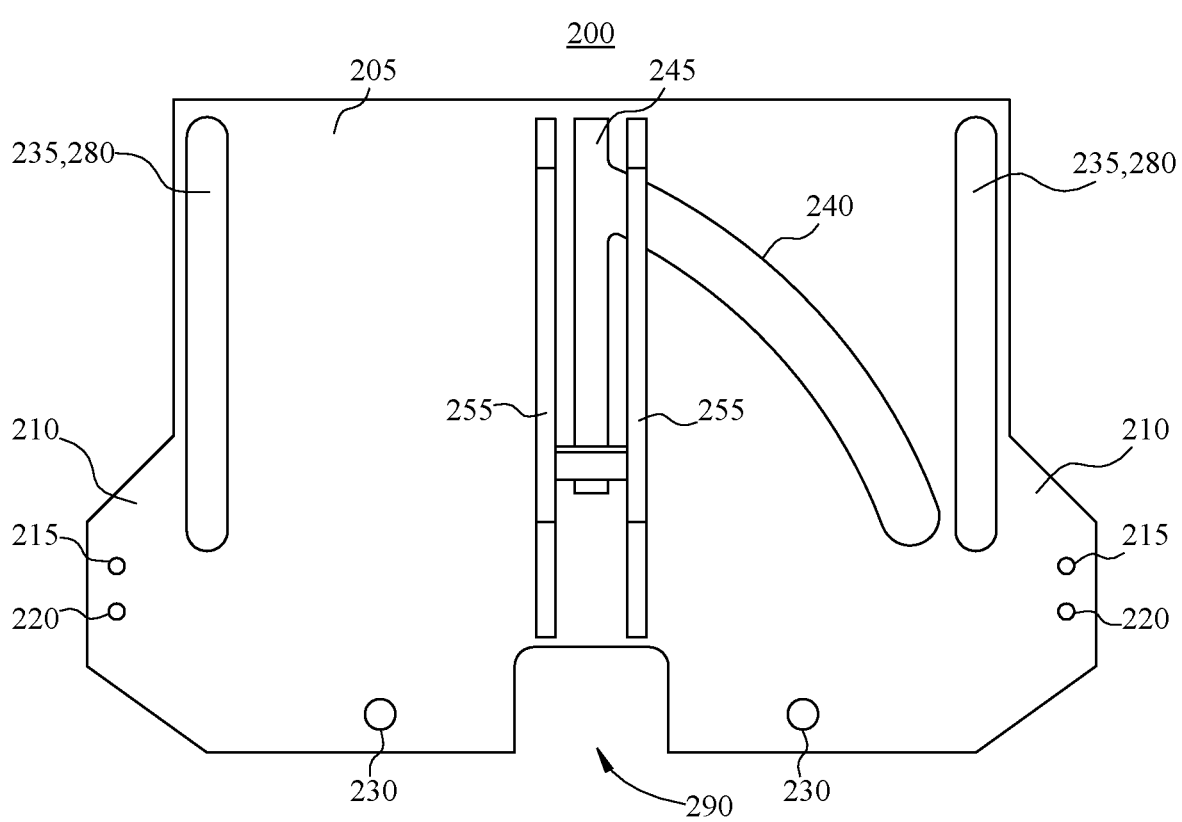
FIG. 5B shows a bottom plan view of the base plate assembly of the clasping stability device in accordance with one or more embodiments of the present invention.

FIG. 5A shows a top plan view of a base plate assembly 200 of a clasping stability device 100 in accordance with one or more embodiments of the present invention. Base plate assembly 200 includes base plate 205, a plurality of actuator travel positioner receivers 270 disposed on a top side of base plate 205, and a plurality of pedal mounting plates (255, not shown in this view) disposed on a bottom side of base plate 205. Base plate 205 may also include a flared portion 210 to support clamping assemblies (700, not shown in this view). Base plate 205 may include, for each clamping assembly (e.g., 700) a rear mounting hole 215 and an adjustment mounting hole 220. Base plate 205 may also include a plurality of spring mounting posts 225, and a plurality of pivoting attachment holes 230 for attachment of the clasping arms (e.g., 300). The plurality of actuator travel positioner receivers 270 may include a trave cutout 280 that extends through to a corresponding travel cutout 235 formed in base plate 205. Base plate 205 may include an arcuate travel cutout 240 for a lower clasping arm (e.g., 300) and a travel cutout for the actuating portion (e.g., 510) of the pedal arm (e.g., 500). Continuing, FIG. 5B shows a bottom plan view of the base plate assembly 200 of the clasping stability device 100 in accordance with one or more embodiments of the present invention. Base plate 205 includes a plurality of pedal mounting plates 255 disposed on the bottom-side of base plate 205. In certain embodiments, base plate 205 may be composed of stainless steel. In other embodiments, base plate 205 may be composed of carbon steel. In still other embodiments, base plate 205 may be composed of aluminum. In still other embodiments, base plate 205 may be composed of any other metal or alloy. In still other embodiments, base plate 205 may be composed of plastic, composites, or any other lightweight material. One of ordinary skill in the art will recognize that the composition of material used to form base plate 205 may vary in accordance with one or more embodiments of the present invention.

Figure 5C:
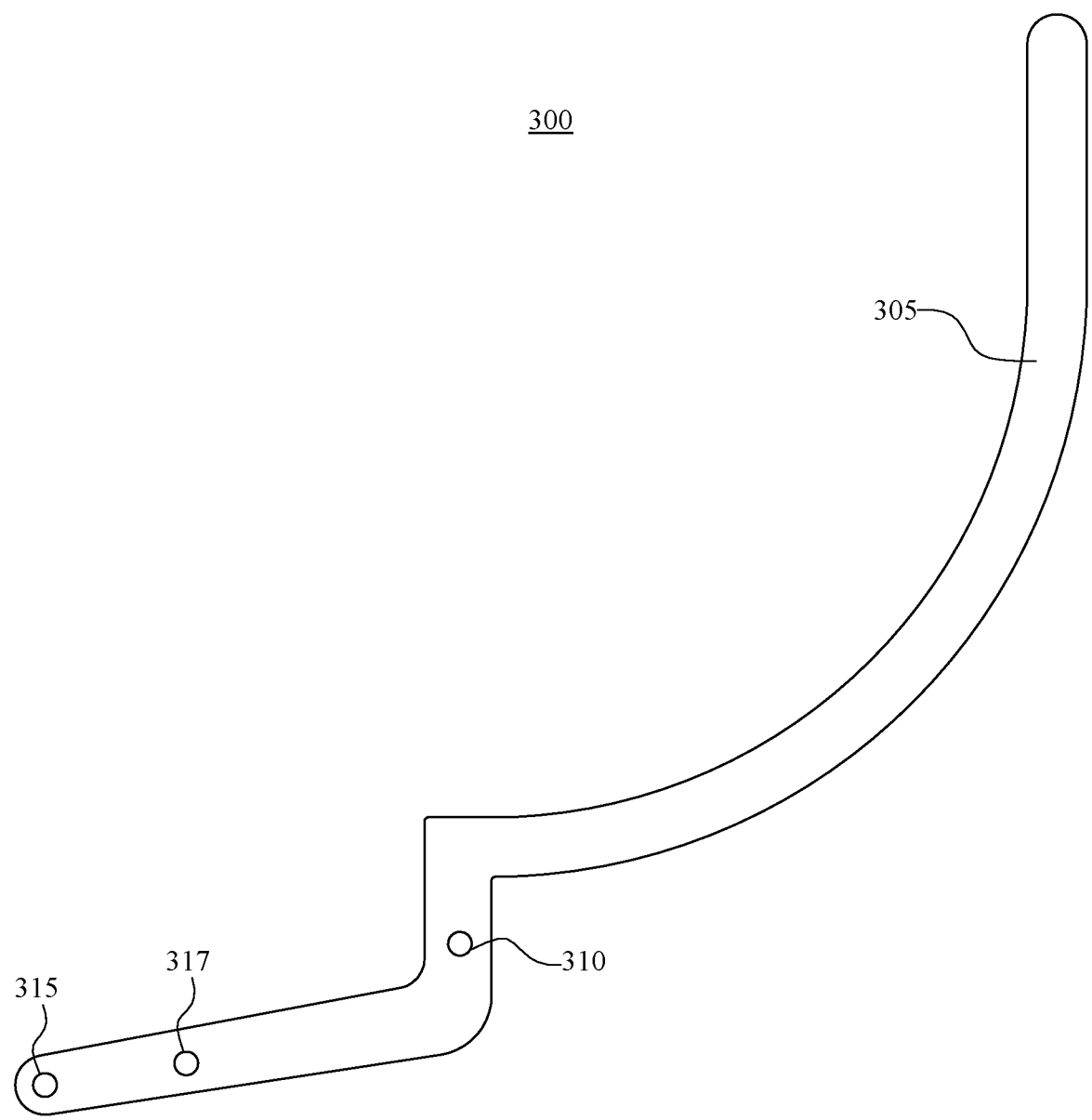
FIG. 5C shows a top plan view of a clasping arm of the clasping stability device in accordance with one or more embodiments of the present invention.

FIG. 5C shows a top plan view of a clasping arm 300 of a clasping stability device 100 in accordance with one or more embodiments of the present invention. Clasping arm assembly 300 includes a clasping portion 305, a pivoting attachment portion 310, a rotating attachment portion 315, an optional rotating attachment portion 317. Each of pivoting attachment portion 310, rotating attachment portion 315, and optional rotating attachment portion 317 may comprise a corresponding mounting hole for assembly. Clasping arm assembly 300 may also include bolts, washers, and nuts required for assembly that are not shown in this view. In certain embodiments, clasping arm 300 may be composed of stainless steel. In other embodiments, clasping arm 300 may be composed of carbon steel. In still other embodiments, clasping arm 300 may be composed of aluminum. In still other embodiments, clasping arm 300 may be composed of any other metal or alloy. In still other embodiments, clasping arm 300 may be composed of plastic, composites, or any other lightweight material. One of ordinary skill in the art will recognize that the composition of material used to form clasping arm 300 may vary in accordance with one or more embodiments of the present invention.

Figure 5D:
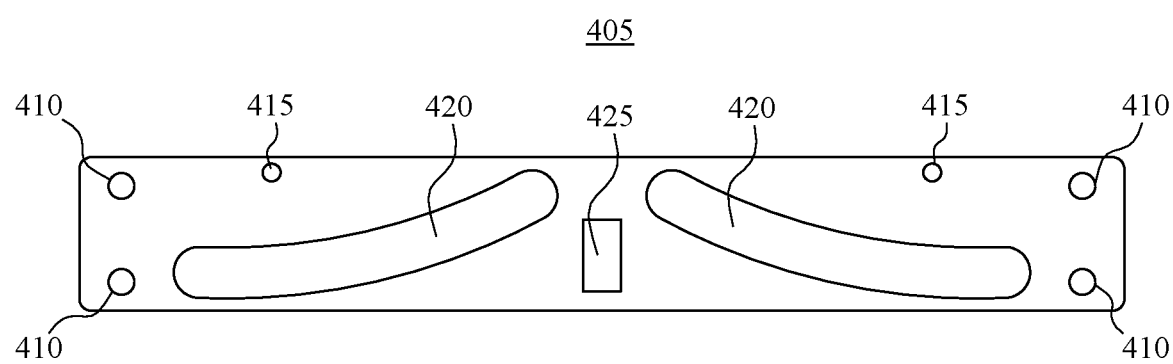
FIG. 5D shows a top plan view of an actuator plate of the clasping stability device in accordance with one or more embodiments of the present invention.

FIG. 5D shows a top plan view of an actuator plate 405 of the clasping stability device 100 in accordance with one or more embodiments of the present invention. Actuator plate 405 may include a plurality of mounting holes 410 for one or more actuator travel positioners (435, not shown), a plurality of mounting holes 415 for attachment of a bias spring (285, not shown), a plurality of arcuate travel cutouts 420 for travel of the clasping arms (300, not shown), and a cutout 425 for the actuating portion (510, not shown) of the pedal arm (500, not shown). In certain embodiments, actuator plate 405 may be composed of stainless steel. In other embodiments, actuator plate 405 may be composed of carbon steel. In still other embodiments, actuator plate 405 may be composed of aluminum. In still other embodiments, actuator plate 405 may be composed of any other metal or alloy. In still other embodiments, actuator plate 405 may be composed of plastic, composites, or any other lightweight material. One of ordinary skill in the art will recognize that the composition of material used to form actuator plate 405 may vary in accordance with one or more embodiments of the present invention.

Figure 5E:
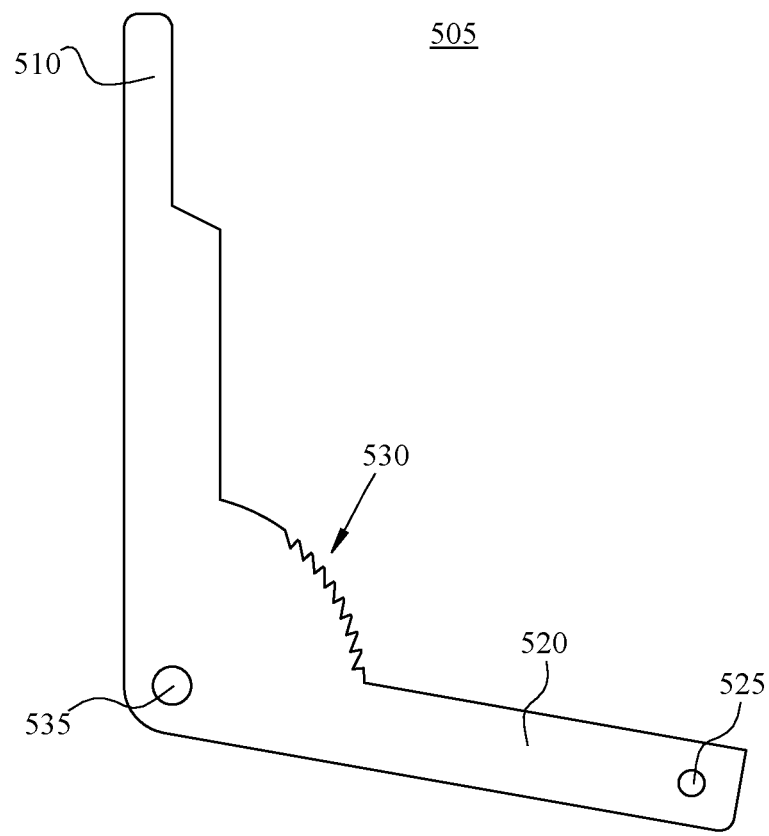
FIG. 5E shows a right-side elevation view of a pedal arm of the clasping stability device in accordance with one or more embodiments of the present invention.

Continuing, FIG. 5E shows a right-side elevation view of a pedal arm 505 of the clasping stability device 100 in accordance with one or more embodiments of the present invention. Pedal arm 505 may include an engagement portion 520, a pivot attachment portion 535 corresponding to a mounting hole, an index latch track 530, and an actuating portion 510. Index latch track 530 may include a plurality of stairs disposed in an arcuate pattern about the pivot point of pivoting attachment portion 535. A foot pedal (540, not shown) may be removable attached to mounting hole 525 of pedal arm 505, for operator use. In certain embodiments, pedal arm 505 may be composed of stainless steel. In other embodiments, pedal arm 505 may be composed of carbon steel. In still other embodiments, pedal arm 505 may be composed of aluminum. In still other embodiments, pedal arm 505 may be composed of any other metal or alloy. In still other embodiments, pedal arm 505 may be composed of plastic, composites, or any other lightweight material. One of ordinary skill in the art will recognize that the composition of material used to form a pedal arm 505 may vary in accordance with one or more embodiments of the present invention.

Figure 5F:
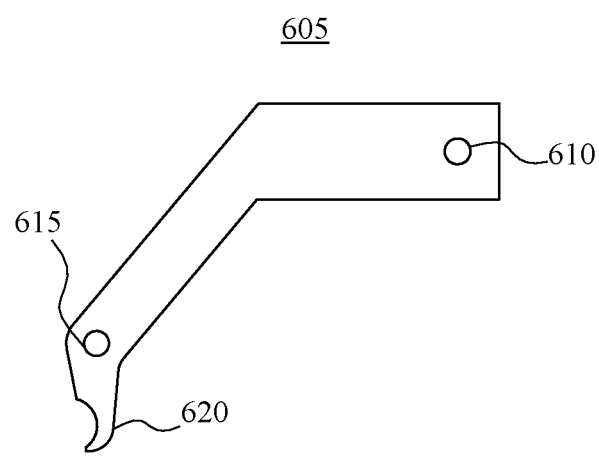
FIG. 5F shows a right-side elevation view of a pedal latch of the clasping stability device in accordance with one or more embodiments of the present invention.

FIG. 5F shows a right-side elevation view of a pedal latch 605 of the clasping stability device 100 in accordance with one or more embodiments of the present invention. Pedal latch 605 may include a release portion 610, a pivot attachment portion 615 corresponding to a mounting hole, and an index latch 620. Index latch 620 may have a complimentary shape to that of the index latch track (530, not shown) of the pedal arm (505, not shown). In certain embodiments, pedal latch 605 may be composed of stainless steel. In other embodiments, pedal latch 605 may be composed of carbon steel. In still other embodiments, pedal latch 605 may be composed of aluminum. In still other embodiments, pedal latch 605 may be composed of any other metal or alloy. In still other embodiments, pedal latch 605 may be composed of plastic, composites, or any other lightweight material. One of ordinary skill in the art will recognize that the composition of material used to form a pedal latch 605 may vary in accordance with one or more embodiments of the present invention.

One of ordinary skill in the art will recognize that one or more of the components of clasping stability device 100 may be scaled to create a clasping stability device suitable for any specific application in accordance with one or more embodiments of the present invention. In addition, one of ordinary skill in the art will recognize that one or more components of clasping stability device 100 may be composed of alternative materials to achieve one or more goals of a specific application in accordance with one or more embodiments of the present invention. For example, certain components that come into contact with material may be composed of aluminum so as to minimize the risk of sparking when handling chemical, flammable, or hazardous materials.

Figure 6A:
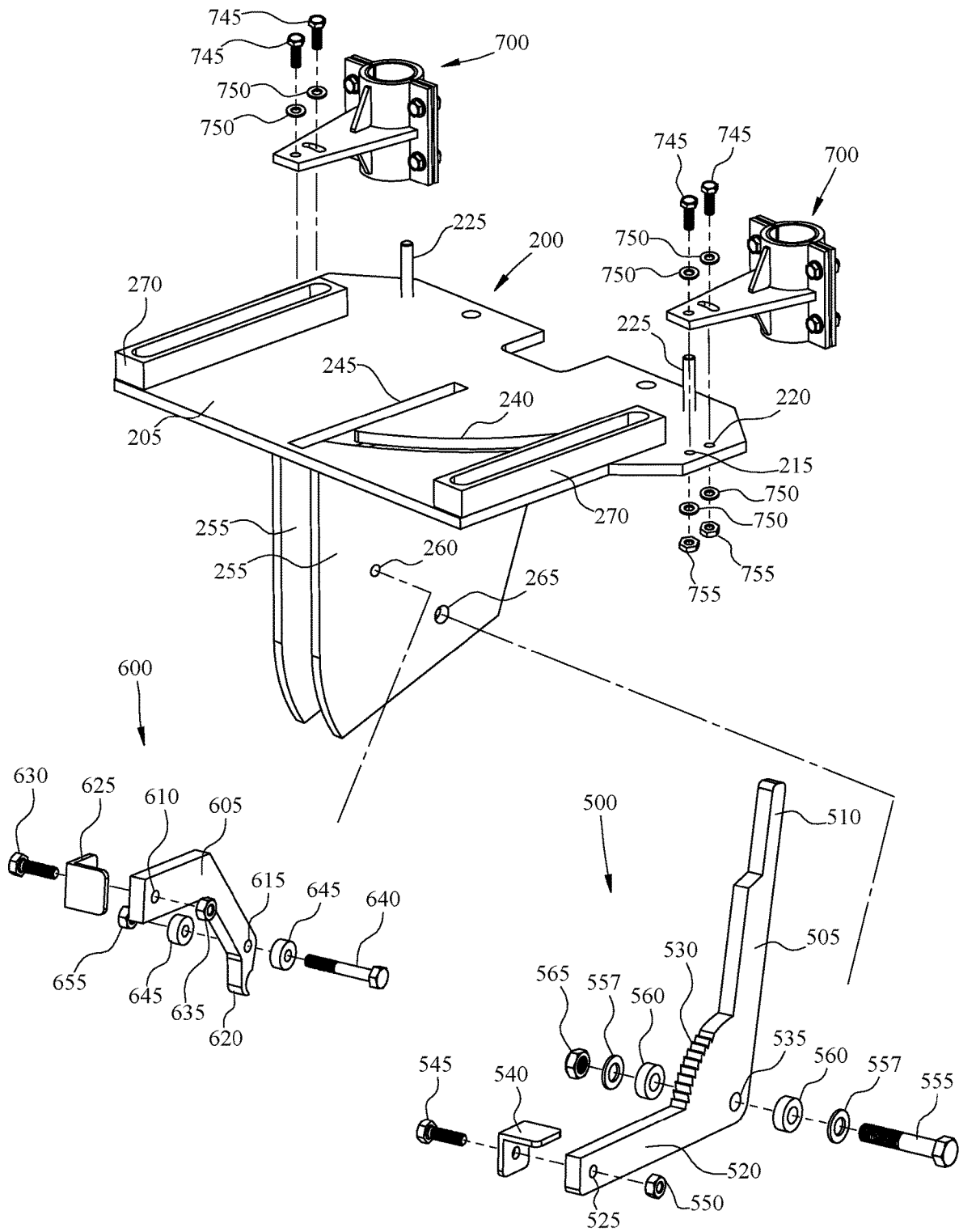
FIG. 6A shows assembly of a portion of a clasping stability device in accordance with one or more embodiments of the present invention.

FIG. 6A shows assembly of a portion of a clasping stability device 100 in accordance with one or more embodiments of the present invention. A foot pedal 625 may be attached to release portion 610 of pedal latch 605 by a bolt 630 that extends through a mounting hole of foot pedal 625 and mounting hole 610 of pedal latch 605 and secured in place by nut 635. Pedal latch 605 may be disposed in between pedal mounting plates 255 of base plate 205. Pivoting attachment portion 615 may be aligned with mounting holes 260 of pedal mounting plates 255. A plurality of spacers 640 may be disposed on both sides of pivoting attachment portion 615 of pedal latch 605, within pedal mounting plates 255. A bolt 640 may be disposed through mounting hole 260 of pedal mounting plate 255, spacer 645, pivoting attachment portion 615 of pedal latch 605, spacer 645, mounting hole 260 of pedal mounting plate 255, and secured in place by nut 655. Similarly, a foot pedal 540 may be attached to engagement portion 520 of pedal arm 505 by a bolt 545 that extends through a mounting hole of pedal 540 and mounting hole 525 of pedal arm 505 and secured in place by nut 550. Pedal arm 505 may be disposed in between pedal mounting plates 255 of base plate 205, under pedal latch 605. Actuating portion 510 may be disposed through cutout 245 of base plate 205 and pivoting attachment portion 535 may be aligned with mounting holes 265 of pedal mounting plates 255. A plurality of spacers 560 may be disposed on both sides of pivoting attachment portion 535 of pedal arm 505. A bolt 555 may be disposed through washer 557, mounting hole 265 of mounting plate 255, spacer 560, pivoting attachment portion 535 of pedal arm 505, spacer 560, mounting hole 265 of mounting plate 255, washer 557, and secured in place by nut 565.

Figure 6B:
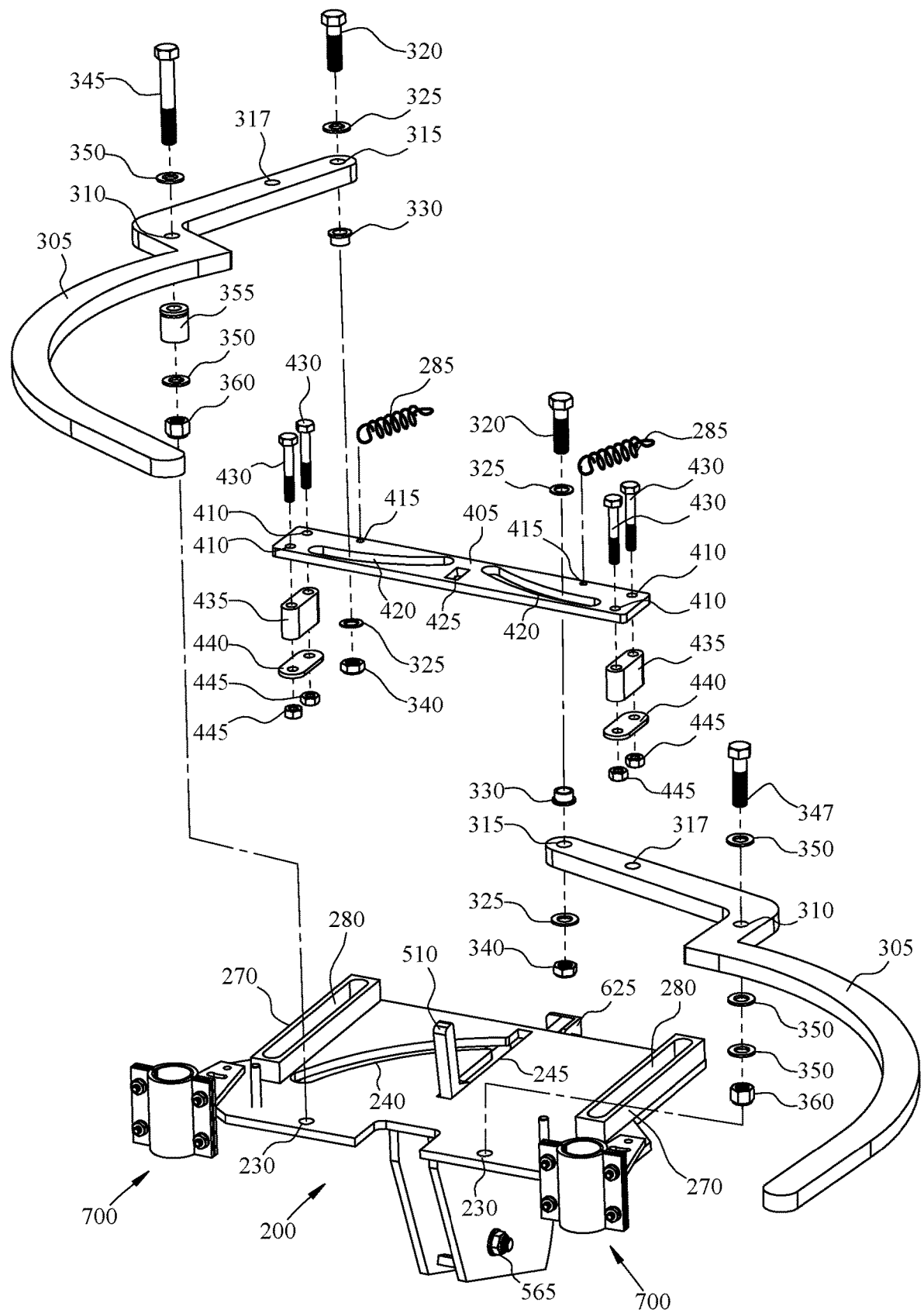
FIG. 6B shows assembly of a portion of the clasping stability device in accordance with one or more embodiments of the present invention.

Continuing, FIG. 6B shows assembly of a portion of the clasping stability device 100 in accordance with one or more embodiments of the present invention. Rotating attachment portion 315 of upper clasping arm 305 may be attached to a top side of actuator plate 405. Bolt 320 may be disposed through washer 325, rotating attachment portion 315 of clasping arm 305, arcuate travel cutout 420 of actuator plate 405, spacer 330, washer 325, and secured by nut 340. Pivoting attachment portion 310 of upper clasping arm 305 may be attached to a top side of base plate 205. Bolt 345 may be disposed through washer 350, pivoting attachment portion 310, spacer 355, mounting hole 230 of base plate 205, washer 350, and secured in place by nut 360. Similarly, rotating attachment portion 315 of lower clasping arm 305 may be attached to a bottom side of actuator plate 405. Bolt 320 may be disposed through washer 325, arcuate travel cutout 420 of actuator plate 405, spacer 330, rotating attachment portion 315 of clasping arm 305, arcuate travel cutout 240 of base plate 205, washer 325 and secured in place by nut 340. Pivoting attachment portion 310 of lower clasping arm 305 may be attached to a top side of base plate 205. Bolt 347 may be disposed through washer 350, pivoting attachment portion 310 of clasping arm 300, washer 350, mounting hole 230 of base plate 205, washer 350, and secured in place by nut 360. For each actuator travel positioner 435, a plurality of bolts 430 may be disposed through mounting holes 410 of actuator plate 405 and through actuator travel positioner 435 itself Actuator travel positioner 435 may be placed within travel cutout 280 of actuator travel positioner receiver 270 of base plate 205, and a washer 440 may be disposed under the corresponding travel cutout 235 of base plate 205, and bolts 430 may be secured in place with nuts 445. Washer 440 may have a size that prevents it from fitting into travel cutouts 235 of base plate 205 or travel cutout 280 of actuator travel positioner receiver 270. A first end of a bias spring 285 may be removably attached to spring mounting hole 415 of actuator plate 405 and a second end of bias spring 285 may be removably attached to spring mounting post 225 of base plate 205.

Figure 6C:
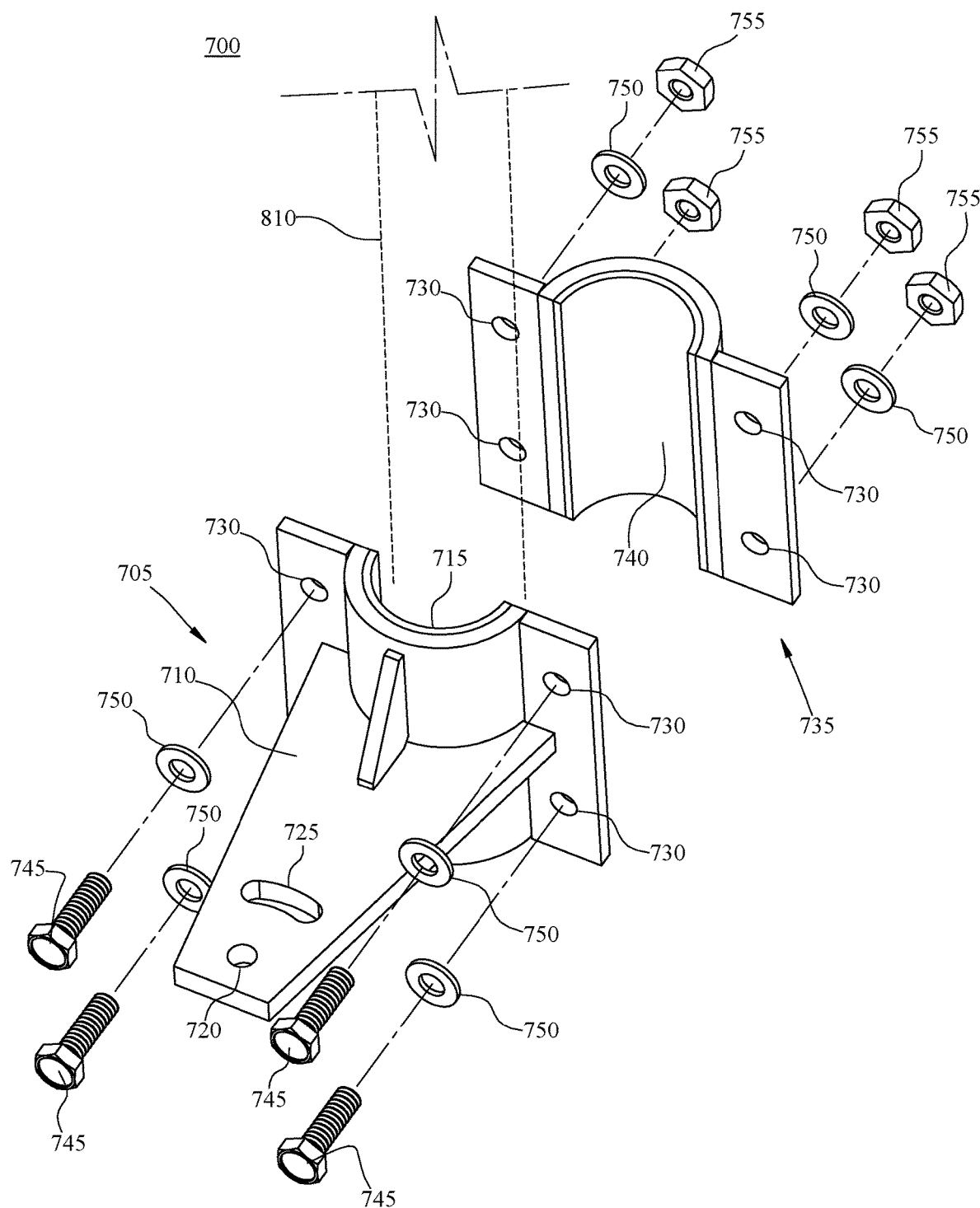
FIG. 6C shows assembly of a portion of the clasping stability device in accordance with one or more embodiments of the present invention.

Continuing, FIG. 6C shows assembly of a portion of the clasping stability device 100 in accordance with one or more embodiments of the present invention. A plurality of clamping assemblies 700 may be used to secure a clasping stability device 100 to a hand truck (not shown). Each clamping assembly 700 may include a rear portion 705 that is removably attached to a front portion 735 around a tubular such as a longitudinal support member 810 of a hand truck (not shown). A plurality of bolts 745 may be disposed through washer 750, mounting hole 730 of rear portion 705, mounting hole 730 of front portion 735, washer 750, and secured in place by a plurality of nuts 755. Each clamping assembly 700 may be removably attached to the base plate (205, not shown) by a bolt, washer, and nut (not shown) through rear mounting hole 720. Adjustment mounting hole 725 may be used to adjust the positioning of clamping assembly 700 to fit a particular hand truck (not shown). The arcuate shape of adjustment mounting hole 725 allows the clamping assembly 700 to pivot on the rear mounting hole 720 and adjust the spacing between clamping assemblies 700.

In one or more embodiments of the present invention, a clasping stability device may be directly mounted onto a transverse supporting member of a hand truck. In such embodiments, the base plate of the clasping stability device is directly mounted to the transverse supporting member and there is no need for clamping assemblies.

Figure 7A:
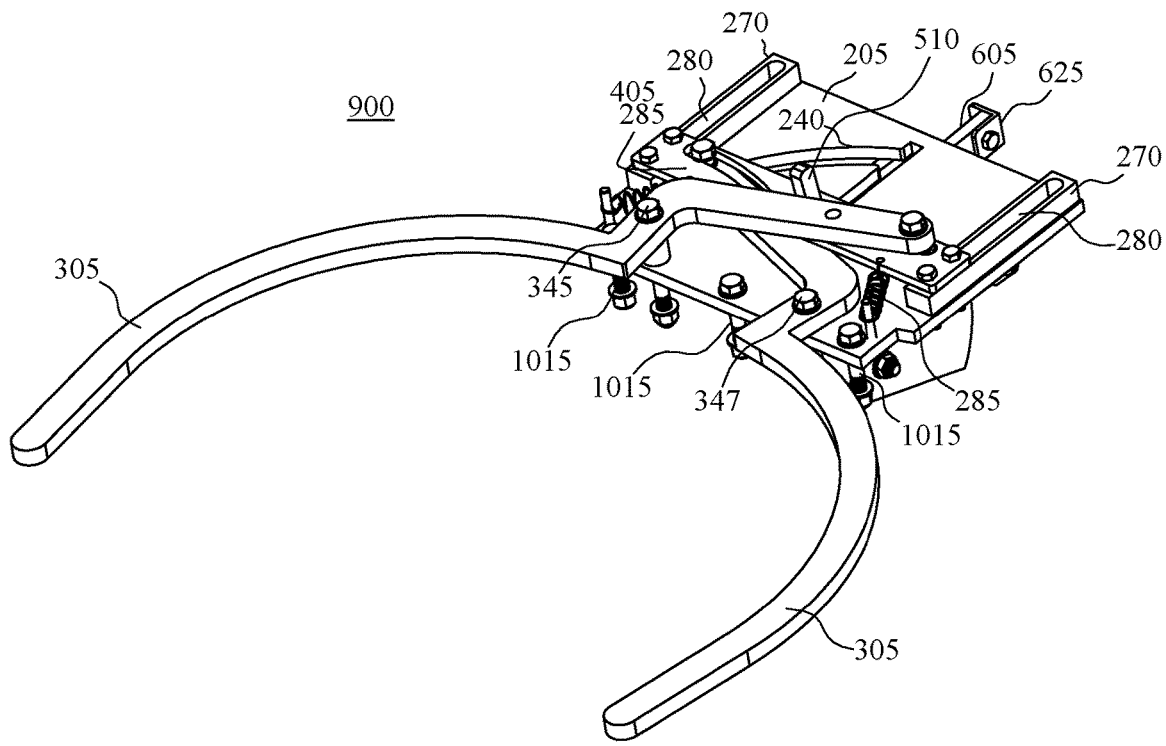
FIG. 7A shows a front facing top-side perspective view of a clasping stability device in accordance with one or more embodiments of the present invention.
Figure 7B:
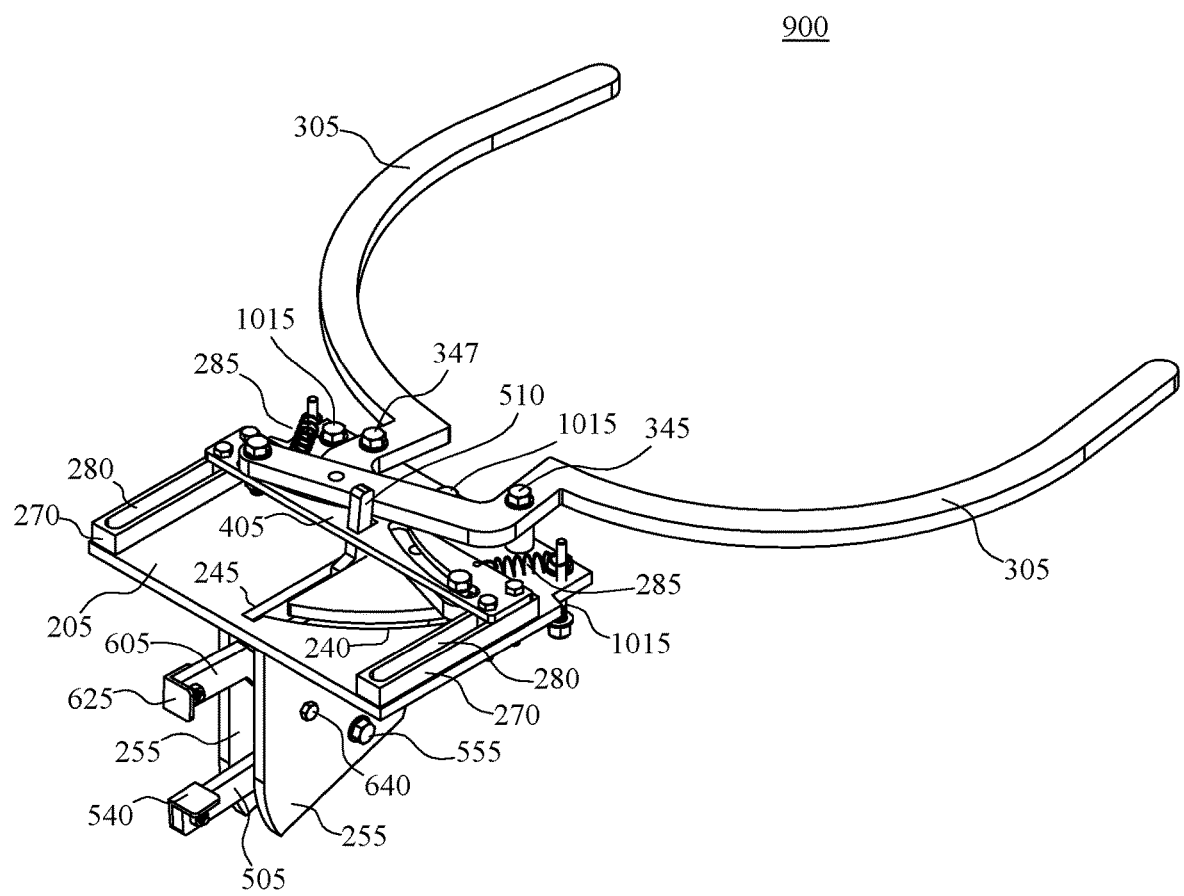
FIG. 7B shows a rear facing top-side perspective view of the clasping stability device in accordance with one or more embodiments of the present invention.
Figure 7C:
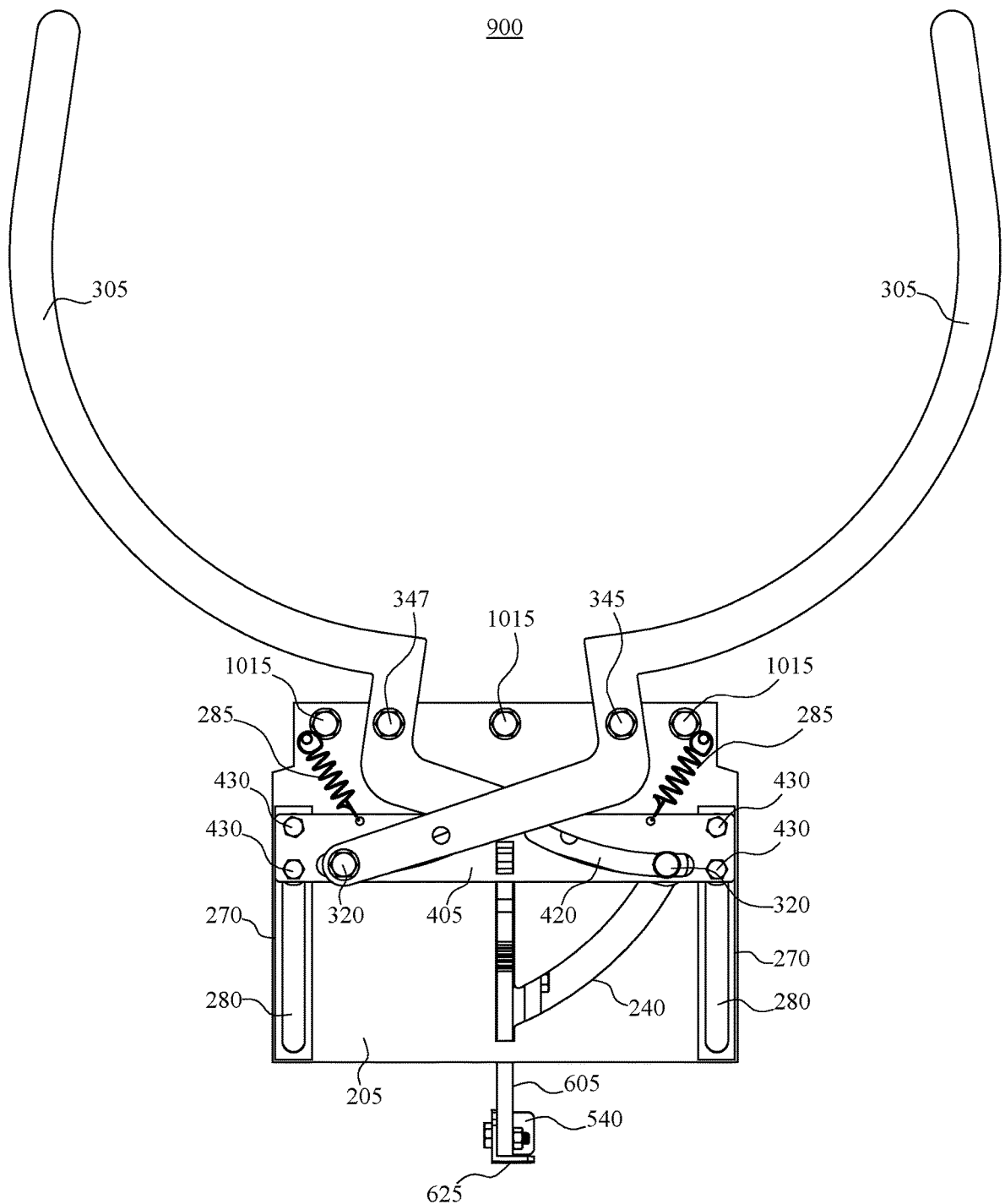
FIG. 7C shows a top plan view of a clasping stability device in an opened state in accordance with one or more embodiments of the present invention.
Figure 7D:
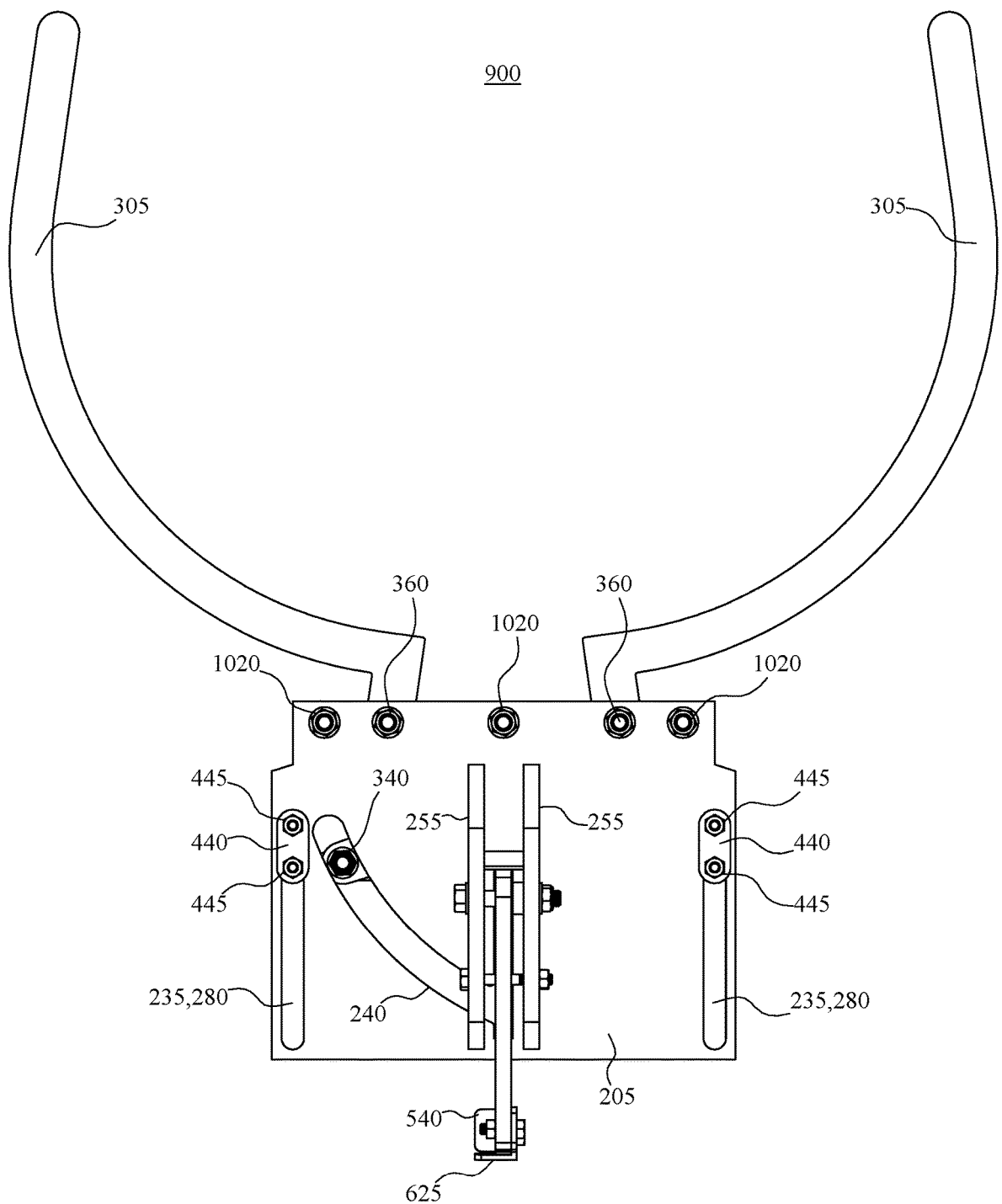
FIG. 7D shows a bottom plan view of the clasping stability device in the opened state in accordance with one or more embodiments of the present invention.

FIG. 7A shows a front facing top-side perspective view of a clasping stability device 900 in accordance with one or more embodiments of the present invention. Clasping stability device 900 includes a plurality of direct mounting holes (1010, not shown) disposed on a front portion of base plate 205 for directly mounting clasping stability device 900 to a transverse support member (not shown) of a hand truck (not shown). Clasping stability device 900 may be substantially the same as clasping stability device 100 previously disclosed, with the only substantive difference being the use of direct mounting through the base plate 205 rather than using clamping assemblies (e.g., 700 of clasping stability device 100). Continuing, FIG. 7B shows a rear facing top-side perspective view of clasping stability device 900 and in accordance with one or more embodiments of the present invention. Continuing, FIG. 7C shows a top plan view of clasping stability device 900 in an opened state in accordance with one or more embodiments of the present invention. In this view, a plurality of mounting bolts 1015 that may be used to directly mount clasping stability device 900 to a transverse support member (not shown) of a hand truck (not shown) are shown instead of clamping assemblies (e.g., 700 of clasping stability device 100). Continuing, FIG. 7D shows a bottom plan view of clasping stability device 900 in the disengaged state in accordance with one or more embodiments of the present invention. In this view, a plurality of nuts 1020 for mounting bolts 1015, typically disposed under a transverse support member (not shown) of a hand truck (not shown) are shown for purposes of illustration only.

Figure 8A:
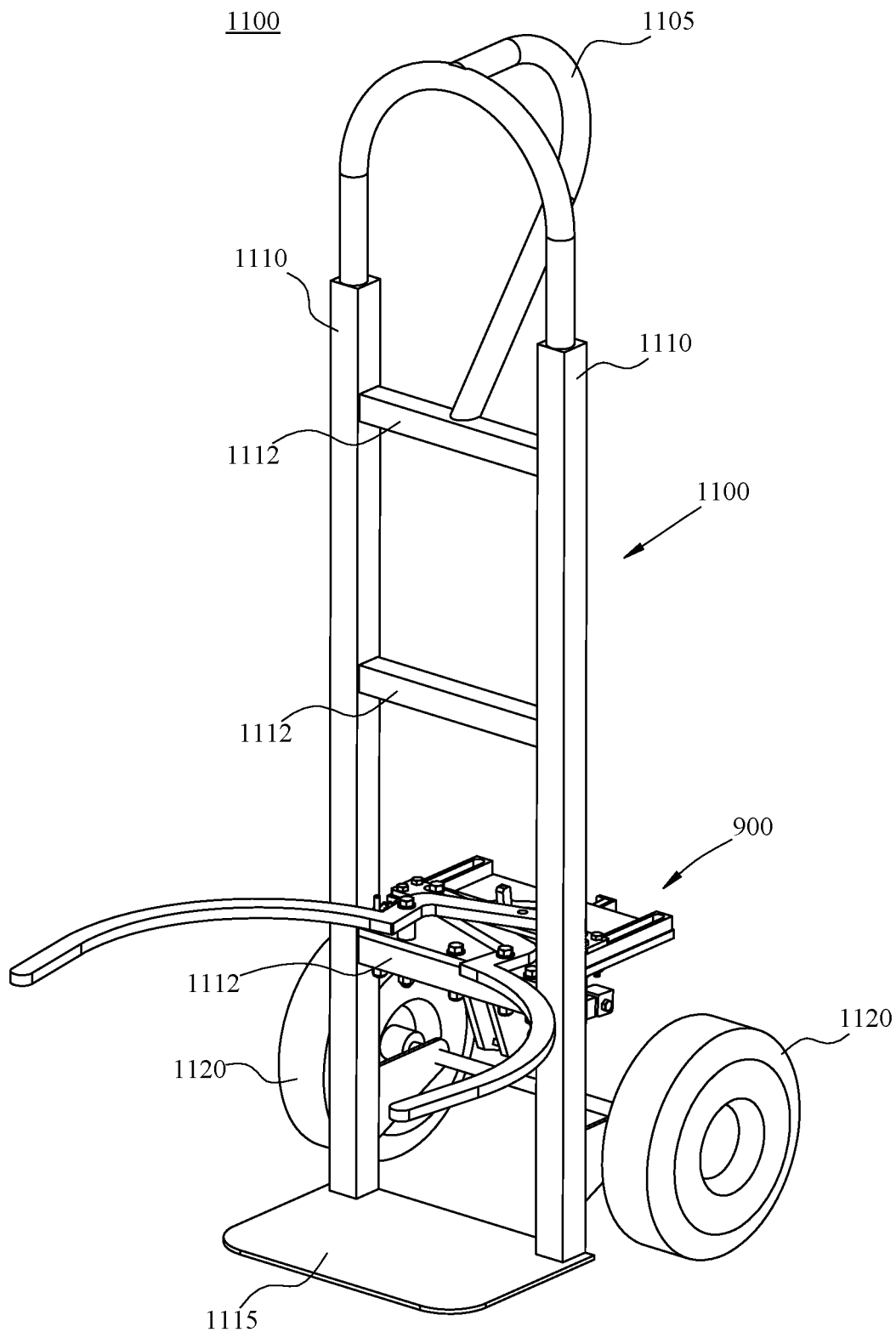
FIG. 8A shows a front facing top-side perspective view of a clasping stabilized hand truck in an opened state in accordance with one or more embodiments of the present invention.
Figure 8B:
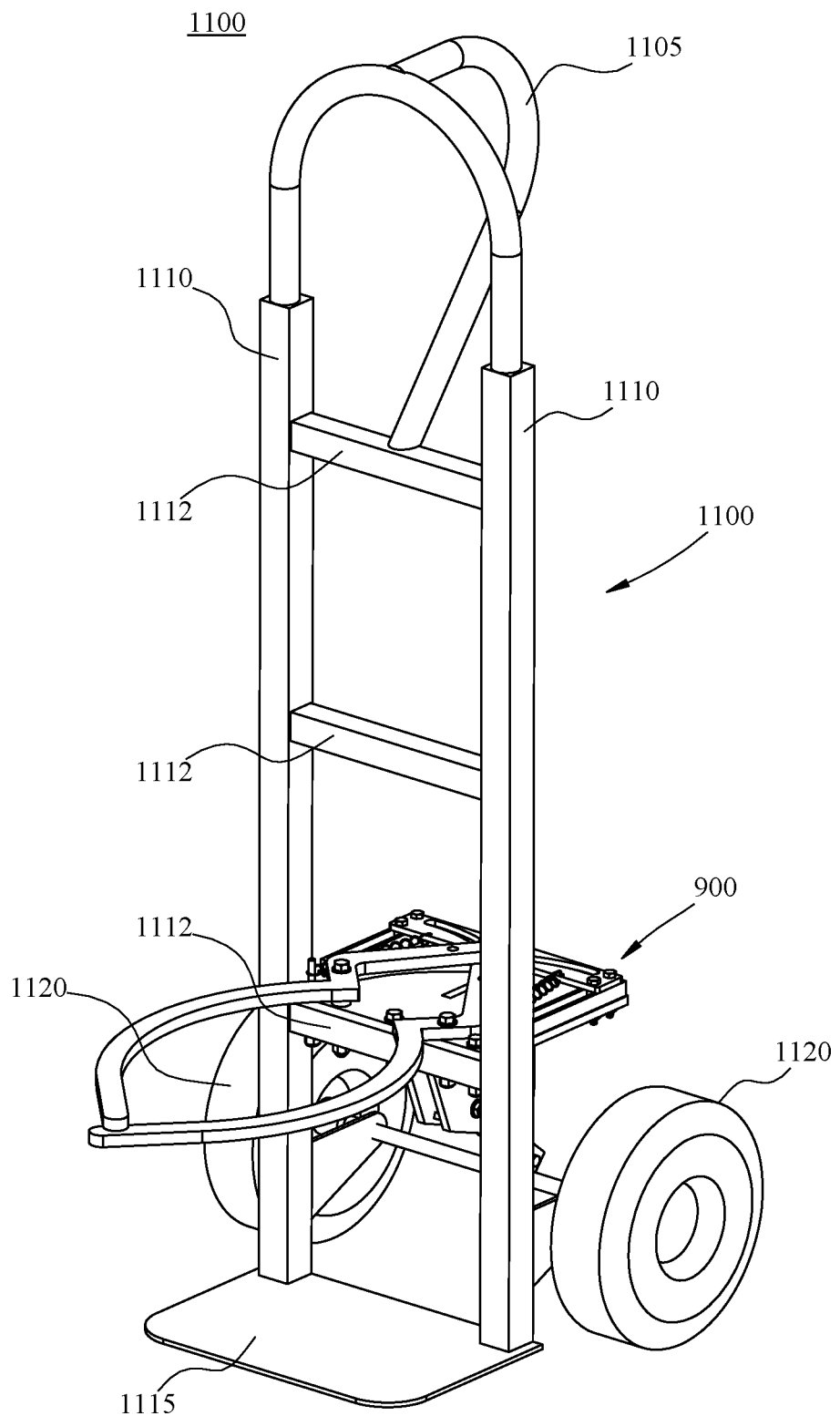
FIG. 8B shows a front facing top-side perspective view of the clasping stabilized hand truck in a closed state in accordance with one or more embodiments of the present invention.
Figure 8C:
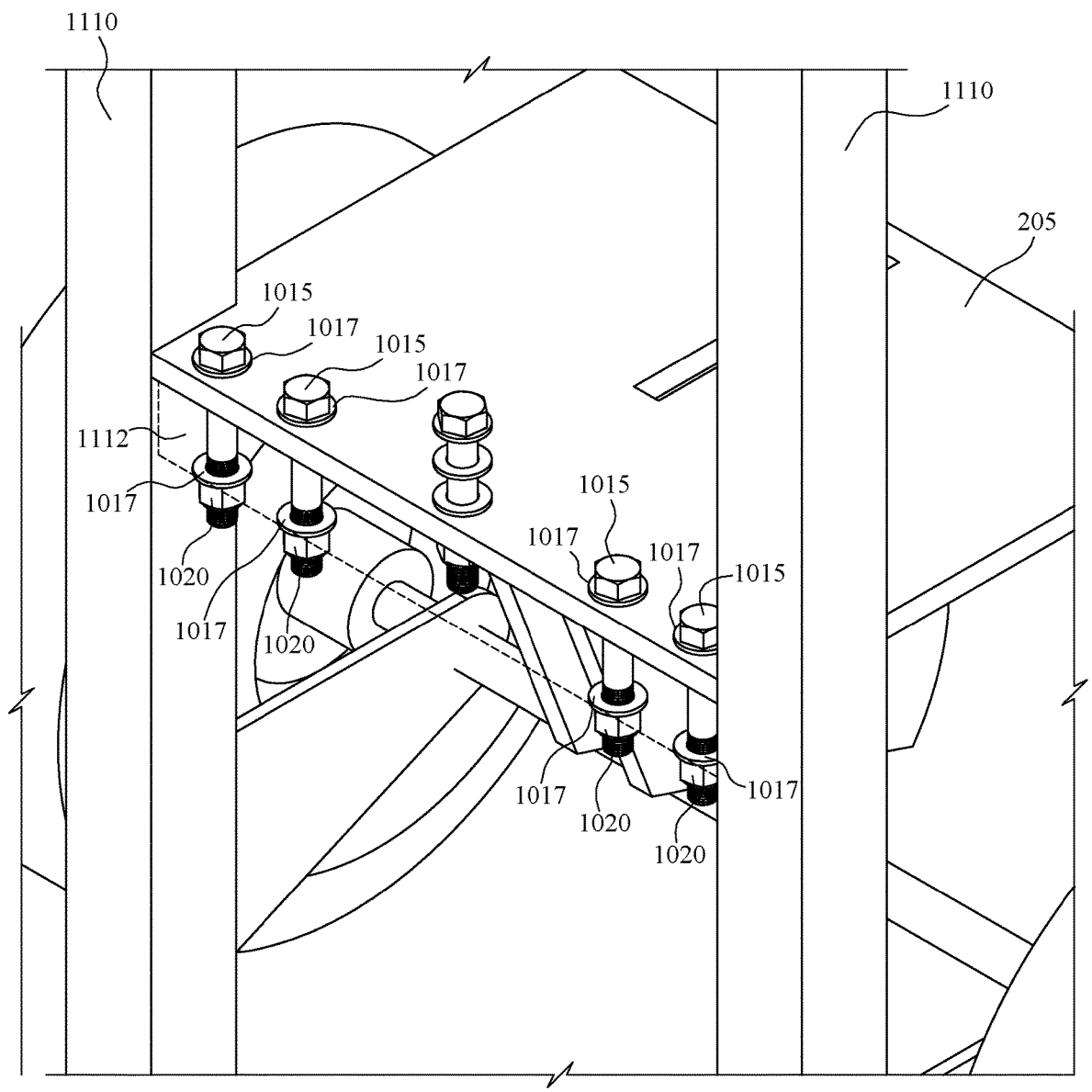
FIG. 8C shows a detail view of the attachment of the clasping stability device to the hand truck in accordance with one or more embodiments of the present invention.

FIG. 8A shows a front facing top-side perspective view of a clasping stabilized hand truck 1100 in an opened state in accordance with one or more embodiments of the present invention. Clasping stabilized hand truck 1100 may include a handle 1105, a plurality of longitudinal support members 1110, a plurality of transverse support members 1112, a nose plate 1115, and a plurality of wheels 1120. A clasping stability device 900 may be removably attached to hand truck 1100 by a plurality of bolts that directly attach clasping stability device 900 to a transverse support member 1112. Continuing, FIG. 8B shows a front facing top-side perspective view of clasping stabilized hand truck 1100 in a closed state in accordance with one or more embodiments of the present invention. Continuing, FIG. 8C shows a detail view of the direct attachment of clasping stability device 900 to hand truck 1100 in accordance with one or more embodiments of the present invention. A bolt 1015 may be disposed through a washer 1017, a mounting hole 1010 of base plate 205, a mounting hole (not shown) drilled in transverse support member 1112, a washer 1017, and secured in place with nut 1020.

Figure 9A:
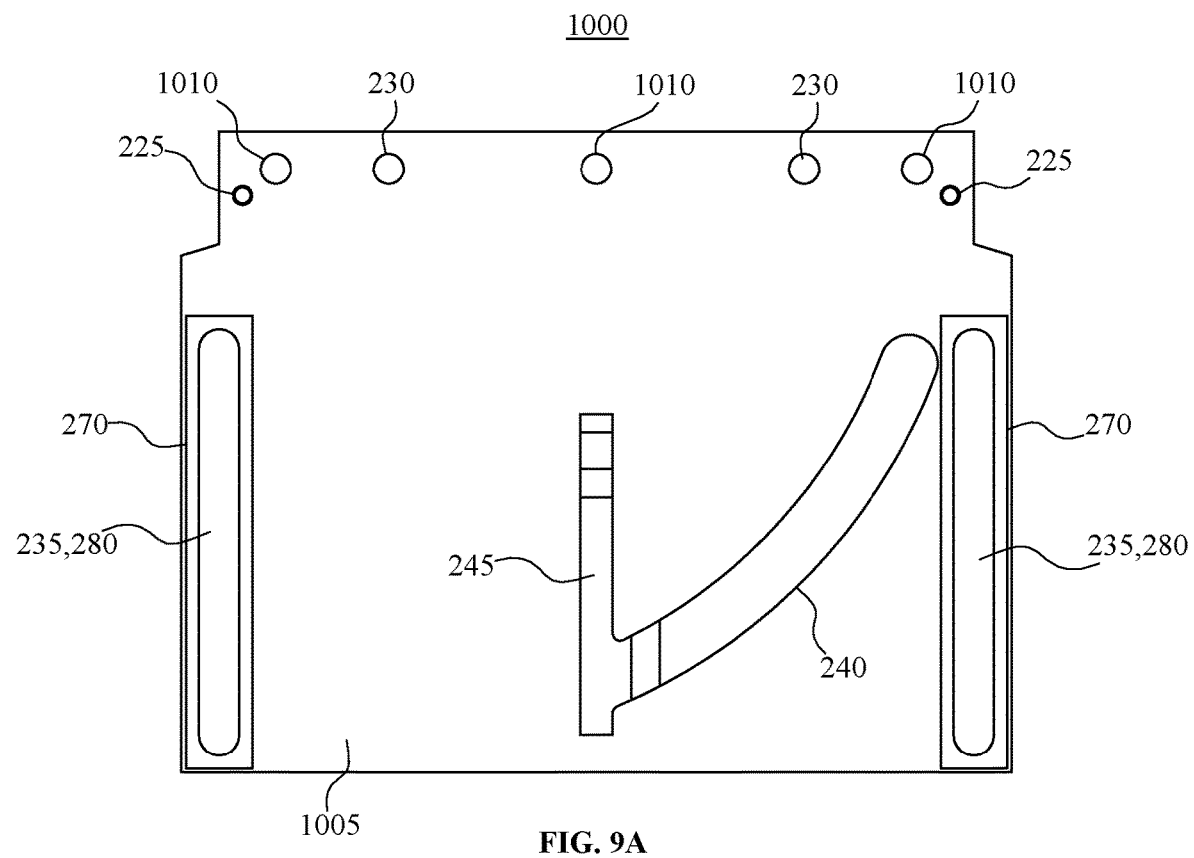
FIG. 9A shows a top plan view of a base plate of a clasping stability device in accordance with one or more embodiments of the present invention.
Figure 9B:
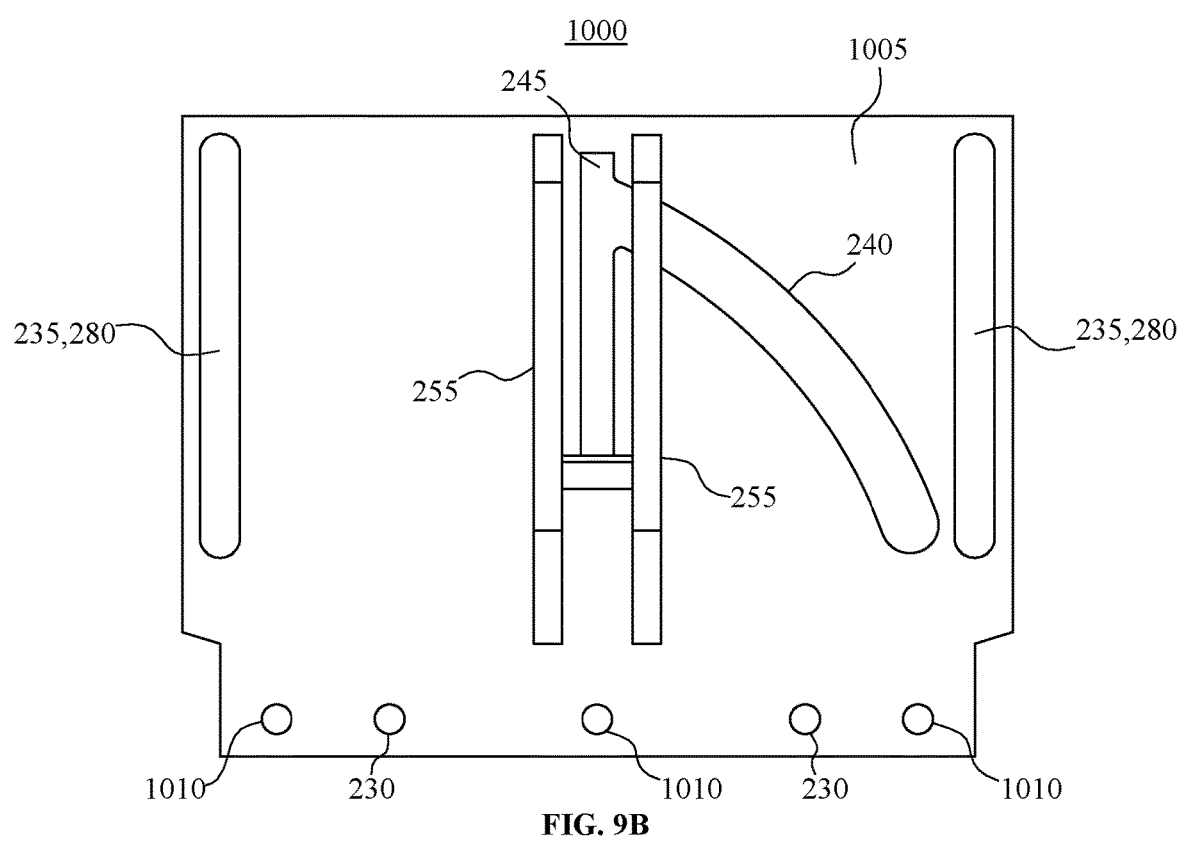
FIG. 9B shows a bottom plan view of the base plate of the clasping stability device in accordance with one or more embodiments of the present invention.

FIG. 9A shows a top plan view of a base plate assembly 1000 of a clasping stability device 900 in accordance with one or more embodiments of the present invention. Base plate 1105 of clasping stability device 900 is substantially the same as base plate 205 of clasping stability device 100 with the only substantive difference being the removal of the clamping assemblies (700 of clasping stability device 100) and the addition of direct mounting holes 1010 that are used to removably attach clasping stability device 900 to a transverse support member (not shown) of a hand truck (not shown). Continuing, FIG. 9B shows a bottom plan view of the base plate 1000 of clasping stability device 900 in accordance with one or more embodiments of the present invention.

In one or more embodiments of the present invention, a clasping stability device may use alternative clasping or release mechanisms that may be suitable for different applications or designs.

Figure 10A:
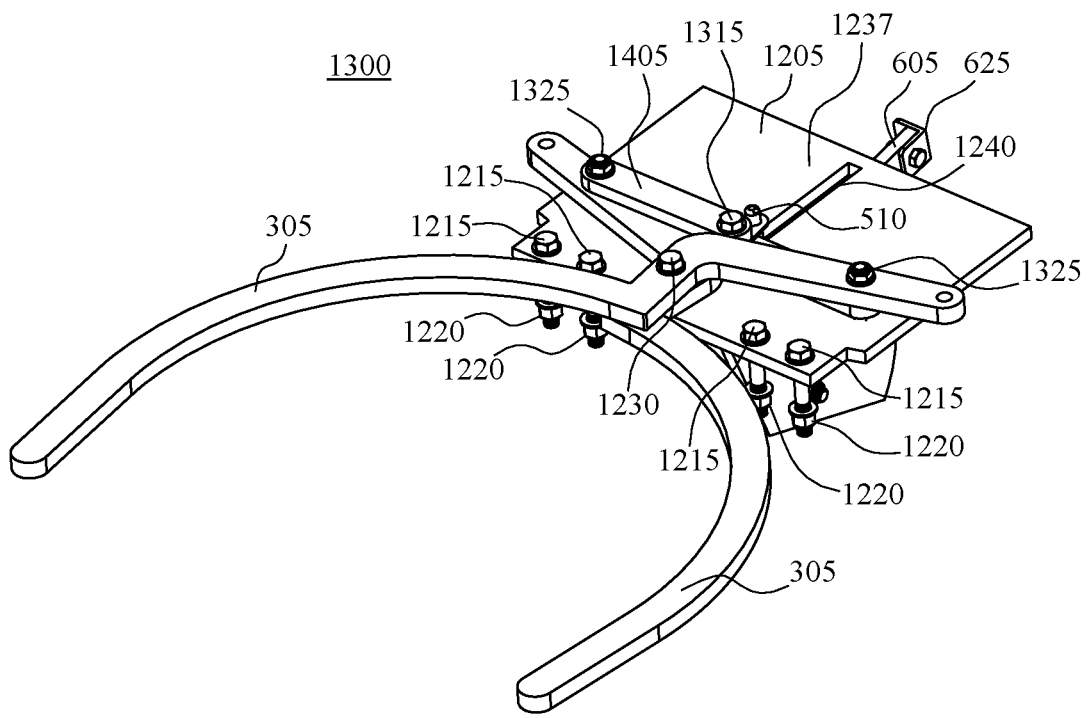
FIG. 10A shows a front facing top-side perspective view of a clasping stability device in accordance with one or more embodiments of the present invention.
Figure 10B:
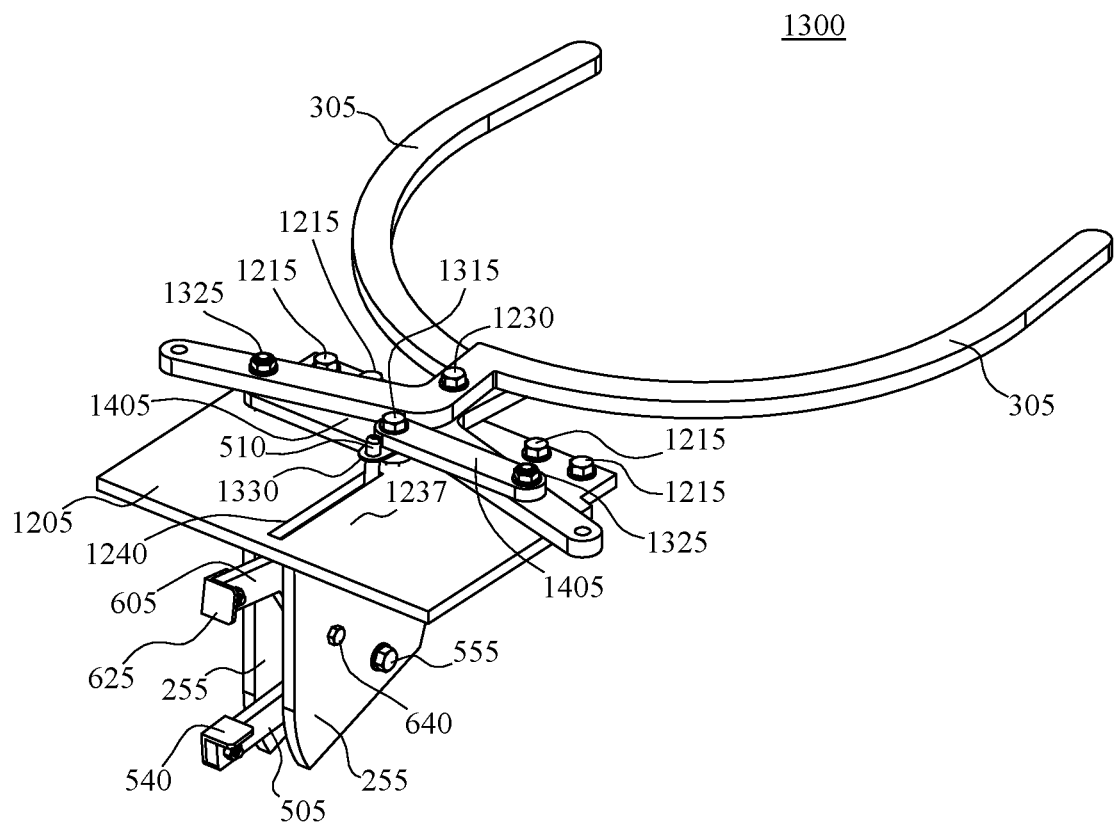
FIG. 10B shows a rear facing top-side perspective view of the clasping stability device in accordance with one or more embodiments of the present invention.

FIG. 10A shows a front facing top-side perspective view of a clasping stability device 1300 in accordance with one or more embodiments of the present invention. Clasping stability device 1300 may include a secure clasping mechanism that may be used to stabilize material on a hand truck (not shown). Clasping stability device 1300 may include a base plate assembly 1200 and a pair of clasping arm assemblies 300 removably attached to base plate assembly 1200. Continuing, FIG. 10B shows a rear facing top-side perspective view of clasping stability device 1300 in accordance with one or more embodiments of the present invention. Clasping stability device 1300 may also include a plurality of actuator plates 1405 that facilitates the clasping and release mechanism of clasping arm assemblies 300, a pedal arm assembly 500 that may controllably engage the clasping mechanism of clasping arms 300, and a pedal latch assembly 600 that may lock or release the clasping mechanism of clasping arm assemblies 300. In the embodiment depicted, clasping stability device 1300 may be directly mounted via a plurality of mounting holes 1210 in base plate 1205 to a hand truck (not shown). Base plate assembly 1200 may include a base plate 1205 and a plurality of pedal mounting plates 255 disposed on a bottom side of base plate 1205.

Figure 10C:
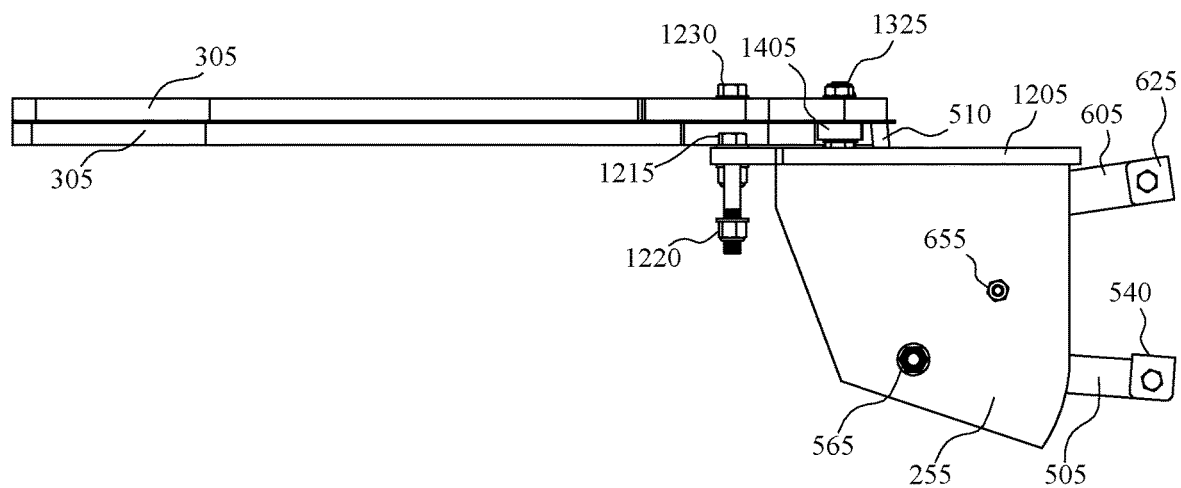
FIG. 10C shows a left-side elevation view of the clasping stability device in accordance with one or more embodiments of the present invention.
Figure 10D:
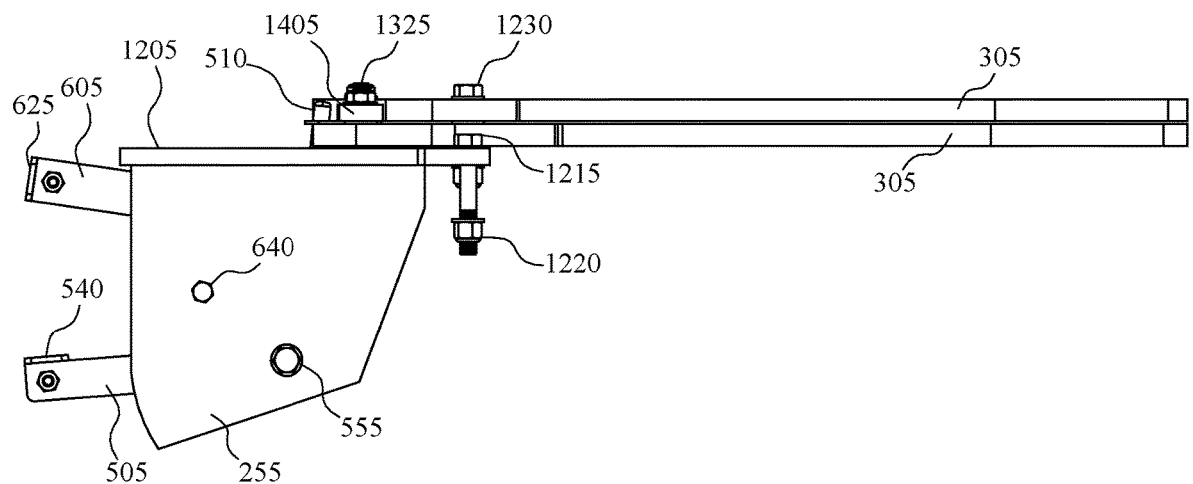
FIG. 10D shows a right-side elevation view of the clasping stability device in accordance with one or more embodiments of the present invention.
Figure 10E:
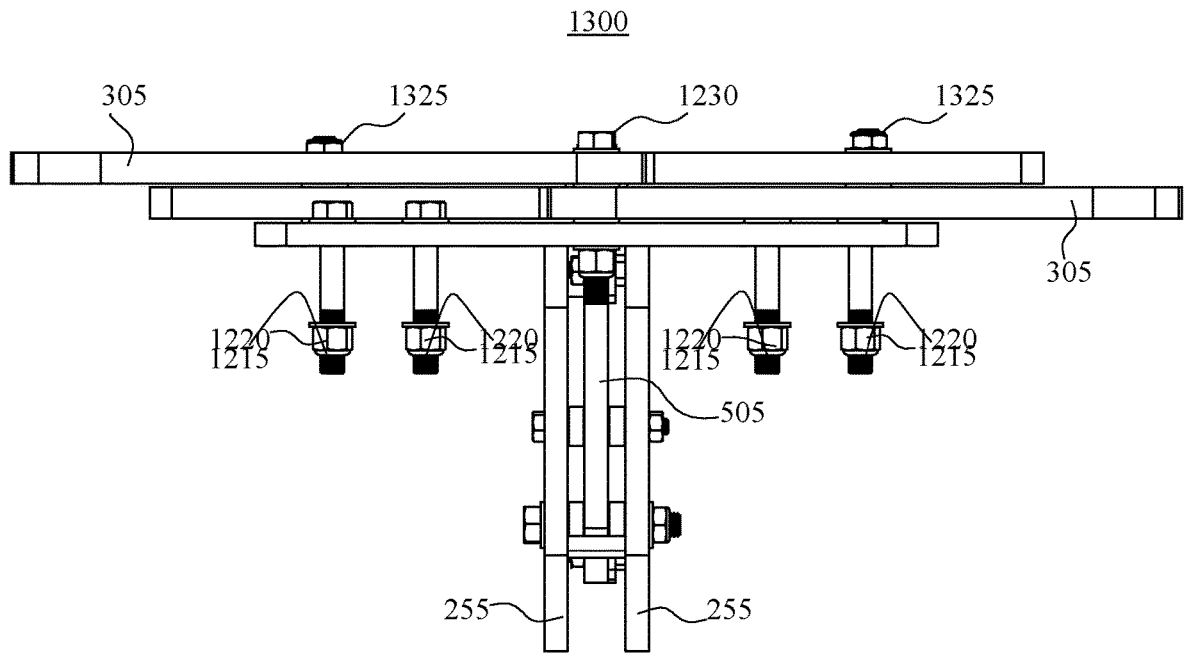
FIG. 10E shows a front elevation view of the clasping stability device in accordance with one or more embodiments of the present invention.
Figure 10F:
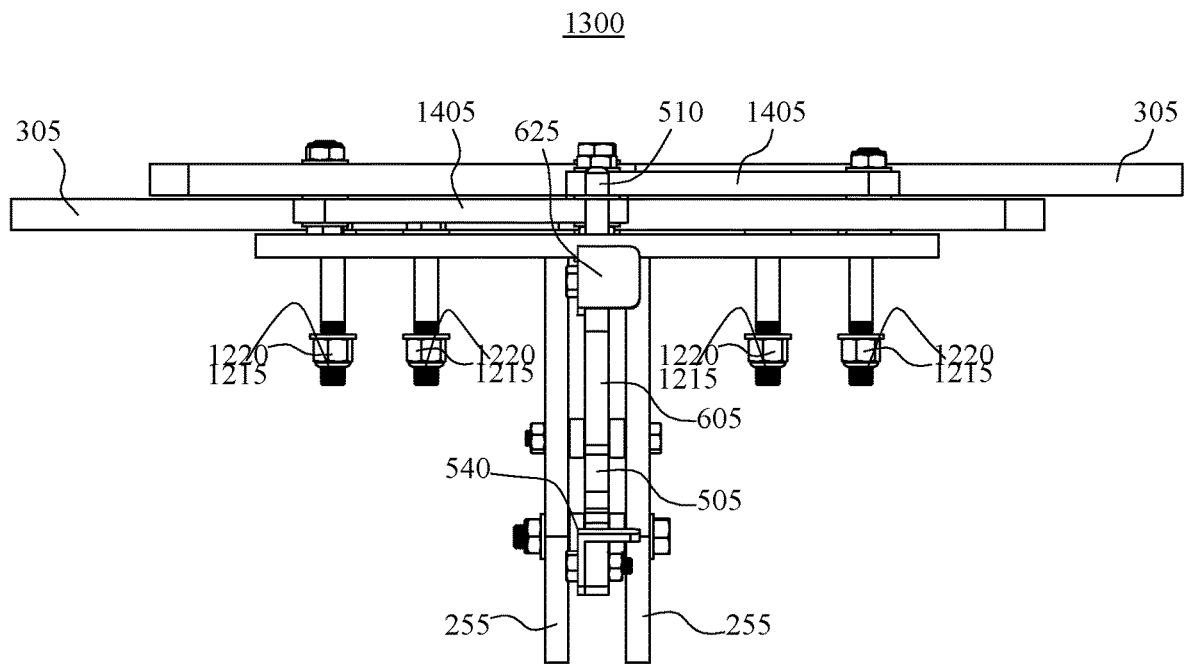
FIG. 10F shows a rear elevation view of the clasping stability device in accordance with one or more embodiments of the present invention.

Continuing, FIG. 10C shows a left-side elevation view of clasping stability device 1300 in accordance with one or more embodiments of the present invention. As shown in this view, pedal arm assembly 500 may be disposed below pedal latch assembly 600, to enable the use of the human operator's foot to engage pedal arm 505 from the rear of a hand truck (not shown). Continuing, FIG. 10D shows a right-side elevation view of clasping stability device 1300 in accordance with one or more embodiments of the present invention. Pedal arm 505 may include an actuating portion 510 that extends through base plate 205 and actuator plates 1405, as discussed in more detail herein. When pedal arm 505 is engaged by pushing down on foot pedal 540, actuating portion 510 moves toward the rear of base plate 1205, causing the attached ends of actuator plates 1405 to travel towards the rear of base plate 1205, and thereby causing clasping portion 305 of clasping arms 300 to close, as discussed in more detail herein. Upon release of foot pedal 540 of pedal arm 505, pedal arm 505 will be stably locked into place by pedal latch 605, securing the corresponding degree of closure of clasping arms 300. As shown in this view, an upper clasping arm 300 may be disposed above a lower clasping arm 300. Continuing, FIG. 10E shows a front elevation view of clasping stability device 1300 in accordance with one or more embodiments of the present invention. Continuing, FIG. 10F shows a rear elevation view of clasping stability device 1300 in accordance with one or more embodiments of the present invention.

Figure 11A:
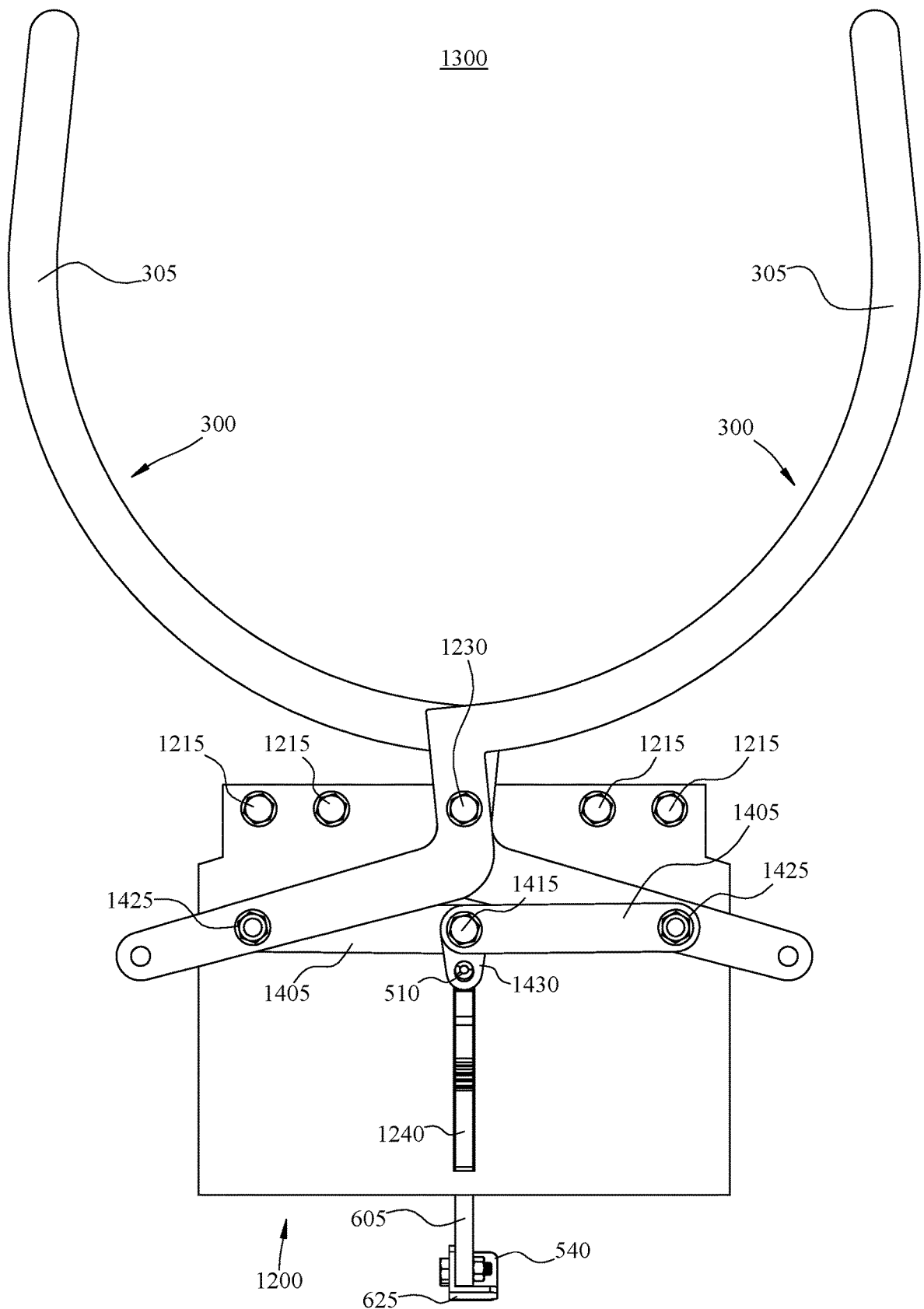
FIG. 11A shows a top plan view of a clasping stability device in an opened state in accordance with one or more embodiments of the present invention.

FIG. 11A shows a top plan view of a clasping stability device 1300 in an opened state in accordance with one or more embodiments of the present invention. Base plate assembly 1200 may include base plate 1205, an arcuate travel cutout 1237 for a lower clasping arm 300, and a travel cutout 1240 for an actuating portion 510 of a pedal arm 505. A pivoting attachment portion 310 of an upper clasping arm 300 may be aligned with a pivoting attachment portion 310 of a lower clasping arm 300 and secured to base plate 1205 with a bolt 1230. A rotating attachment portion (317, not shown in this view) of upper clasping arm 300 may be attached to a first end 1410 of a first actuating plate 1405. A rotating attachment portion (317, not shown in this view) of lower clasping arm 300 may be attached to a first end 1410 of second actuating plate 1405. A top side of a second end 1410 of first actuating plate 1405 may be aligned and attached to a bottom side of a second end 1410 of second actuating plate 1405 by a bolt 1415, with a slip attachment 1430 disposed in between first actuating plate 1405 and second actuating plate 1405. Slip attachment 1430 may include a cutout for actuating portion 510.

Figure 11B:
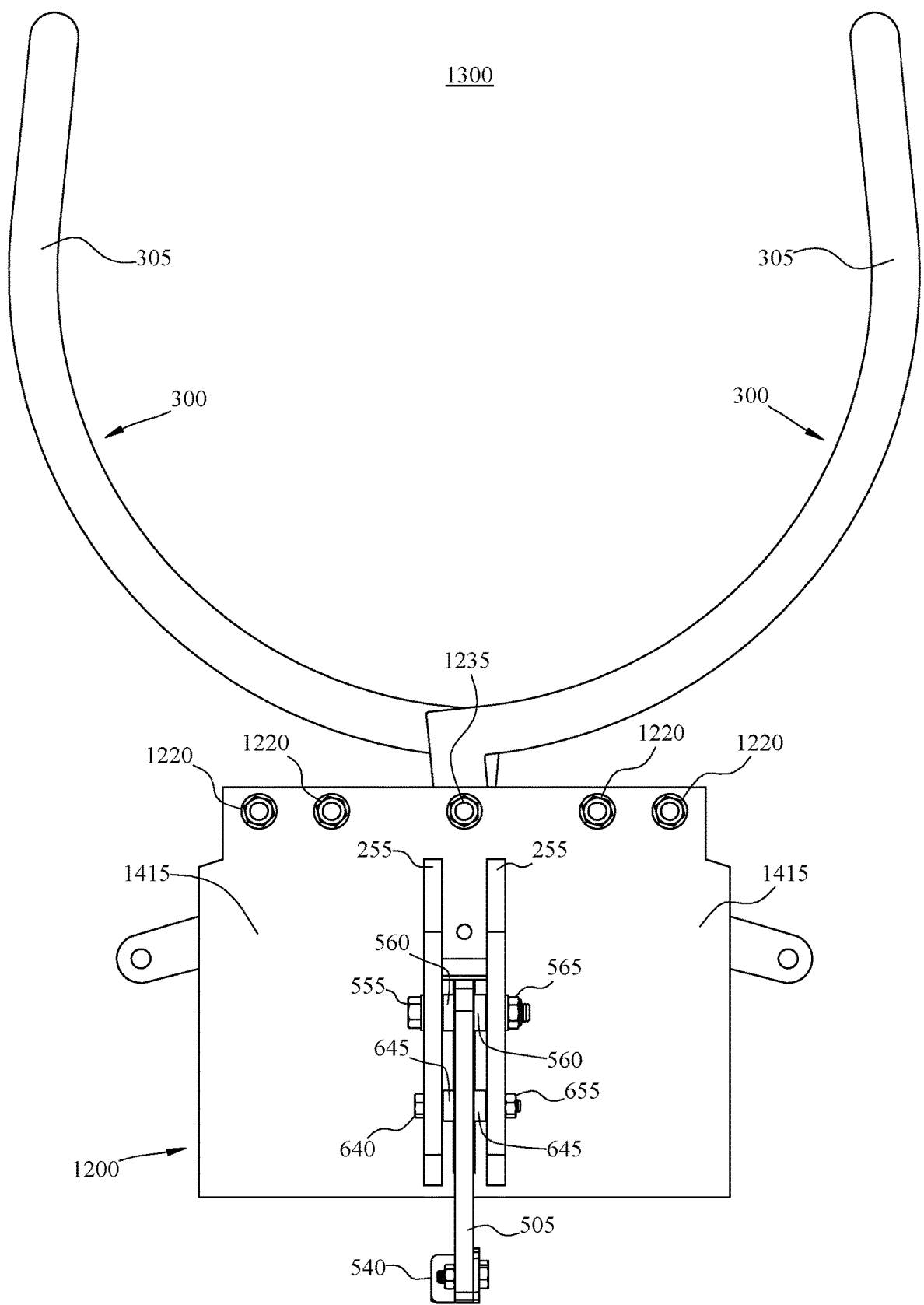
FIG. 11B shows a bottom plan view of the clasping stability device in the opened state in accordance with one or more embodiments of the present invention.
Figure 11C:
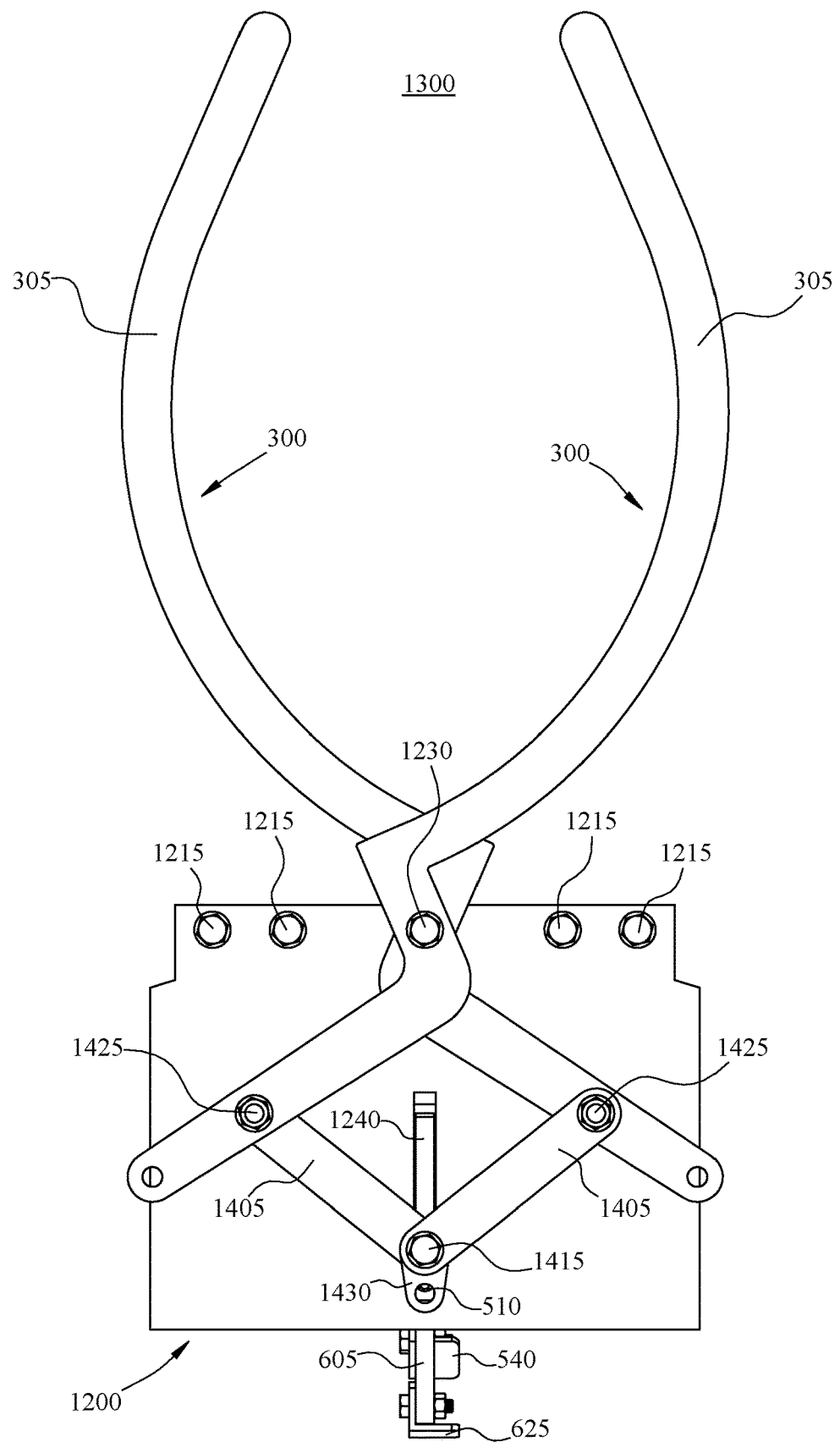
FIG. 11C shows a top plan view of the clasping stability device in a closed state in accordance with one or more embodiments of the present invention.
Figure 11D:
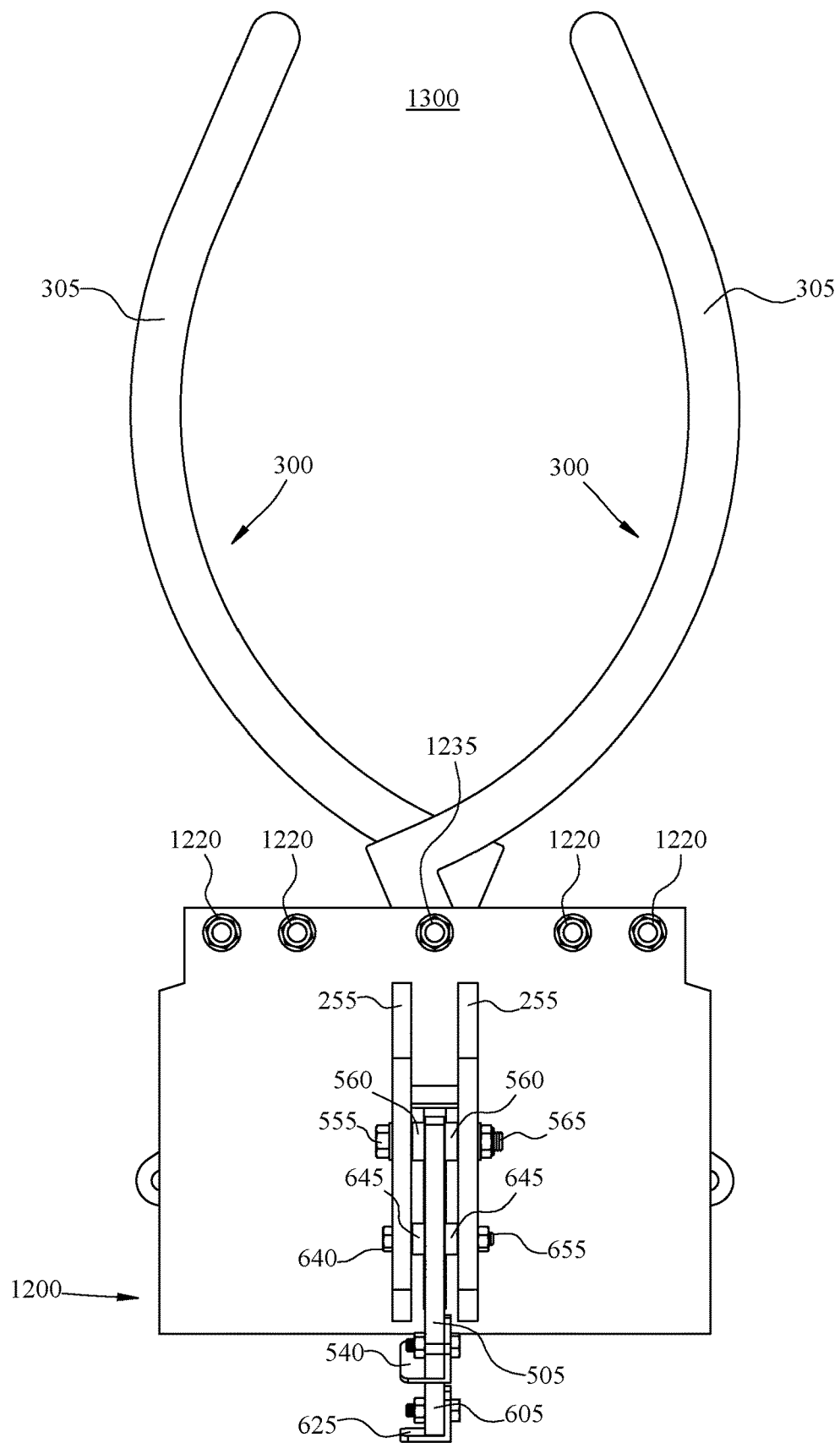
FIG. 11D shows a bottom plan view of the clasping stability device in the closed state in accordance with one or more embodiments of the present invention.

Continuing, FIG. 11B shows a bottom plan view of clasping stability device 1300 in the opened state in accordance with one or more embodiments of the present invention. Base plate 1205 may include a plurality of pedal mounting plates 255 attached to the bottom side of base plate 1205. Continuing, FIG. 11C shows a top plan view of clasping stability device 1300 in a closed state in accordance with one or more embodiments of the present invention. When a human operator wishes to engage the clasping mechanism to close on material (not shown), the operator may depress foot pad 540 of the pedal arm (505, not shown in this view), the extent to which it is depressed corresponding to the extent to which the clasping arms 300 close. The depression of foot pad 540 cases the pedal arm (505, not shown in this view) to pivot, such that actuating portion 510 of the pedal arm (505, not shown in this view) travels toward the rear of base plate 1205. The travel of actuating portion 510 causes the attached ends (by bolt 1415) of actuator plates 1405 to travel towards the rear of base plate 1205. As the rotating attachment portions of clasping arms 300 rotate, the pivoting attachment portions of clasping arms 300 pivot, such that clasping portions 305 of clasping arms 300 begin to close. While not shown in this view, when the human operator releases foot pedal 540, pedal latch 605 latches onto pedal arm 505, locking clasping arms 300 in their present degree of closure. In this way, clasping stability device 1300 may provide stable clasping with any desired amount of closure from fully open to fully closed, thereby accommodating a large variety of materials. In certain embodiments, clasping stability device 1300 may be removably attached to existing hand trucks (not shown). A plurality of bolts 1215 may be used to removably attach clasping stability device 1300 to a transverse support member (not shown) of the hand truck (not shown). Continuing, FIG. 11D shows a bottom plan view of clasping stability device 1300 in the closed state in accordance with one or more embodiments of the present invention.

Figure 11E:
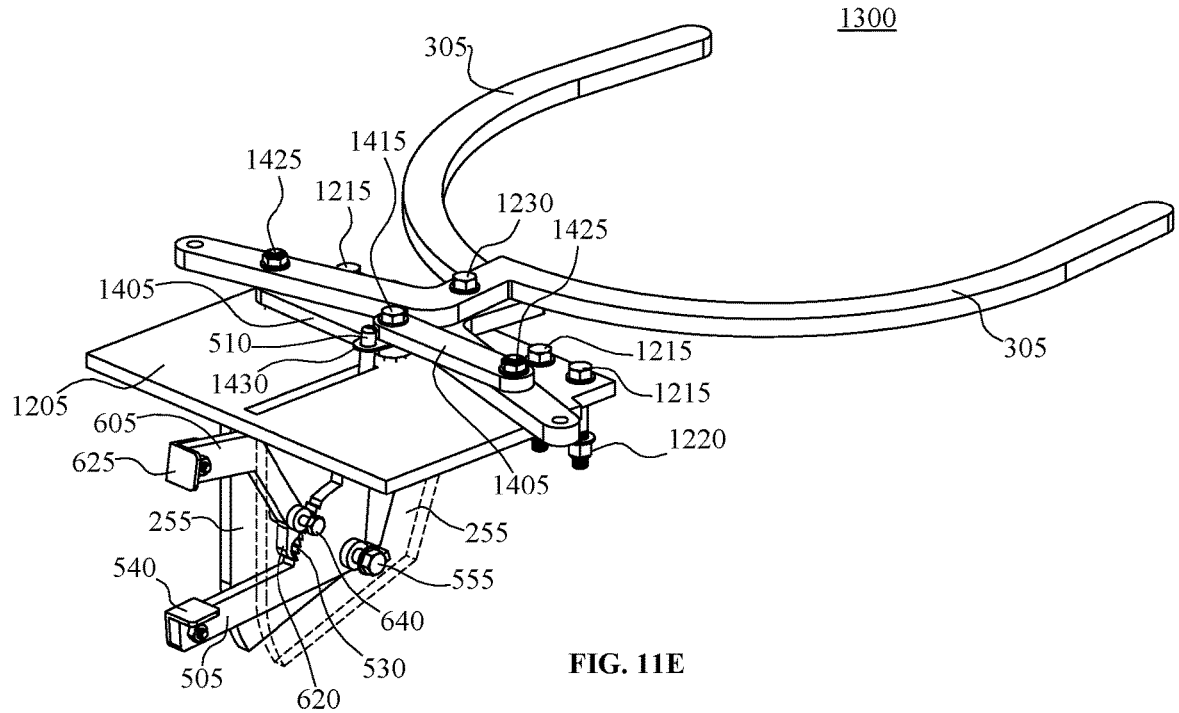
FIG. 11E shows a rear facing top-side perspective view of the clasping stability device in the opened state in accordance with one or more embodiments of the present invention.

Continuing, FIG. 11E shows a rear facing top-side perspective view of clasping stability device 1300 in the opened state in accordance with one or more embodiments of the present invention. A portion of pedal arm assembly 500 and pedal latch assembly 600 may be disposed in between a pair of pedal mounting plates 255 disposed on a bottom side of base plate 1205. For purposes of illustration only, the right-side pedal mounting plate 255 is transparent to more clearly show the interaction of pedal arm assembly 500 and pedal latch assembly 600. Pedal arm assembly 500 may include a pedal arm 505 having an engagement portion 520, a pivoting attachment portion (535, not shown in this view), an index latch track 530, and actuating portion 510. Pedal latch assembly 600 may include a pedal latch 605 having a release portion (610, not shown in this view), a pivoting attachment portion (615, not shown in this view), and an index latch 620. In the opened state, actuating portion 510 of pedal arm 505 may be positioned towards the front of base plate 1205. Index latch track 530 of pedal arm 505 may include an arcuate track of stairs disposed about the pivot point of pedal arm 505. Index latch 620 of pedal latch 605 may have a complimentary shape to that of index latch track 530, such that index latch 620 may engage each stair of index latch track 530 and securely maintain the position of pedal arm 505.

Figure 11F:
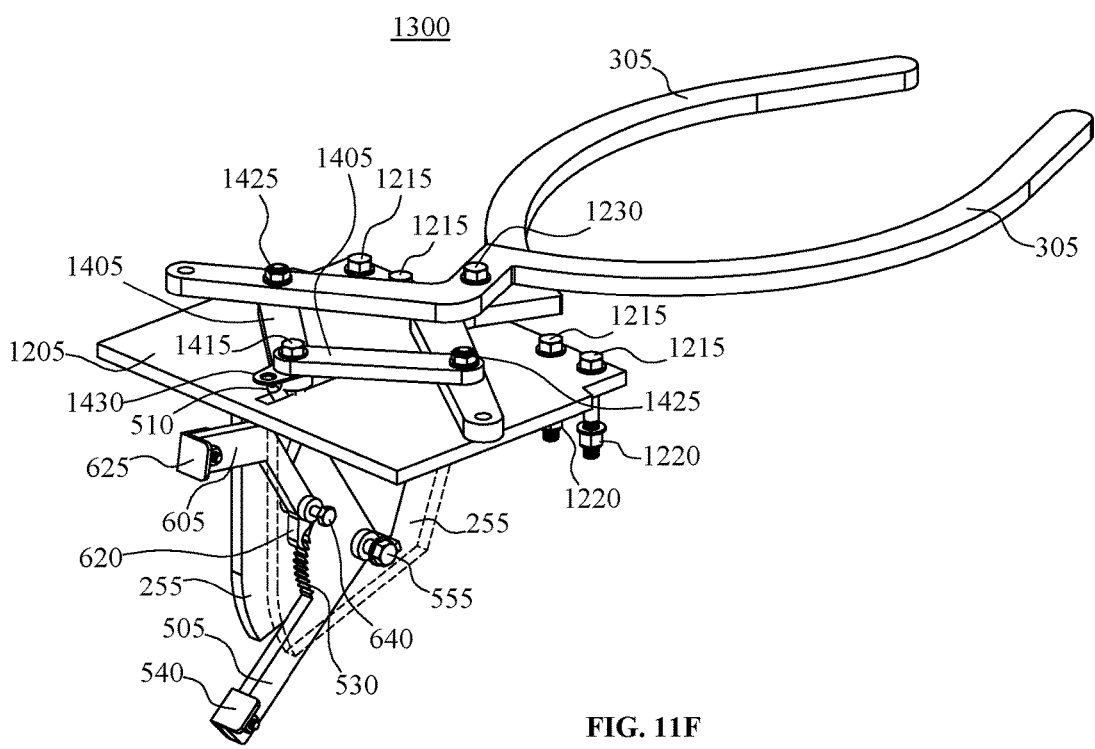
FIG. 11F shows a rear facing top-side perspective view of the clasping stability device in the closed state in accordance with one or more embodiments of the present invention.
Figure 11G:
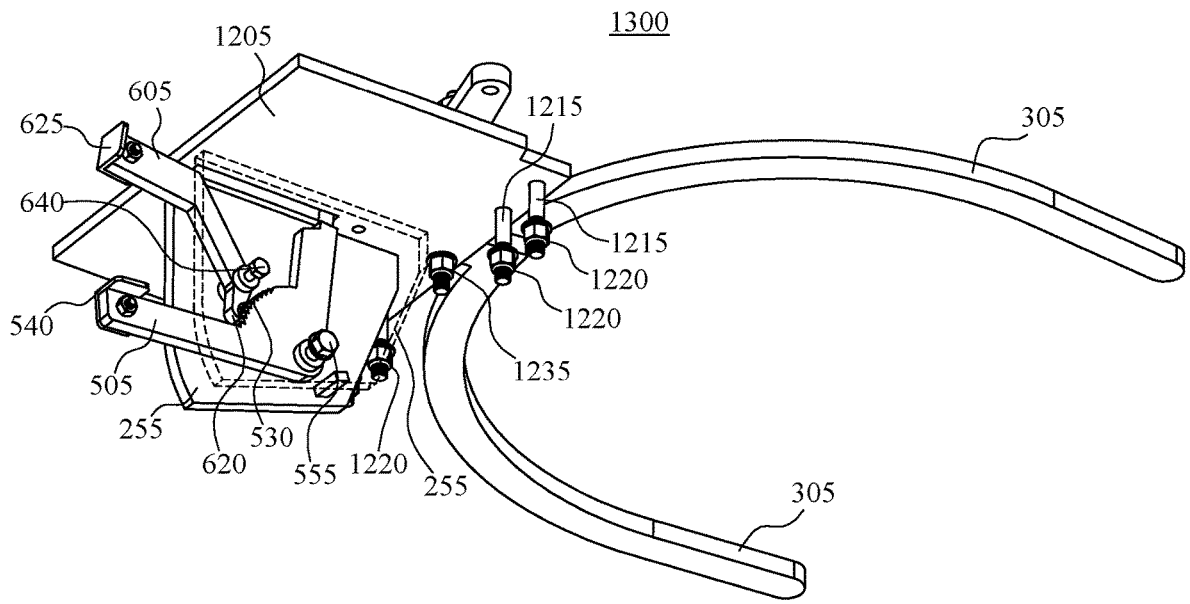
FIG. 11G shows a rear facing bottom-side perspective view of the clasping stability device in the opened state in accordance with one or more embodiments of the present invention.
Figure 11H:
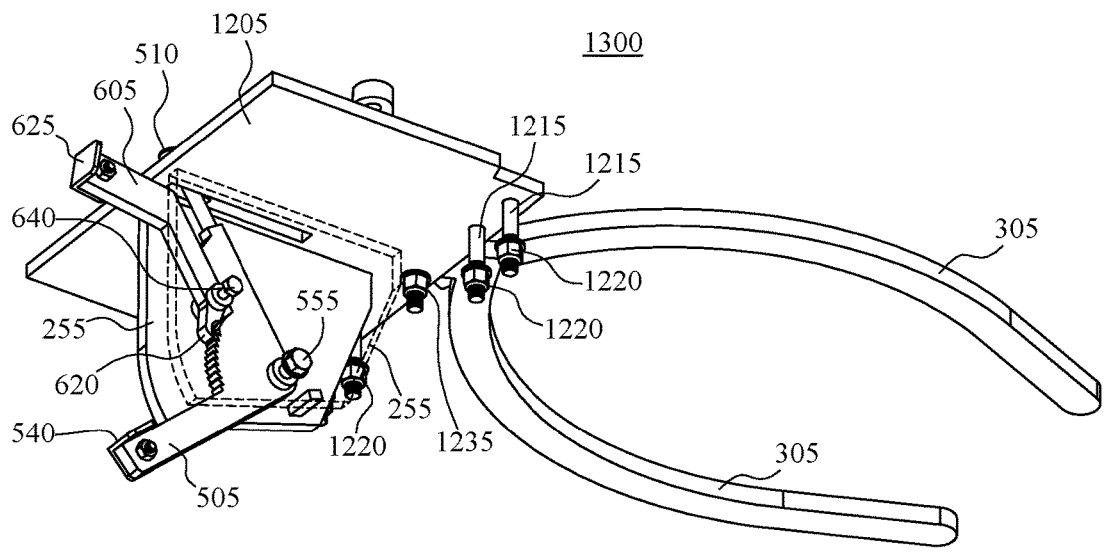

Continuing, FIG. 11F shows a rear facing top-side perspective view of clasping stability device 1300 in the closed state in accordance with one or more embodiments of the present invention. When a human operator wishes to engage the clasping mechanism of clasping stability device 1300, the operator may depress foot pedal 540 of pedal arm 505, causing pedal arm 505 to pivot about its pivoting attachment point (535, not shown in this view) such that actuating portion 510 of pedal arm 505 to travel toward the rear of base plate 1205, thereby causing clasping arms 300 to close in a corresponding amount. As foot pedal 540 is being depressed, index latch 620 travels through successive stairs of index latch track 530, against the force of bias springs 285, until such time as the operator disengages foot pedal 540. At that point, index latch 620 securely maintains its position in index latch track 530, maintaining the degree of closure against the force of bias springs 285. Index latch 620 may have a complimentary shape to that of index latch track 530, such that when index latch 620 engages index latch track 530, index latch 620 is capable of maintaining the current position of clasping arms 300. Showing a different angle, FIG. 11G shows a rear facing bottom-side perspective view of clasping stability device 1300 in the opened state and FIG. 1111 shows a rear facing bottom-side perspective view of clasping stability device 1300 in the closed state in accordance with one or more embodiments of the present invention.

Figure 12A:
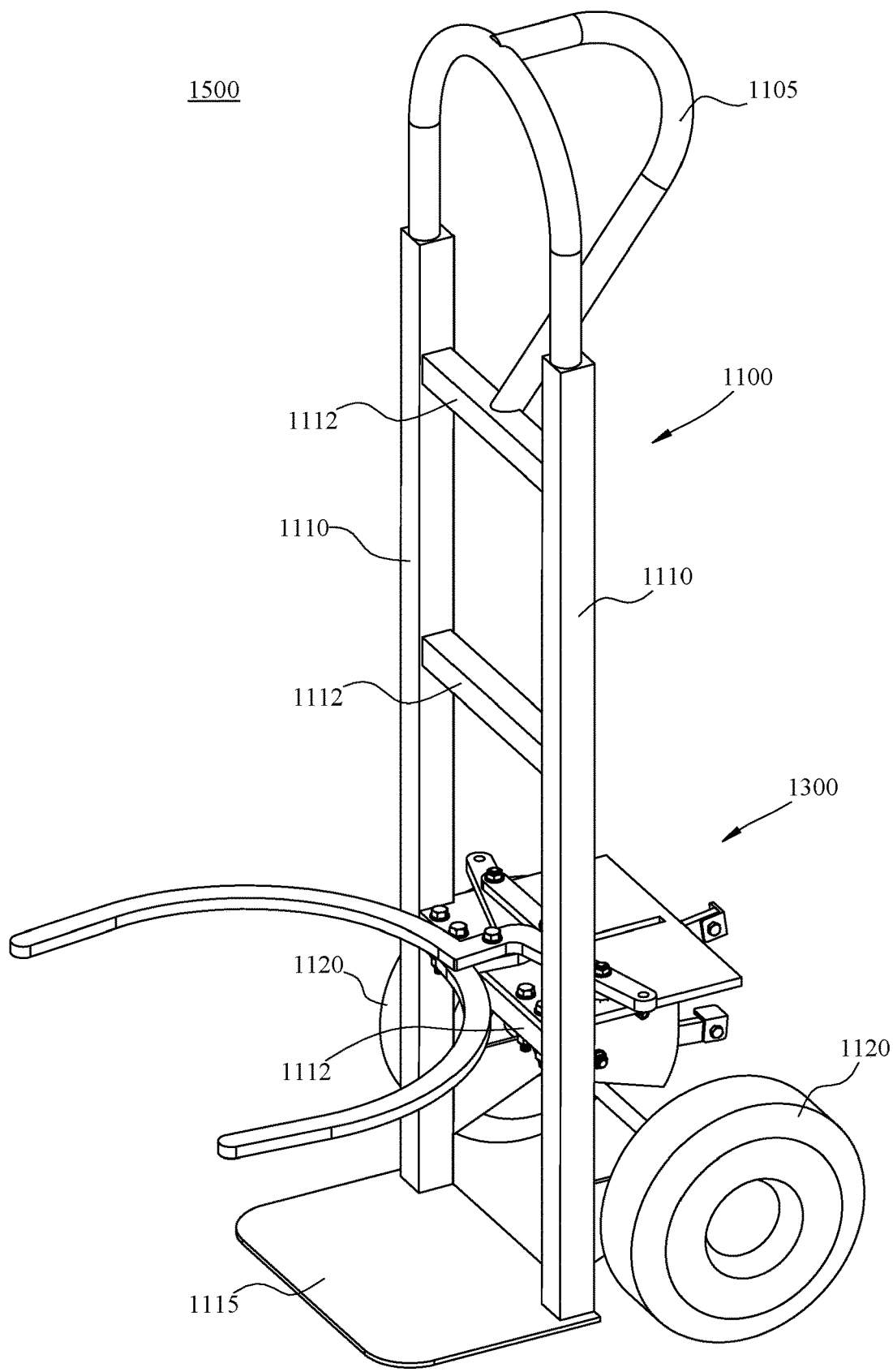
FIG. 12A shows a front facing top-side perspective view of a clasping stabilized hand truck in accordance with one or more embodiments of the present invention.
Figure 12B:
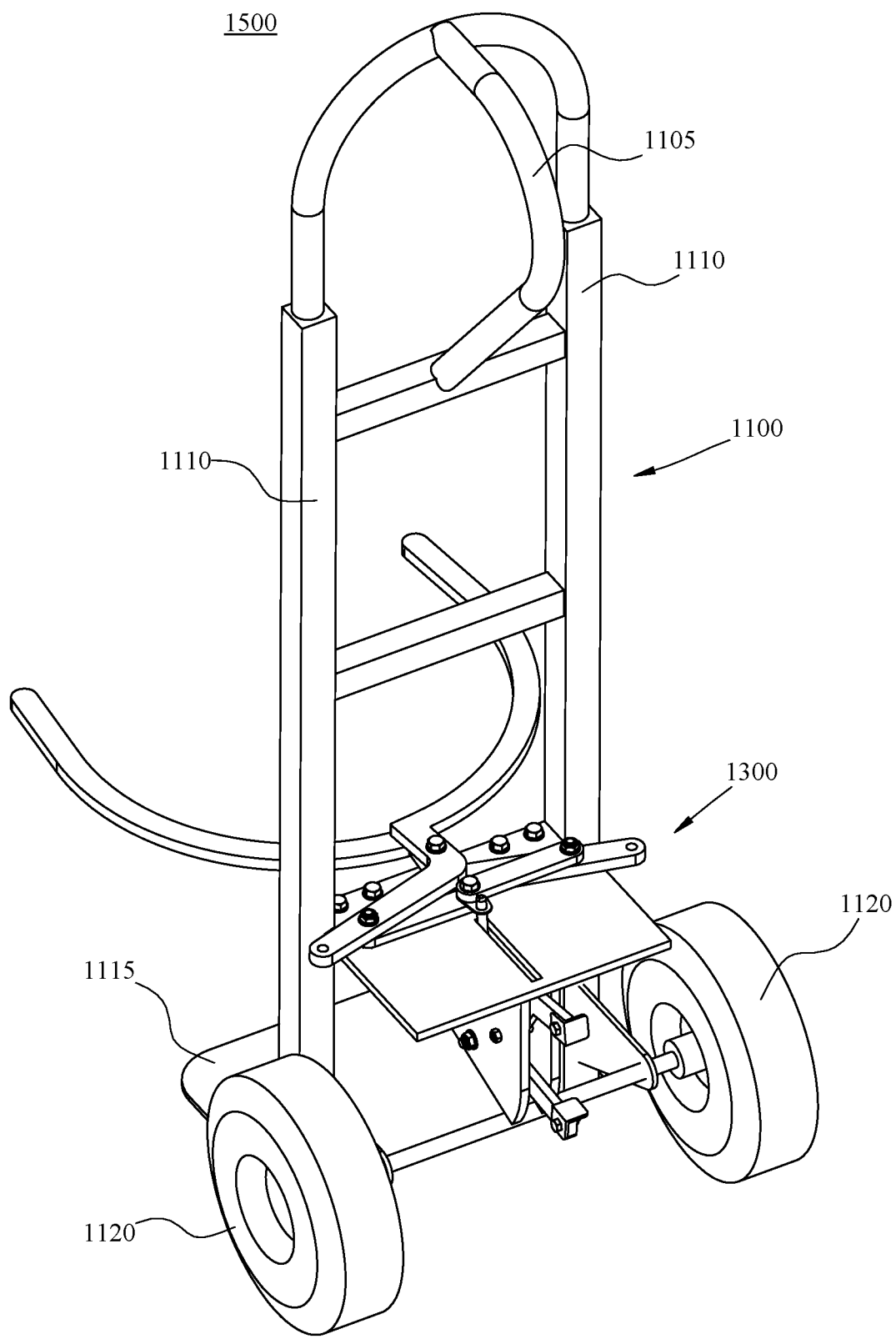
FIG. 12B shows a rear facing top-side perspective view of the clasping stabilized hand truck in accordance with one or more embodiments of the present invention.
Figure 12C:
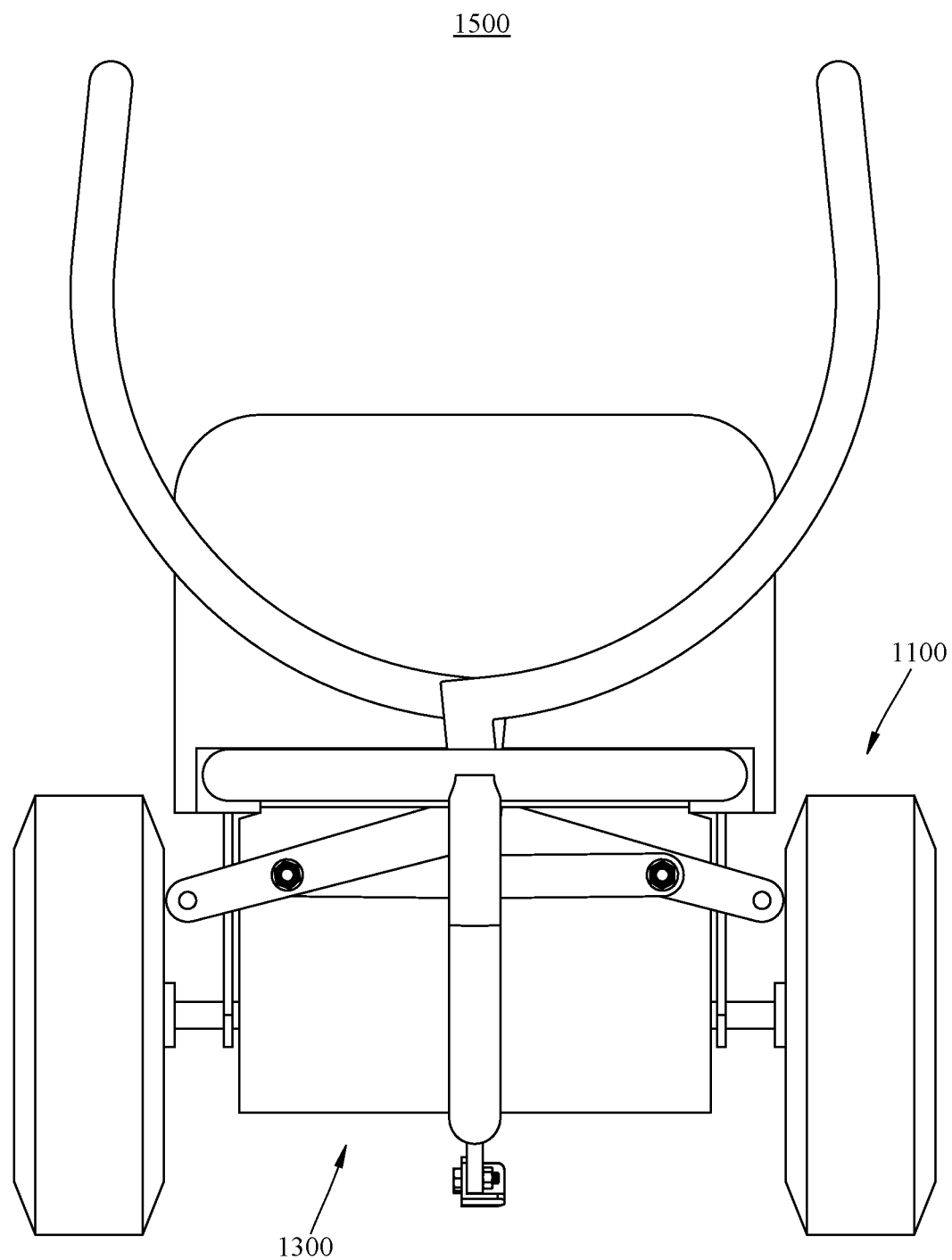
FIG. 12C shows a top plan view of the clasping stabilized hand truck in an opened state in accordance with one or more embodiments of the present invention.
Figure 12D:
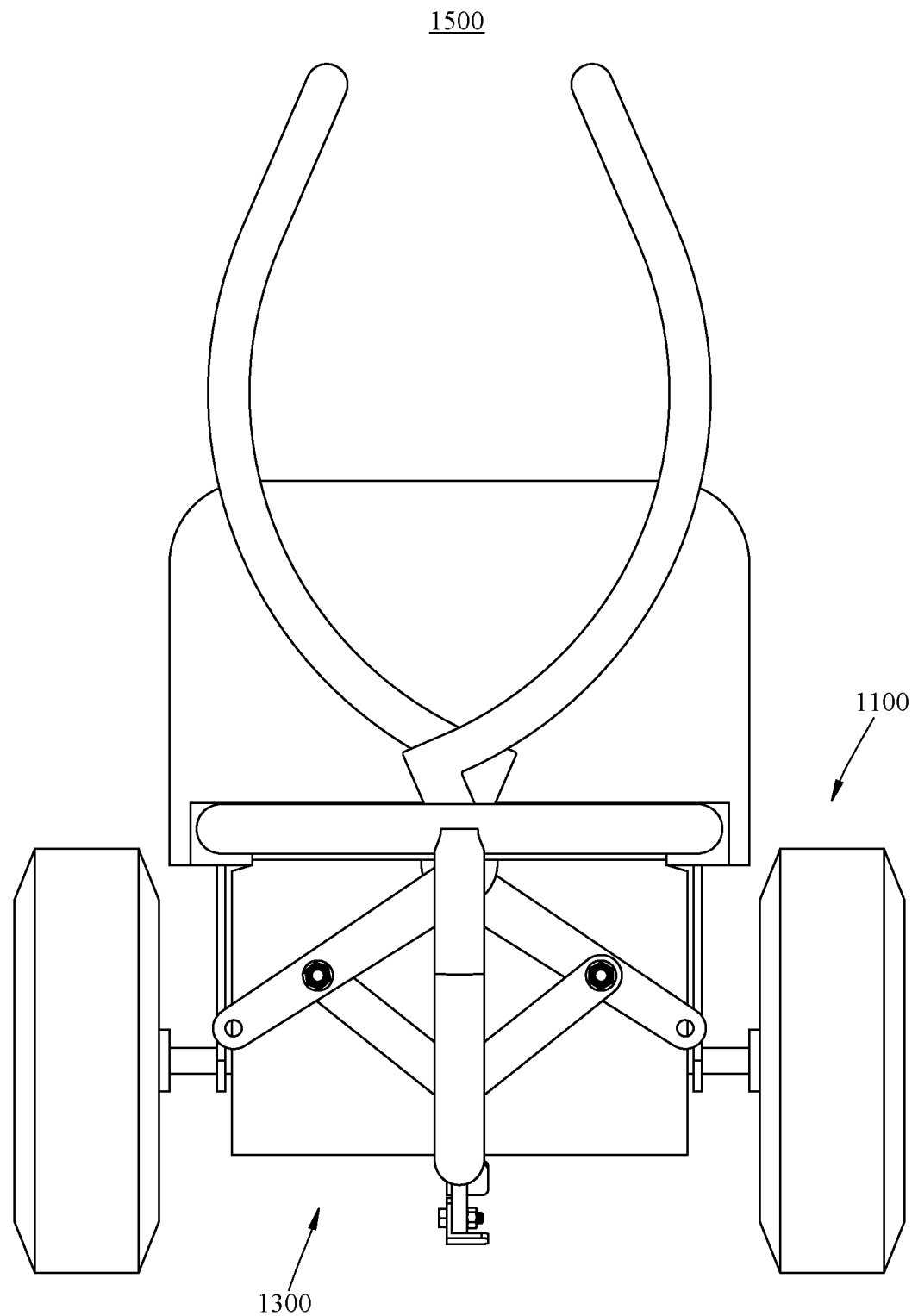
FIG. 12D shows a top plan view of the clasping stabilized hand truck in a closed state in accordance with one or more embodiments of the present invention.

FIG. 12A shows a front facing top-side perspective view of a clasping stabilized hand truck 1500 in accordance with one or more embodiments of the present invention. Clasping stabilized hand truck 1500 may include a hand truck 1100 having one or more handles 1105, a plurality of longitudinal support members 1110 that are typically rectangular in shape, a plurality of transverse support members 1112, a nose plate 1115, and a plurality of wheels 1120. The plurality of longitudinal support members 1110 and transverse support members 1112 form the wheeled frame of hand truck 1500. Clasping stability device 1300 may be directly attached to a transverse support member 1112. Continuing, FIG. 12B shows a rear facing top-side perspective view of clasping stabilized hand truck 1500 in accordance with one or more embodiments of the present invention. Because the clasping stability device 1300 includes controls disposed at the rear of the device 1300, a human operator (not shown) may fully operate hand truck 1500 from the rear, without having to walk around to the front or use straps (not shown) or ties (not shown). Continuing, FIG. 12C shows a top plan view of clasping stabilized hand truck 1500 in an opened state and FIG. 12D shows a top plan view of clasping stabilized hand truck 1500 in a closed state in accordance with one or more embodiments of the present invention.

Figure 13A:
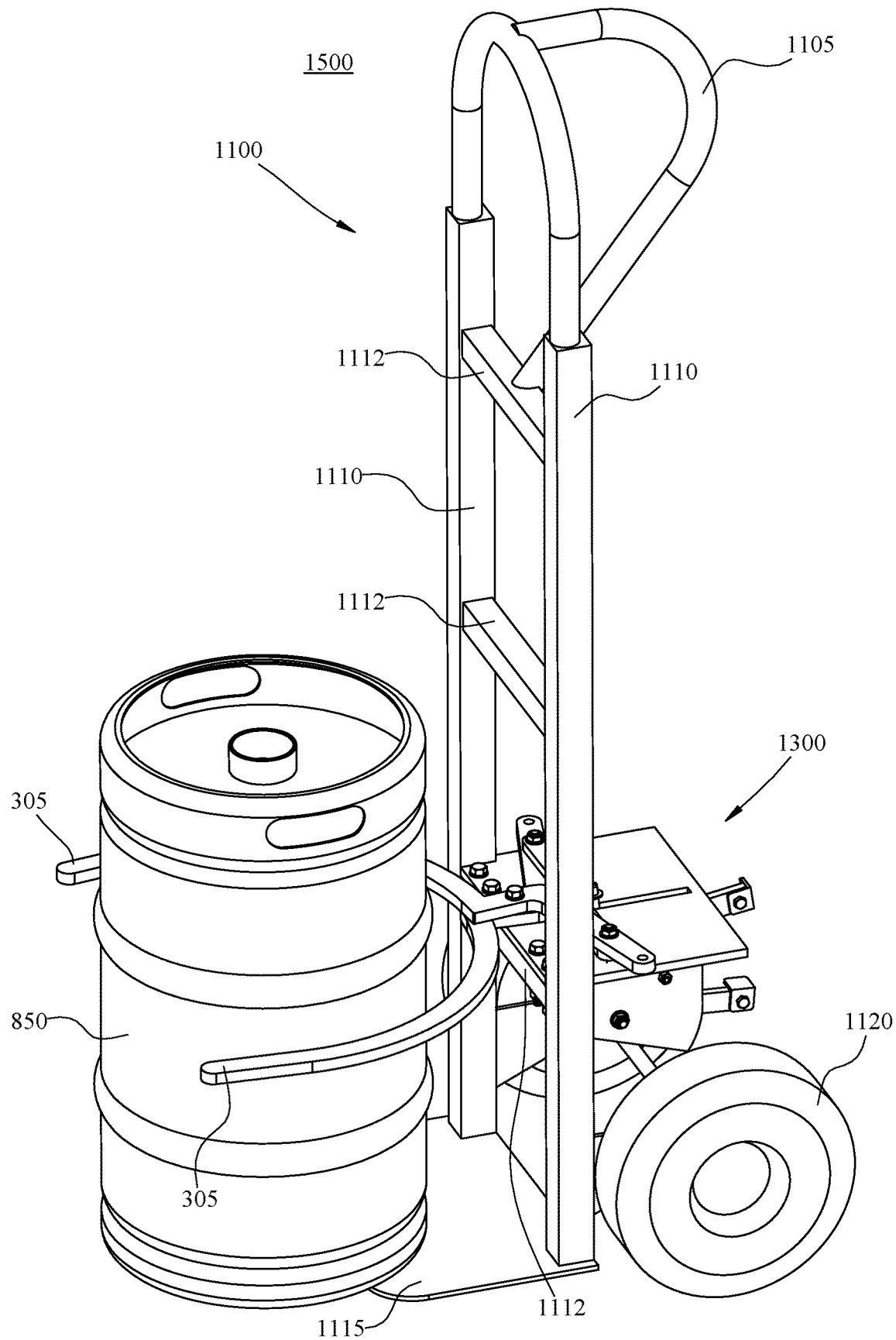
FIG. 13A shows a front facing top-side perspective view of a clasping stabilized hand truck in an opened state showing an environment of use in accordance with one or more embodiments of the present invention.
Figure 13B:
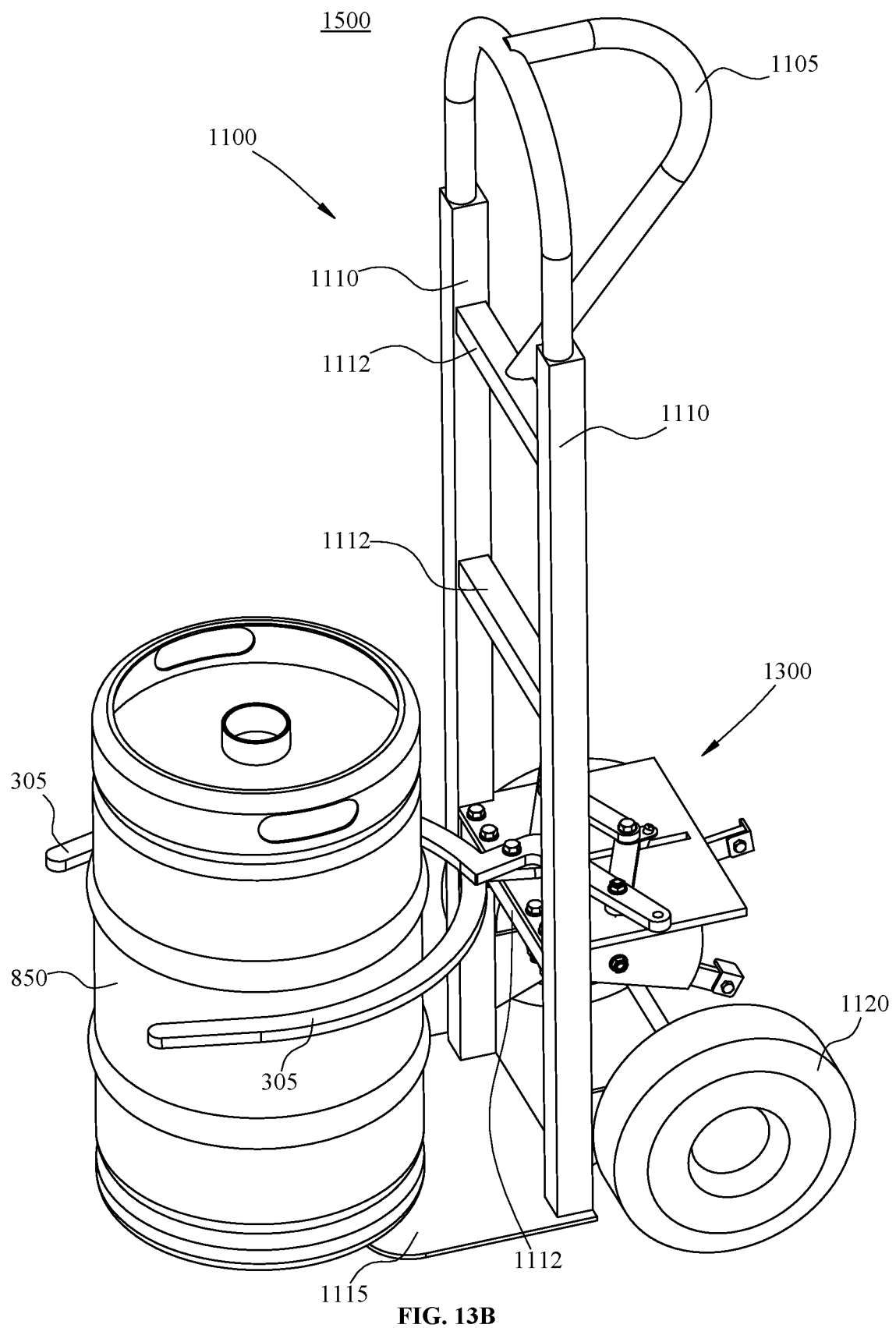
FIG. 13B shows a front facing top-side perspective view of the clasping stabilized hand truck in a closed state showing an environment of use in accordance with one or more embodiments of the present invention.

FIG. 13A shows a front facing top-side perspective view of a clasping stabilized hand truck 1500 in an opened state showing an environment of use in accordance with one or more embodiments of the present invention. Hand trucks are commonly used to transport tanks and containers that have a substantially cylindrical shape. These tanks and containers vary in size, shape, and weight, and often present problems for transport. In one or more embodiments of the present invention, a clasping stabilized hand truck 1500 may safely transport tanks and containers in a safe manner that protects the safety of the operator as well as the environment. In operative use, the operator may wheel hand truck 1500 into position in front of material, such as, for example, a large container 850, with one or more hands on the one or more handles 1105. Hand truck 1500 may be positioned in front of container 850 and then, using a foot, the operator may wedge the nose plate 1115 under container 850 while pushing hand truck 1500 forward. Continuing, FIG. 13B shows a front facing top-side perspective view of clasping stabilized hand truck 1500 in a closed state showing an environment of use in accordance with one or more embodiments of the present invention. Once container 850 is well positioned with respect to nose plate 1115, the operator may use a foot to engage foot pedal 540 to close clasping arms 300 around container 850. Once sufficient closure is achieved, the operator may remove the foot from the foot pedal 540, and pedal latch 605 may latch pedal arm 505 into place, securing the degree of closure of clasping arms 300, providing stable support for container 850. Advantageously, the operator is able to perform all of these operations from the rear of hand truck 1500, without having to walk to the front of hand truck 800, and without the use of straps (not shown) or ties (not shown).

Figure 14A:
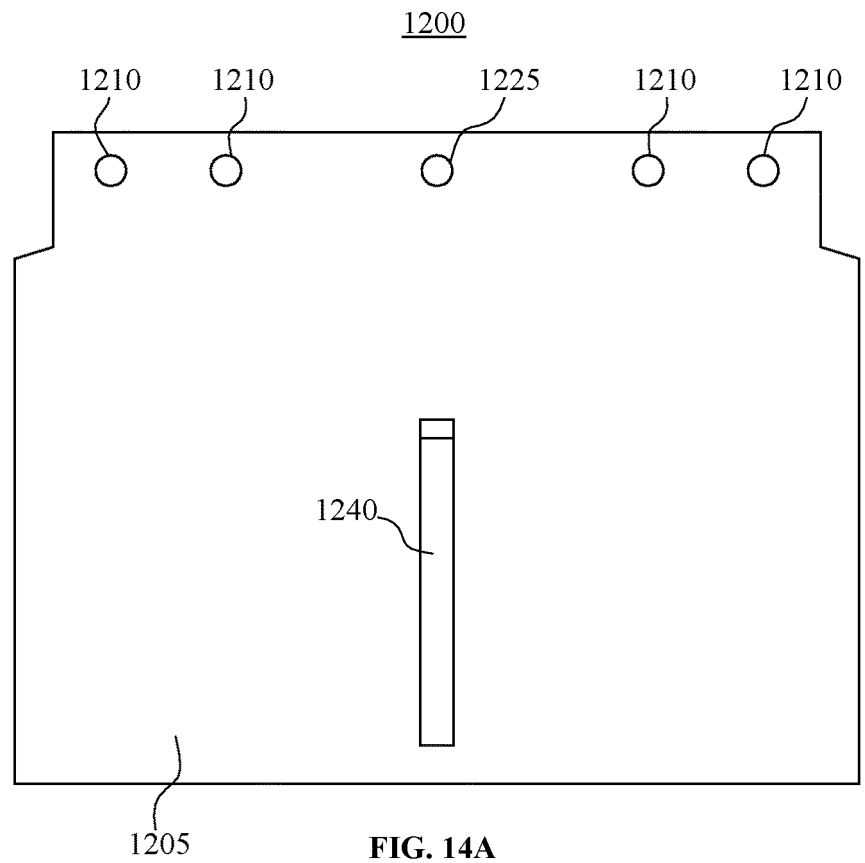
FIG. 14A shows a top plan view of a base plate of a clasping stability device in accordance with one or more embodiments of the present invention.
Figure 14B:
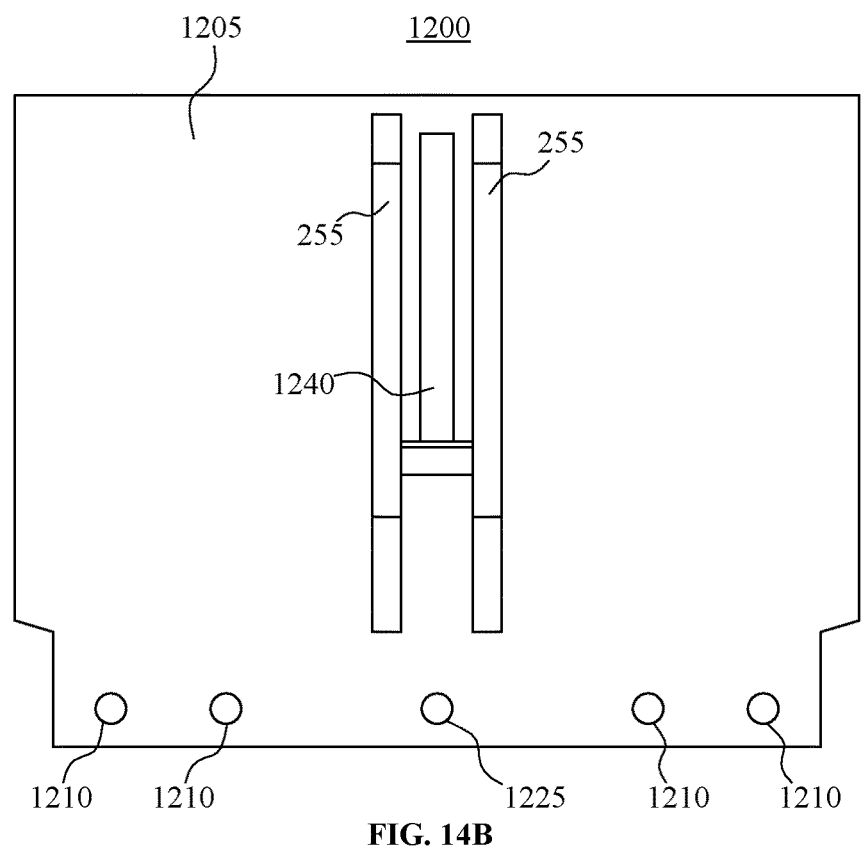
FIG. 14B shows a bottom plan view of the base plate of the clasping stability device in accordance with one or more embodiments of the present invention.

FIG. 14A shows a top plan view of a base plate 1200 of a clasping stability device 1300 in accordance with one or more embodiments of the present invention. Base plate assembly 1200 includes base plate 1205 and a plurality of pedal mounting plates 255 disposed on a bottom side of base plate 1205. Base plate 205 may include a travel cutout for the actuating portion (e.g., 510) of the pedal arm (e.g., 500). Continuing, FIG. 14B shows a bottom plan view of base plate 1200 of clasping stability device 1300 in accordance with one or more embodiments of the present invention. Base plate 1205 includes a plurality of pedal mounting plates 255 disposed on the bottom-side of base plate 1205. In certain embodiments, base plate 1205 may be composed of stainless steel. In other embodiments, base plate 1205 may be composed of carbon steel. In still other embodiments, base plate 1205 may be composed of aluminum. In still other embodiments, base plate 1205 may be composed of any other metal or alloy. In still other embodiments, base plate 1205 may be composed of plastic, composites, or any other lightweight material. One of ordinary skill in the art will recognize that the composition of material used to form base plate 1205 may vary in accordance with one or more embodiments of the present invention.

Figure 14C:
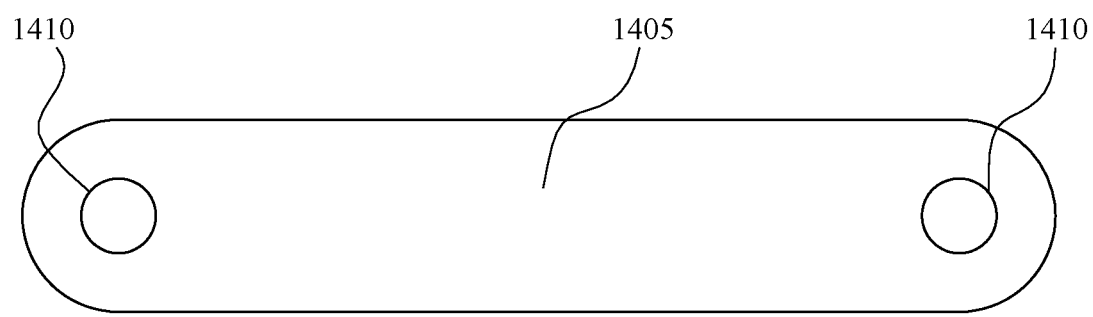
FIG. 14C shows a top plan view of an actuator plate of the clasping stability device in accordance with one or more embodiments of the present invention.

Continuing, FIG. 14C shows a top plan view of an actuator plate 1405 of clasping stability device 1300 in accordance with one or more embodiments of the present invention. Actuator plate 1405 includes a first attachment end 1410 and a second attachment end 1410. In certain embodiments, actuator plate 1405 may be composed of stainless steel. In other embodiments, actuator plate 1405 may be composed of carbon steel. In still other embodiments, actuator plate 1405 may be composed of aluminum. In still other embodiments, actuator plate 1405 may be composed of any other metal or alloy. In still other embodiments actuator plate 1405 may be composed of plastic, composites, or any other lightweight material. One of ordinary skill in the art will recognize that the composition of material used to form actuator plate 1405 may vary in accordance with one or more embodiments of the present invention.

Figure 15:
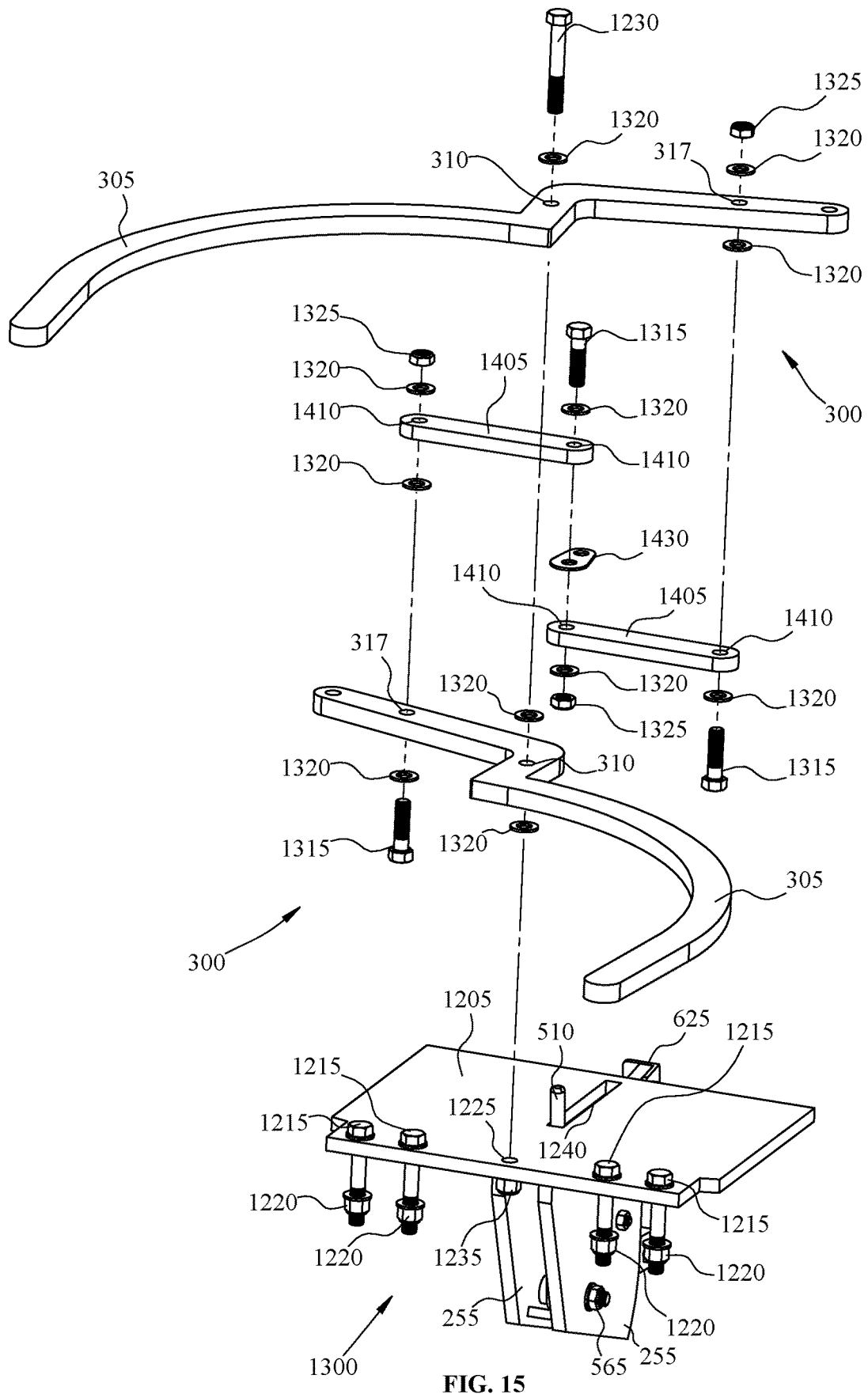
FIG. 15 shows assembly of a portion of a clasping stability device in accordance with one or more embodiments of the present invention.

FIG. 15 shows assembly of a clasping stability device 1300 in accordance with one or more embodiments of the present invention. A bolt 1230 may be disposed through a washer 1320, pivoting attachment portion 310 of an upper clasping arm 300, washer 1320, pivoting attachment portion 310 of a lower clasping arm 300, washer 1320, mounting hole 1225 of base plate 1205, and secured in place by nut 1235. A bolt 1315 may be disposed through a washer 1320, first end 1410 of first actuating plate 1405, washer 1320, rotating attachment portion 317, washer 1320, and secured by nut 1325. A bolt 1315 may be disposed through a washer 1320, rotating attachment portion 317 of lower clasping arm 300, washer 1320, first end 1410 of second actuator plate 1405, washer 1320, and secured by nut 1325. A second end 1410 of first actuator plate 1405 may be attached to a second end 1410 of second actuator plate 1405. A bolt 1315 may be disposed through a washer 1320, second end 1410 of second actuator plate 1405, slip attachment 1430, second end 1410 of first actuator plate 1405, washer 1320, and secured by nut 1325.

Advantages of one or more embodiments of the present invention may include one or more of the following:

In one or more embodiments of the present invention, a clasping stability device provides a stable material handling platform safely operable by a single human operator. The human operator may load and secure the material to the hand truck entirely from the rear without the use of straps or ties.

In one or more embodiments of the present invention, a clasping stability device eases loading material onto a hand truck at the source location, stabilizes the material during transport, and eases unloading the material from the hand truck at the destination location.

In one or more embodiments of the present invention, a clasping stability device includes a clasping mechanism that assists in pulling material toward the rear of the nose plate of the hand truck, and onto the nose plate, while the clasping mechanism is closing.

In one or more embodiments of the present invention, a clasping stability device includes a clasping mechanism that locks into place once the clasping arms are closed to a sufficient degree to secure the material. The locking mechanism is automatically engaged upon release of the engagement portion of the pedal arm. The locking mechanism remains locked stabilizing the material on the hand truck until the release portion of the pedal latch is engaged.

In one or more embodiments of the present invention, a clasping stability device includes a clasping mechanism that assists in releasing material toward the front of the nose plate while the clasping mechanism is opening.

In one or more embodiments of the present invention, a clasping stability device provides a single stroke clasping mechanism that automatically locks.

In one or more embodiments of the present invention, a clasping stability device provides a single stroke release mechanism.

In one or more embodiments of the present invention, a clasping stability device improves the safety of a hand truck operated by a single human operator.

In one or more embodiments of the present invention, a clasping stability device does not require an external power source and does not require substantial strength on the part of the human operator. The clasping mechanism uses leverage on an inverted index latch track to reduce the amount of force required to engage the clasping mechanism.

In one or more embodiments of the present invention, a clasping stability device improves the safety of transporting chemicals, flammable materials, hazardous materials, kegs, tanks, barrels, and other substantially cylindrical objects.

In one or more embodiments of the present invention, a clasping stability device may be composed of lightweight materials or spark-resistant materials.

In one or more embodiments of the present invention, a clasping stability device may be retrofitted onto an existing hand truck having either tubular longitudinal support members or a rectangular transverse support member. Alternatively, the clasping stability device may be integrated with a new hand truck build.

While the present invention has been described with respect to the above-noted embodiments, those skilled in the art, having the benefit of this disclosure, will recognize that other embodiments may be devised that are within the scope of the invention as disclosed herein. Accordingly, the scope of the invention should only be limited by the appended claims.

What is claimed is:

1. A clasping stability device comprising:
   a pair of clasping arms each comprising a clasping portion, a pivoting attachment portion, and a rotating attachment portion;
   a base plate assembly comprising a base plate, a plurality of actuator travel positioner receivers disposed on a top side of the base plate, and a plurality of pedal mounting plates disposed on a bottom side of the base plate;
   an actuator assembly comprising an actuator plate and a plurality of actuator travel positioners attached to a bottom side of the actuator plate;
   a pedal arm disposed in between the pedal mounting plates comprising an engagement portion, a pivot attachment portion, an index latch track, and an actuating portion; and
   a pedal latch disposed in between the pedal mounting plates comprising a release portion, a pivot attachment portion, and an index latch,
   wherein the clasping arms are controllably closed by pushing the engagement portion of the pedal arm causing the pedal arm to travel such that the actuating portion of the pedal arm disposed within a cutout of the actuator plate causes the actuator plate assembly to travel in the actuator travel positioner receivers toward a rear of the base plate, and
   wherein the travel of the actuator plate assembly causes the rotating attachment portion of the clasping arms to travel within arcuate travel cutouts in the actuator plate while the pivot attachment portion of the clasping arms pivot causing the clasping arms to close and upon release of the engagement portion the index latch engages the index latch track to stably retain a degree of closure of the clasping arms.

2. The clasping stability device of claim 1, further comprising a plurality of bias springs each having a first end removably attached to the base plate and a second end removably attached to the actuator plate.

3. The clasping stability device of claim 2, wherein the clasping arms are opened by pushing the release portion of the pedal latch to disengage the index latch from the index latch track and the plurality of bias springs causes the actuator plate assembly to travel in the actuator travel positioner receivers toward a front of the base plate.

4. The clasping stability device of claim 3, wherein the travel of the actuator plate towards the front of the base plate causes the rotating attachment portion of the clasping arms to travel within arcuate travel cutouts in the actuator plate while the pivot attachment portion of the clasping arms pivot causing the clasping arms to open.

5. The clasping stability device of claim 1, further comprising a plurality of clamping assemblies removably attached to the base plate.

6. The clasping stability device of claim 5, wherein each clamping assembly comprises a front member having a radiused portion that is removably attached a rear member having a radiused portion, such that the radiused portions of the front member and rear members secure the clasping stability device to a longitudinal support member of a hand truck.

7. The clasping stability device of claim 1, wherein the base plate comprises a plurality of direct mounting holes for directly attached the clasping stability device to a transverse support member of a hand truck.

8. A clasping stabilized hand truck comprising:
a hand truck comprising a plurality of longitudinal support members; and
a clasping stability device removably attached to the hand truck by a plurality of clamping assemblies wherein each clamping assembly comprises a front member having a radiused portion and a rear member having a radiused portion, and wherein the front member is removably attached to the rear member such that the radiused portions secure the clasping stability device to the longitudinal support members of the hand truck,
wherein the clasping stability device comprises:
a pair of clasping arms each comprising a clasping portion, a pivoting attachment portion, and a rotating attachment portion,
a base plate assembly comprising a base plate, a plurality of actuator travel positioner receivers disposed on a top side of the base plate, and a plurality of pedal mounting plates disposed on a bottom side of the base plate,
an actuator assembly comprising an actuator plate and a plurality of actuator travel positioners attached to a bottom side of the actuator plate,
a pedal arm disposed in between the pedal mounting plates comprising an engagement portion, a pivot attachment portion, an index latch track, and an actuating portion; and
a pedal latch disposed in between the pedal mounting plates comprising a release portion, a pivot attachment portion, and an index latch,
wherein the clasping arms are controllably closed by pushing the engagement portion of the pedal arm causing the pedal arm to travel such that the actuating portion of the pedal arm disposed within a cutout of the actuator plate causes the actuator plate assembly to travel in the actuator travel positioner receivers toward a rear of the base plate, and
wherein the travel of the actuator plate assembly causes the rotating attachment portion of the clasping arms to travel within arcuate travel cutouts in the actuator plate while the pivot attachment portion of the clasping arms pivot causing the clasping arms to close and upon release of the engagement portion the index latch engages the index latch track to stably retain a degree of closure of the clasping arms.

9. The clasping stabilized hand truck of claim 8, wherein the clasping stability device further comprises a plurality of bias springs each having a first end removably attached to the base plate and a second end removably attached to the actuator plate.

10. The clasping stabilized hand truck of claim 9, wherein the clasping arms of the clasping stability device are opened by pushing the release portion of the pedal latch to disengage the index latch from the index latch track and the plurality of bias springs causes the actuator plate assembly to travel in the actuator travel positioner receivers toward a front of the base plate.

11. The clasping stabilized hand truck of claim 10, wherein the travel of the actuator plate towards the front of the base plate causes the rotating attachment portion of the clasping arms to travel within arcuate travel cutouts in the actuator plate while the pivot attachment portion of the clasping arms pivot causing the clasping arms to open.

12. The clasping stabilized hand truck of claim 8, further comprising a plurality of clamping assemblies removably attached to the base plate.

13. The clasping stabilized hand truck of claim 12, wherein each clamping assembly comprises a front member having a radiused portion that is removably attached a rear member having a radiused portion, such that the radiused portions of the front member and rear members secure the clasping stability device to a longitudinal support member of the hand truck.

14. The clasping stabilized hand truck of claim 8, wherein the base plate comprises a plurality of direct mounting holes for directly attached the clasping stability device to a transverse support member of the hand truck.

15. A clasping stabilized hand truck comprising:
a hand truck comprising a plurality of transverse support members; and
a clasping stability device removably attached to the hand truck by a plurality of mounting bolts that secure the clasping stability device to the transverse support member of the hand truck,
wherein the clasping stability device comprises:
a pair of clasping arms each comprising a clasping portion, a pivoting attachment portion, and a rotating attachment portion,
a base plate assembly comprising a base plate, a plurality of actuator travel positioner receivers disposed on a top side of the base plate, and a plurality of pedal mounting plates disposed on a bottom side of the base plate,
an actuator assembly comprising an actuator plate and a plurality of actuator travel positioners attached to a bottom side of the actuator plate,
a pedal arm disposed in between the pedal mounting plates comprising an engagement portion, a pivot attachment portion, an index latch track, and an actuating portion; and
a pedal latch disposed in between the pedal mounting plates comprising a release portion, a pivot attachment portion, and an index latch,
wherein the clasping arms are controllably closed by pushing the engagement portion of the pedal arm causing the pedal arm to travel such that the actuating portion of the pedal arm disposed within a cutout of the actuator plate causes the actuator plate assembly to travel in the actuator travel positioner receivers toward a rear of the base plate, and
wherein the travel of the actuator plate assembly causes the rotating attachment portion of the clasping arms to travel within arcuate travel cutouts in the actuator plate while the pivot attachment portion of the clasping arms pivot causing the clasping arms to close and upon release of the engagement portion the index latch engages the index latch track to stably retain a degree of closure of the clasping arms.

16. The clasping stabilized hand truck of claim 15, wherein the clasping stability device further comprises a plurality of bias springs each having a first end removably attached to the base plate and a second end removably attached to the actuator plate.

17. The clasping stabilized hand truck of claim 16, wherein the clasping arms of the clasping stability device are opened by pushing the release portion of the pedal latch to disengage the index latch from the index latch track and the plurality of bias springs causes the actuator plate assembly to travel in the actuator travel positioner receivers toward a front of the base plate.

18. The clasping stabilized hand truck of claim 17, wherein the travel of the actuator plate towards the front of the base plate causes the rotating attachment portion of the clasping arms to travel within arcuate travel cutouts in the actuator plate while the pivot attachment portion of the clasping arms pivot causing the clasping arms to open.

19. The clasping stabilized hand truck of claim 15, further comprising a plurality of clamping assemblies removably attached to the base plate.

20. The clasping stabilized hand truck of claim 19, wherein each clamping assembly comprises a front member having a radiused portion that is removably attached a rear member having a radiused portion, such that the radiused portions of the front member and rear members secure the clasping stability device to a longitudinal support member of the hand truck.

21. The clasping stabilized hand truck of claim 15, wherein the base plate comprises a plurality of direct mounting holes for directly attached the clasping stability device to a transverse support member of the hand truck.

* * * * *